United States Patent
Li et al.

(10) Patent No.: US 12,363,785 B2
(45) Date of Patent: *Jul. 15, 2025

(54) CONFIGURATION AND SIGNALING FOR UL NOMA OPERATIONS

(71) Applicant: InterDigital Patent Holdings, Inc., Wilmington, DE (US)

(72) Inventors: Yifan Li, Conshohocken, PA (US); Allan Y. Tsai, Boonton, NJ (US); Lakshmi R. Iyer, King of Prussia, PA (US); Qing Li, Princeton Junction, NJ (US); Pascal M. Adjakple, Great Neck, NY (US); Mohamed Awadin, San Diego, CA (US); Joseph M. Murray, Schwenksville, PA (US); Guodong Zhang, Woodbury, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/783,247

(22) Filed: Jul. 24, 2024

(65) Prior Publication Data

US 2024/0381479 A1 Nov. 14, 2024

Related U.S. Application Data

(63) Continuation of application No. 18/350,332, filed on Jul. 11, 2023, which is a continuation of application (Continued)

(51) Int. Cl.
*H04W 76/19* (2018.01)
*H04L 1/1607* (2023.01)
(Continued)

(52) U.S. Cl.
CPC .......... *H04W 76/27* (2018.02); *H04L 1/1664* (2013.01); *H04L 5/0005* (2013.01); *H04W 72/23* (2023.01); *H04W 76/19* (2018.02); *H04W 80/02* (2013.01)

(58) Field of Classification Search
CPC . H04W 76/27; H04W 76/19; H04W 52/0229; H04W 72/23; H04W 72/1289;
(Continued)

(56) References Cited

U.S. PATENT DOCUMENTS

| | | | |
|---|---|---|---|
| 6,125,449 A * | 9/2000 | Taylor | G06F 1/26 345/212 |
| 2012/0207040 A1* | 8/2012 | Comsa | H04W 72/1215 370/252 |

(Continued)

FOREIGN PATENT DOCUMENTS

| | | |
|---|---|---|
| CN | 105898894 A | 8/2016 |
| CN | 106465265 A | 2/2017 |

(Continued)

OTHER PUBLICATIONS

3rd Generation Partnership Project; "Contention-based non-orthogonal multiple access for UL mMTC",3GPP TSG RAN WG1 Meeting #85, Document R1-164269, Nanjing, China, May 23, 2016, 6 pages.

(Continued)

*Primary Examiner* — Wei Zhao
(74) *Attorney, Agent, or Firm* — Flaster Greenberg P.C.

(57) ABSTRACT

Switching between Orthogonal Multiple Access (OMA) and Non-Orthogonal Multiple Access (NOMA) modes of a user equipment (UE) can be determined and indicated by a gNB to a UE at an RRC connected state using one or more of the following schemes: at an RRC (Radio Resource Control) layer with an RRC configuration message, at a MAC (Me- (Continued)

dium Access Control) layer with MAC CE (MAC control element) signaling, at a PHY (Physical) layer with DCI (Downlink Control Information) signaling, jointly with RRC configuration and DCI signaling, and/or jointly with RRC configuration and MAC CE signaling. The OMA or NOMA mode that the UE operates after the transition may be requested by the UE, indicated by the gNB, and/or may be based on one or more rules for OMA-NOMA switching.

10 Claims, 36 Drawing Sheets

Related U.S. Application Data

No. 16/981,927, filed as application No. PCT/US2019/025991 on Apr. 5, 2019, now abandoned.

(60) Provisional application No. 62/687,986, filed on Jun. 21, 2018, provisional application No. 62/653,074, filed on Apr. 5, 2018.

(51) Int. Cl.
*H04L 5/00* (2006.01)
*H04W 72/23* (2023.01)
*H04W 76/27* (2018.01)
*H04W 80/02* (2009.01)

(58) Field of Classification Search
CPC .. H04W 80/12; H04W 52/022; H04L 1/1664; H04L 5/0005; H04L 5/0048; H04L 1/166
See application file for complete search history.

(56) References Cited

U.S. PATENT DOCUMENTS

| | | | |
|---|---|---|---|
| 2015/0085802 A1 | 3/2015 | Papasakellariou et al. | |
| 2015/0312074 A1 | 10/2015 | Zhu et al. | |
| 2016/0219529 A1 | 7/2016 | Benjebbour et al. | |
| 2017/0013515 A1 | 1/2017 | Bangolae et al. | |
| 2017/0367110 A1 | 12/2017 | Li et al. | |
| 2018/0070274 A1 | 3/2018 | Ode | |
| 2018/0145800 A1* | 5/2018 | Srivastav | H04L 1/1887 |
| 2018/0279204 A1 | 9/2018 | Kim et al. | |
| 2019/0082490 A1 | 3/2019 | Zhang | |
| 2020/0128443 A1 | 4/2020 | Na et al. | |
| 2020/0169922 A1 | 5/2020 | Ozturk et al. | |
| 2020/0178291 A1 | 6/2020 | Sha et al. | |
| 2020/0252917 A1 | 8/2020 | Zhang et al. | |
| 2020/0322854 A1 | 10/2020 | Ryoo et al. | |
| 2021/0083828 A1 | 3/2021 | Matsuda et al. | |

FOREIGN PATENT DOCUMENTS

| | | |
|---|---|---|
| CN | 107104779 A | 8/2017 |
| CN | 110495232 A | 11/2019 |
| WO | WO 2018/031603 A1 | 2/2018 |
| WO | WO 2018/184435 A1 | 10/2018 |

OTHER PUBLICATIONS

3rd Generation Partnership Project; "Discussion on NoMA study for Rel-15 SI", 3GPP TSG RAN WG1 Meeting #91, Document No. R1-1720607, Reno, United States, Nov. 27, 2017, 7 pages.

3rd Generation Partnership Project; "Procedures related consideration to NoMA", Samsung / R1-1802007, 3GPP Draft; Mobile Competence Centre ; 650, Route Des Lucioles ; F-06921 Sophiaantipolis Cedex ; France vol. RAN WG1, No. Athens, Greek; Feb. 26, 2018-Mar. 2, 2018 Feb. 16, 2018 (Feb. 16, 2018), XP051397116.

3rd Generation Partnership Project; "Quantitative analysis on UL data transmission in inactive state", Zte et al., R2-1701932, 3GPP Draft; Mobile Competence Centre ; 650, Route Des Lucioles ; F-06921 Sophia-Anti, vol. RAN WG2, No. Athens, Greece; Feb. 13, 2017-Feb. 17, 2017 Feb. 4, 2017 (Feb. 4, 2017), XP051223795.

3rd Generation Partnership Project; "Small data transmission in inactive state", CATT, R2-166118, 3GPP Draft; Mobile Competence Centre ; 650, Route Des Lucioles ; F-06921 Sophia-Antipolis Cedex ; France, vol. RAN WG2, No. Kaohsiung; Oct. 10, 2016-Oct. 14, 2016 Sep. 30, 2016 (Sep. 30, 2016), XP051161581.

3rd Generation Partnership Project; "Technical Specification Group Radio Access Network, Study on Downlink Multiuser Superposition Transmission (MUST) for LTE (Release 13)", 3GPP TR 36.859 V13.0.0, Dec. 2015, 48 pages.

3rd Generation Partnership Project; "Technical Specification Group Radio Access Network; Study on Scenarios and Requirements for Next Generation Access Technologies; (Release 14)," 3GPP TR 38.913 V14.3.0, Jun. 2017, 39 pages.

Huawei, HiSilicon, R2-168478 "Considerations on grant free transmission for NR".

Li Tian, On Uplink Non-Orthogonal Multiple Access for 5G: Opportunities and Challenges, IEEE Xplore, pp. 142-152 (Year: 2017).

Ping et al., "Interleave-Division Multiple-Access", IEEE Transactions on Wireless Communications, vol. 5, No. 4, Apr. 2006, 10 pages.

* cited by examiner

```
-- ASN1START
-- TAG-MULTIPLE-ACCESS-MODE-START

MultipleAccessMode ::=          ENUMERATED {OMA, NOMA}

-- TAG- MULTIPLE-ACCESS-MODE -STOP
-- ASN1STOP
```

FIG. 4

```
-- ASN1START
-- TAG-BANDWIDTH-PART-START

BandwidthPart-Config ::=            SEQUENCE {
    -- FFS: Conditions! What to do when certain fields or the entire bandwidth part is omitted?
Assume parameters of the carrier instead?
    --           or use the initialBWP derived from SIB1 or ServingCellConfigCommon? Or make it
mandatory to provide at least one BWP.
    -- FFS: How can a BandwidthPart be changed? Only via synchronousReconfiguration or also
without?
    -- NOTE: The changes in this section are based on RAN1 agreements (not from the official L1
parameter list):

-- The bandwidth parts for downlink. (see 38.211, 38.213, section 12)
    downlinkBandwidthPartsToReleaseList         SEQUENCE (SIZE (1..maxNrofBandwidthParts)) OF
BandwidthPartId                 OPTIONAL,
    downlinkBandwidthPartsToAddModList          SEQUENCE (SIZE (1..maxNrofBandwidthParts)) OF
BandwidthPart                   OPTIONAL,
    -- ID of the downlink bandwidth part to be used upon MAC-activation of an SCell. If not
provided, the UE uses the default BWP
    firstActiveDownlinkBwp-Id                   BandwidthPartId
        OPTIONAL, -- Cond SCellOnly -- Corresponds to L1 parameter 'default-DL-BWP'.
    -- ID of the downlink bandwidth part to be used upon expiry of txxx.
    -- This field is UE specific. When the field is absent the UE the initial BWP as default BWP.
    -- (see 38.211, 38.213, section 12)
    -- FSS: May the NW change the default BWP with a regular RRC reconfiguration or only with
Reconfiguration with sync?
    -- FFS: Whether to add a default uplink BWP
    defaultDownlinkBwp-Id                       BandwidthPartId
        OPTIONAL,
```

FIG. 5A

```
    -- The bandwidth parts for uplink. In case of TDD uplink- and downlink BWP with the same
bandwidthPartId are considered
    -- as a BWP pair and must have the same center frequency.
    uplinkBandwidthPartsToReleaseList       SEQUENCE (SIZE (1..maxNrofBandwidthParts)) OF
BandwidthPartId         OPTIONAL,
    uplinkBandwidthPartsToAddModList        SEQUENCE (SIZE (1..maxNrofBandwidthParts)) OF
BandwidthPart           OPTIONAL,
    -- ID of the uplink bandwidth part to be used upon MAC-activation of an SCell. If not
provided, the UE uses the FFS: default BWP
    firstActiveUplinkBwp-Id                 BandwidthPartId
        OPTIONAL,       -- Cond SCellOnly firstActiveUplinkBwp-MultipleAccessMode    ENUMERATED {OMA, NOMA}

-- The duration in ms after which the UE falls back to the default Bandwidth Part. (see
38.321, section FFS_Section)
    -- The UE starts the timer when it switches its active downlink BWP to a downlink BWP other
than the default downlink BWP.
    -- The UE restarts the timer to the initial value when it successfully decodes a DCI to
schedule PDSCH(s) in its active downlink BWP.
    -- When the timer expires, the UE switches its active downlink BWP to the default downlink
(FFS: and uplink?) BWP.
    -- FFS: For TDD the UE switches also the paired uplink BWP to the one with the
defaultDownlinkBwp-Id.
    -- FFS: For TDD the UE switches the uplink BWP?????
    -- When the network releases the timer configuration, the UE stops the timer without
switching to the default (FFS: and uplink?) BWP.
    bandwidthPartInactivityTimer            SetupRelease { ENUMERATED {
                                                FFS: Value range } }
        OPTIONAL,       -- Need M
}
```

FIG. 5B

```
BandwidthPart ::=              SEQUENCE {
    -- An identifier for this bandwidth part.
    -- Corresponds to L1 parameter 'UL-BWP-index'. (see 38.211, 38.213, section 12)
    bandwidthPartId                BandwidthPartId,
    -- Frequency domain location of this bandwidth part as a distance in number of PRBs in
Relation to the reference PRB (PRB 0)
    -- of the associated carrier. Corresponds to L1 parameter 'DL-BWP-loc'. (see 38.211,
section FFS_Section).
    -- In case of TDD, a BWP-pair (UL BWP and DL BWP with the same bandwidthPartId) must have the
same location (see 38.211, section REF)
    -- FFS_Value: RAN1 seems to discuss the final range.
    location                       INTEGER (0.. maxNrofPhysicalResourceBlocksTimes4)
            OPTIONAL,
    -- Bandwidth of this bandwidth part (see 38.211, section REF)
    bandwidth                      INTEGER (1.. maxNrofPhysicalResourceBlocks)
            OPTIONAL,
    -- Subcarrier spacing to be used in this BWP. It is applied to at least PDCCH, PDSCH and
corresponding DMRS.
    -- The values provided here are converted into a subcarrier spacing as indicated in
38.211, Table 4.1-2.
    subcarrierSpacing              ENUMERATED {n0, n1, n3, n4}
            OPTIONAL,
    -- Indicates whether to use the extended cyclic prefix for this bandwidth part. If not
set, the UE uses the normal cyclic prefix.
    -- Normal CP is supported for all numerologies and slot formats. Extended CP is supported
only for 60 kHz subcarrier spacing.
    -- (see 38.211, section 4.2.2)
    cyclicPrefix                   ENUMERATED { extended }
            OPTIONAL,
```

FIG. 5C

```
-- Frequency location of the uplink "direct current" frequency .
-- Corresponds to L1 parameter 'UL-BWP-DC', (see 38.211, section FFS_Section)
directCurrentLocation          INTEGER (0..3299)
    OPTIONAL,       -- Cond UplinkOnly MultipleAccessMode         ENUMERATED {OMA, NOMA}
}

BandwidthPartId ::=            INTEGER (0..maxNrofBandwidthParts-1)

-- TAG-BANDWIDTH-PART-STOP
-- ASN1STOP
```

FIG. 5D

```
-- ASN1START
-- TAG-MULTIPLE-ACCESS-MODE-START

MultipleAccessMode ::=           ENUMERATED {OMA, NOMA}

MultipleAccessSwitching ::=      ENUMERATED {ON, OFF}

-- TAG- MULTIPLE-ACCESS-MODE -STOP
-- ASN1STOP
```

FIG. 9

```
-- ASN1START
-- TAG-NOMA-MODE-SUPPORT-START

NOMAModeSupport ::=                    ENUMERATED {ON, OFF}

-- TAG- MULTIPLE-ACCESS-MODE-STOP
-- ASN1STOP
```

FIG. 12

```
-- ASN1START
-- TAG-CONFIGUREDGRANTINACTIVECONFIG-START

ConfiguredGrantInactiveConfig ::=               SEQUENCE {
    frequencyHopping                            ENUMERATED {mode1, mode2}
                                                    OPTIONAL, -- Need S,
    cg-DMRS-Configuration                       DMRS-UplinkConfig,
    mcs-Table                                   ENUMERATED {qam256, spare1}
        OPTIONAL,      -- Need S
    mcs-TableTransformPrecoder                  ENUMERATED {qam256,
spare1}                                             OPTIONAL, -- Need S
    uci-OnPUSCH                                 SetupRelease { CG-UCI-OnPUSCH },
    resourceAllocation                          ENUMERATED { resourceAllocationType0,
resourceAllocationType1, dynamicSwitch },
    rbg-Size                                    ENUMERATED
{config2}                                           OPTIONAL, -- Need S
    powerControlLoopToUse                       ENUMERATED {n0, n1},
    p0-PUSCH-Alpha                              P0-PUSCH-AlphaSetId,
    transformPrecoder                           ENUMERATED
{enabled}                                           OPTIONAL, -- Need S
    nrofHARQ-Processes                          INTEGER (1..16),
    repK                                        ENUMERATED {n1, n2, n4, n8},
    repK-RV                                     ENUMERATED {s1-0231, s2-0303, s3-
0000}                                               OPTIONAL, -- Cond RepK
```

FIG. 15A

```
periodicity                    ENUMERATED {
                                   sym2, sym7, sym1x14, sym2x14, sym4x14, sym5x14,
sym8x14, sym10x14, sym16x14, sym20x14,
                                   sym32x14, sym40x14, sym64x14, sym80x14,
sym128x14, sym160x14, sym256x14, sym320x14, sym512x14,
                                   sym640x14, sym1024x14, sym1280x14, sym2560x14,
sym5120x14,
                                   sym6, sym1x12, sym2x12, sym4x12, sym5x12,
sym8x12, sym10x12, sym16x12, sym20x12, sym32x12,
                                   sym40x12, sym64x12, sym80x12, sym128x12,
sym160x12, sym256x12, sym320x12, sym512x12, sym640x12,
                                   sym1280x12, sym2560x12
                               },
configuredGrantTimer           INTEGER                 (1..64)
                                                       OPTIONAL, -- Need R
rrc-ConfiguredUplinkGrant              SEQUENCE {
    timeDomainOffset                       INTEGER (0..5119),
    timeDomainAllocation                   INTEGER (0..15),
    frequencyDomainAllocation              BIT STRING (SIZE (18)),
    antennaPort                            INTEGER (0..31),
    dmrs-SeqInitialization                 INTEGER (0..1)
                                                   OPTIONAL, -- Cond NoTransformPrecoder
    precodingAndNumberOfLayers             INTEGER (0..63),
    srs-ResourceIndicator                  INTEGER (0..15),
    mcsAndTBS                              INTEGER (0..31),
    frequencyHoppingOffset                 INTEGER (1..maxNrofPhysicalResourceBlocks-1)
                                                   OPTIONAL, -- Need M
    pathlossReferenceIndex                 INTEGER (0..maxNrofPUSCH-PathlossReferenceRSs-1),
    ...
```

FIG. 15B

```
    MultipleAccessMode              ENUMERATED {OMA, NOMA}
        OPTIONAL -- Need R
    }
    CG-UCI-OnPUSCH ::= CHOICE {
        dynamic                     SEQUENCE (SIZE (1..4)) OF BetaOffsets,
        semiStatic                  BetaOffsets
    }

-- TAG-CONFIGUREDGRANTINACTIVECONFIG-STOP
-- ASN1STOP
```

FIG. 15C

```
-- ASN1START
-- TAG-MULTIPLE-ACCESS-MODE-INACTIVE-START

MultipleAccessModeInactive ::=    ENUMERATED {OMA, NOMA}

-- TAG- MULTIPLE-ACCESS-MODE-INACTIVE-STOP
-- ASN1STOP
```

FIG. 16

```
-- ASN1START
-- TAG-MULTIPLE-ACCESS-INACTIVE-TYPE-START

MultipleAccessInactiveType ::=    ENUMERATED {type-1, type-2, type-3}

-- TAG- MULTIPLE-ACCESS-INACTIVE-TYPE-STOP
-- ASN1STOP
```

FIG. 17

```
-- ASN1START
-- TAG-CONFIGUREDGRANTCONFIG-START

ConfiguredGrantConfig ::=    SEQUENCE {
    frequencyHopping             ENUMERATED {mode1, mode2}
                                    OPTIONAL, -- Need S,
    cg-DMRS-Configuration        DMRS-UplinkConfig,
    mcs-Table                    ENUMERATED {qam256, spare1}
    OPTIONAL,     -- Need S
    mcs-TableTransformPrecoder   ENUMERATED {qam256,
                                    OPTIONAL, -- Need S
    spare1}
    uci-OnPUSCH                  SetupRelease { CG-UCI-OnPUSCH },
    resourceAllocation           ENUMERATED { resourceAllocationType0,
    resourceAllocationType1, dynamicSwitch },
    rbg-Size                     ENUMERATED
                                    OPTIONAL, -- Need S
    {config2}
    powerControlLoopToUse        ENUMERATED {n0, n1},
    p0-PUSCH-Alpha               P0-PUSCH-AlphaSetId,
    transformPrecoder            ENUMERATED
    {enabled}                       OPTIONAL, -- Need S
    nrofHARQ-Processes           INTEGER (1..16),
    repK                         ENUMERATED {n1, n2, n4, n8},
    repK-RV                      ENUMERATED {s1-0231, s2-0303, s3-
    0000}
                                 OPTIONAL, -- Cond RepK
```

FIG. 21A

```
periodicity                      ENUMERATED {
                                   sym2, sym7, sym1x14, sym2x14, sym4x14, sym5x14,
sym8x14, sym10x14, sym16x14, sym20x14,
                                   sym32x14, sym40x14, sym64x14, sym80x14,
sym128x14, sym160x14, sym256x14, sym320x14, sym512x14,
                                   sym640x14, sym1024x14, sym1280x14, sym2560x14,
sym5120x14,
                                   sym6, sym1x12, sym2x12, sym4x12, sym5x12,
sym8x12, sym10x12, sym16x12, sym20x12, sym32x12,
                                   sym40x12, sym64x12, sym80x12, sym128x12,
sym160x12, sym256x12, sym320x12, sym512x12, sym640x12,
                                   sym1280x12, sym2560x12
                                 },
configuredGrantTimer             INTEGER                    OPTIONAL, -- Need R
(1..64)
rrc-ConfiguredUplinkGrant        SEQUENCE {
    timeDomainOffset                 INTEGER  (0..5119),
    timeDomainAllocation             INTEGER  (0..15),
    frequencyDomainAllocation        BIT STRING (SIZE (18)),
    antennaPort                      INTEGER  (0..31),
    dmrs-SeqInitialization           INTEGER  (0..1)
                                     OPTIONAL, -- Cond NoTransformPrecoder
    precodingAndNumberOfLayers       INTEGER  (0..63),
    srs-ResourceIndicator            INTEGER  (0..15),
    mcsAndTBS                        INTEGER  (0..31),
    frequencyHoppingOffset           INTEGER  (1..maxNrofPhysicalResourceBlocks-1)
                         OPTIONAL, -- Need M
    pathlossReferenceIndex           INTEGER  (0..maxNrofPUSCH-PathlossReferenceRSs-1),
...
```

FIG. 21B

```
    MultipleAccessMode              ENUMERATED {OMA, NOMA}
                                    OPTIONAL -- Need R
}
CG-UCI-OnPUSCH ::= CHOICE {
    dynamic                         SEQUENCE (SIZE (1..4)) OF BetaOffsets,
    semiStatic                      BetaOffsets
}

-- TAG-CONFIGUREDGRANTCONFIG-STOP
-- ASN1STOP
```

FIG. 21C

```
-- ASN1START
-- TAG-RETRANSMISSION-CONFIG-START
RetransmissionConfig ::=               SEQUENCE {
    RetransmissionModeSwitching ::=        ENUMERATED {ON, OFF},
    RetransmissionGrantType ::=        ENUMERATED {GRANTBASE, CONFIGUREDGRANT},
    NumberofBranch ::=                 ENUMERATED {n1, n2, n4, n8},
    MaxNumberofBranch ::=              ENUMERATED {n1, n2, n4, n8},
}

-- TAG- RETRANSMISSION-CONFIG-STOP
-- ASN1STOP
```

FIG. 22

```
-- ASN1START
-- TAG-MASignature-Config-START

MA-Signature-ConfigId ::=    INTEGER (0..maxNrofMA-Signature-Config-1)

-- TAG- MASignature-Config-STOP
-- ASN1STOP
```

FIG. 23

```
-- ASN1START
-- TAG-MASignature-Config-START

MA-Signature-Resources ::= SEQUENCE (SIZE (1..maxNrofMA-Signature-Resources)) OF MA-Signature-ConfigId MA-Signature-ConfigId ::=   INTEGER (0..maxNrof MA-Signature-Config-1)

-- TAG- MASignature-Config-STOP
-- ASN1STOP
```

FIG. 24

CONFIGURATION AND SIGNALING FOR UL NOMA OPERATIONS

CROSS-REFERENCE TO RELATED APPLICATIONS

This application is a continuation of U.S. patent application Ser. No. 18/350,332, filed Jul. 11, 2023, which is a continuation of U.S. patent application Ser. No. 16/981,927, filed Sep. 17, 2020, now abandoned, which is the National Stage of International Patent Application No. PCT/US2019/025991, filed Apr. 5, 2019, which claims the benefit of U.S. Provisional Patent Application No. 62/653,074, filed Apr. 5, 2018, and U.S. Provisional Patent Application No. 62/687,986, filed Jun. 21, 2018, the disclosure of which are incorporated herein by reference in their entireties.

BACKGROUND

In LTE, a Non-Orthogonal Multiple Access (NOMA) application is introduced for downlink (DL). The DL NOMA was proposed to 3GPP LTE Rel-13 and a new study item under the name of "downlink multiuser superposition transmission (MUST)" was approved. Later in Rel-14, a work item was established to specify the necessary mechanisms to enable LTE to support downlink intra-cell multiuser superposition transmission for data channels with assistance information from a serving BS (Base Station) to a UE regarding its experienced intra-cell interference.

SUMMARY

Disclosed herein are methods and systems for switching between Orthogonal Multiple Access (OMA) and Non-Orthogonal Multiple Access (NOMA) modes of a user equipment (UE). Switching between the OMA and NOMA modes can be determined and indicated by a gNB to a UE at an RRC connected state using one or more of the following schemes: at an RRC (Radio Resource Control) layer with an RRC configuration message, at a MAC (Medium Access Control) layer with MAC CE (MAC control element) signaling, at a PHY (Physical) layer with DCI (Downlink Control Information) signaling, jointly with RRC configuration and DCI signaling, and/or jointly with RRC configuration and MAC CE signaling. Switching between OMA and NOMA can be requested by a UE at RRC connected state. Switching between OMA and NOMA can be requested by a UE when the UE is transferring from an RRC inactive state to an RRC connected state. The OMA or NOMA mode that the UE operates after the transition may be requested by the UE, indicated by the gNB, and/or may be based on one or more rules for OMA-NOMA switching.

BRIEF DESCRIPTION OF THE DRAWINGS

The following detailed description is better understood when read in conjunction with the appended drawings. For the purposes of illustration, examples are shown in the drawings; however, the subject matter is not limited to specific elements and instrumentalities disclosed. In the drawings:

FIG. 4 shows an example of a MultipleAccessMode information element;

FIGS. 5A, 5B, 5C and 5D show an example of a BandwidthPart. Config information element;

FIG. 9 shows an example of a MultipleAccessSwitching information element;

FIG. 12 shows an example of a NomaMode Support information element;

FIGS. 15A, 15B and 15C shows an example of a TWG configuration for inactive state with an RRC ConfiguredGrantInactiveConfig;

FIG. 16 shows an example of an RRC configuration with RRC Multiple AccessMode Inactive;

FIG. 17 shows an example of an RRC configuration with RRC Multiple AccessInactive Type;

FIGS. 21A, 21B & 21C shows an example of an RRC configuration with ConfiguredGrantConfig, FIG. 22 shows an example of an RRC configuration with RetransmissionConfig;

FIG. 23 shows an example of a MA-Signature-Config information element;

FIG. 24 shows an example of a MA-Signature-Config_alternative1 information element.

DETAILED DESCRIPTION OF ILLUSTRATIVE EMBODIMENTS

1. Example Communication System and Networks

The 3rd Generation Partnership Project (3GPP) develops technical standards for cellular telecommunications network technologies, including radio access, the core transport network, and service capabilities-including work on codecs, security, and quality of service. Recent radio access technology (RAT) standards include WCDMA (commonly referred as 3G), LTE (commonly referred as 4G), LTE-Advanced standards, and New Radio (NR), which is also referred to as "5G". 3GPP NR standards development is expected to continue and include the definition of next generation radio access technology (new RAT), which is expected to include the provision of new flexible radio access below 7 GHZ, and the provision of new ultra-mobile broadband radio access above 7 GHz. The flexible radio access is expected to consist of a new, non-backwards compatible radio access in new spectrum below 7 GHZ, and it is expected to include different operating modes that may be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 7 GHz, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (eMBB) ultra-reliable low-latency Communication (URLLC), massive machine type communications (mMTC), network operation (e.g., network slicing, routing, migration and interworking, energy savings), and enhanced vehicle-to-everything (eV2X) communications, which may include any of Vehicle-to-Vehicle Communication (V2V), Vehicle-to-Infrastructure Communication (V2I), Vehicle-to-Network Communication (V2N), Vehicle-to-Pedestrian Communication (V2P), and vehicle communications with other entities. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, virtual reality, home automation, robotics, and aerial drones to name a few. All of these use cases and others are contemplated herein.

Figure 1A:
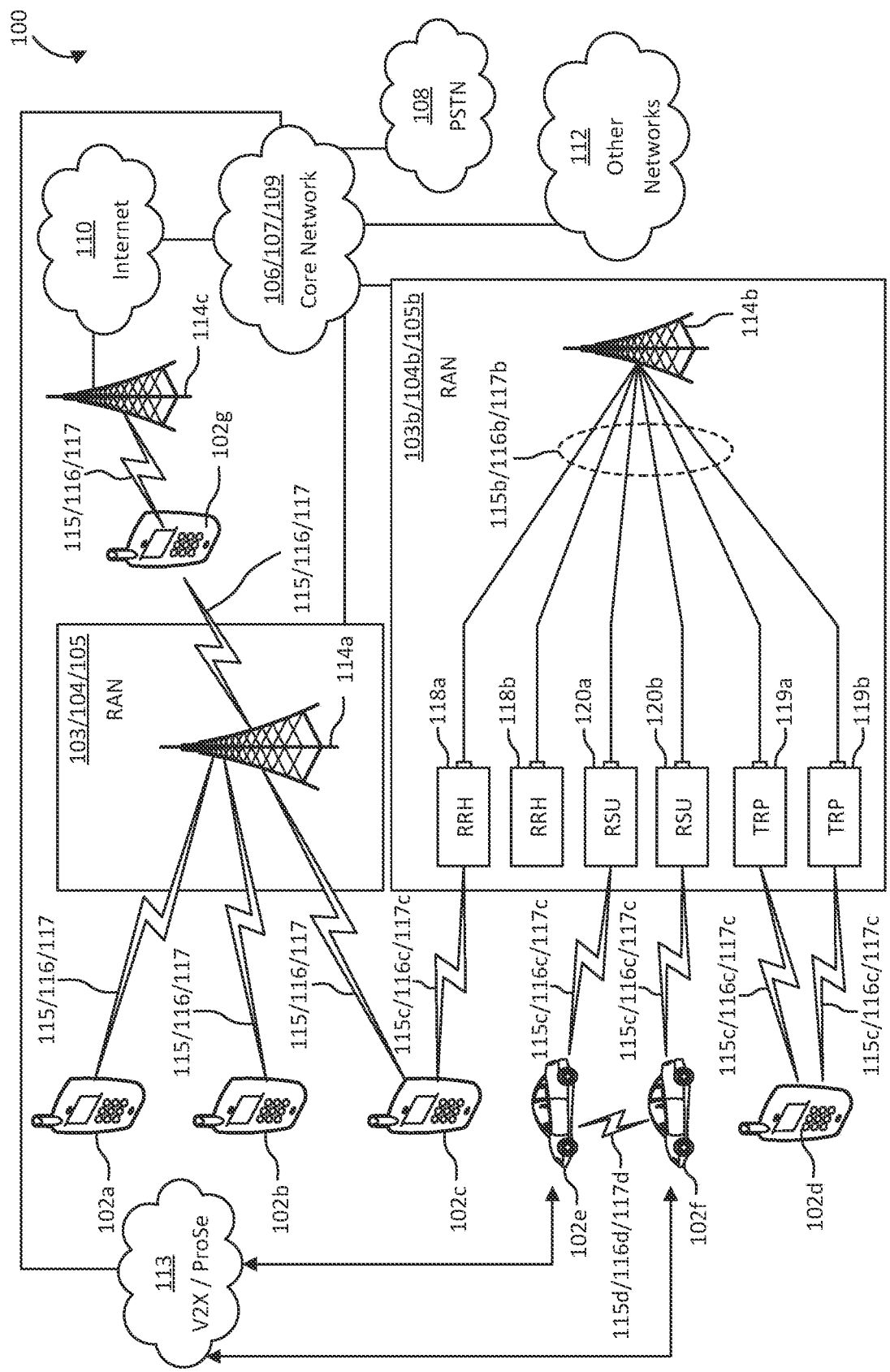
FIG. 1A illustrates one embodiment of an example communications system in which the methods and apparatuses described and claimed herein may be embodied.

FIG. 1A illustrates one embodiment of an example communications system 100 in which the methods and apparatuses described and claimed herein may be embodied. As shown, the example communications system 100 may include wireless transmit/receive units (WTRUs) 102a, 102b, 102c, 102d, 102e, 102f, and/or 102g (which generally or collectively may be referred to as WTRU 102), a radio access network (RAN) 103/104/105/103b/104b/105b, a core network 106/107/109, a public switched telephone network (PSTN) 108, the Internet 110, other networks 112, and V2X server (or ProSe function and server) 113, though it will be appreciated that the disclosed embodiments contemplate any number of WTRUs, base stations, networks, and/or network elements. Each of the WTRUs 102a, 102b, 102c, 102d, 102e, 102f, 102g may be any type of apparatus or device configured to operate and/or communicate in a wireless environment. Although each WTRU 102a, 102b, 102c, 102d, 102e, 102f, 102g is depicted in FIGS. 1A-1E as a hand-held wireless communications apparatus, it is understood that with the wide variety of use cases contemplated for wireless communications, each WTRU may comprise or be embodied in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, bus or truck, a train, or a airplane, and the like.

The communications system 100 may also include a base station 114a and a base station 114b. Base stations 114a may be any type of device configured to wirelessly interface with at least one of the WTRUs 102a, 102b, 102c to facilitate access to one or more communication networks, such as the core network 106/107/109, the Internet 110, Network Services 113, and/or the other networks 112. Examples of Network Services may include V2X Services, ProSe Services, IoT Services, Video Streaming, Edge Computing, etc. Base stations 114b may be any type of device configured to wiredly and/or wirelessly interface with at least one of the RRHs (Remote Radio Heads) 118a, 118b, TRPs (Transmission and Reception Points) 119a, 119b, and/or RSUs (Roadside Units) 120a and 120b to facilitate access to one or more communication networks, such as the core network 106/107/109, the Internet 110, other networks 112, and/or Network Services 113. RRHs 118a, 118b may be any type of device configured to wirelessly interface with at least one of the WTRU 102c, to facilitate access to one or more communication networks, such as the core network 106/107/109, the Internet 110, Network Services 113, and/or other networks 112. TRPs 119a, 119b may be any type of device configured to wirelessly interface with at least one of the WTRU 102d, to facilitate access to one or more communication networks, such as the core network 106/107/109, the Internet 110, Network Services 113, and/or other networks 112. RSUs 120a and 120b may be any type of device configured to wirelessly interface with at least one of the WTRU 102e or 102f, to facilitate access to one or more communication networks, such as the core network 106/107/109, the Internet 110, other networks 112, and/or Network Services 113. By way of example, the base stations 114a, 114b may be a base transceiver station (BTS), a Node-B, an eNode B, a Home Node B, a Home eNode B, a next generation node-B (gNode B), a satellite, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114b may be part of the RAN 103b/104b/105b, which may also include other base stations and/or network elements (not shown), such as a base station controller (BSC), a radio network controller (RNC), relay nodes, etc. The base station 114a may be configured to transmit and/or receive wireless signals within a particular geographic region, which may be referred to as a cell (not shown). The base station 114b may be configured to transmit and/or receive wired and/or wireless signals within a particular geographic region, which may be referred to as a cell (not shown). The cell may further be divided into cell sectors. For example, the cell associated with the base station 114a may be divided into three sectors. Thus, in an embodiment, the base station 114a may include three transceivers, e.g., one for each sector of the cell. In an embodiment, the base station 114a may employ multiple-input multiple output (MIMO) technology and, therefore, may utilize multiple transceivers for each sector of the cell.

The base stations 114a may communicate with one or more of the WTRUs 102a, 102b, 102c over an air interface 115/116/117, which may be any suitable wireless communication link (e.g., radio frequency (RF), microwave, infrared (IR), ultraviolet (UV), visible light, cmWave, mmWave, etc.). The air interface 115/116/117 may be established using any suitable radio access technology (RAT).

The base stations 114b may communicate with one or more of the RRHs 118a, 118b, TRPs 119a, 119b, and/or RSUs 120a and 120b, over a wired or air interface 115b/116b/117b, which may be any suitable wired (e.g., cable, optical fiber, etc.) or wireless communication link (e.g., radio frequency (RF), microwave, infrared (IR), ultraviolet (UV), visible light, cmWave, mmWave, etc.). The air interface 115b/116b/117b may be established using any suitable radio access technology (RAT).

The RRHs 118a, 118b, TRPs 119a, 119b and/or RSUs 120a, 120b, may communicate with one or more of the WTRUs 102c, 102d, 102e, 102f over an air interface 115c/116c/117c, which may be any suitable wireless communication link (e.g., radio frequency (RF), microwave, infrared (IR), ultraviolet (UV), visible light, cmWave, mmWave, etc.). The air interface 115c/116c/117c may be established using any suitable radio access technology (RAT).

The WTRUs 102a, 102b, 102c, 102d, 102e, 102f, and/or 102g may communicate with one another over a direct air interface 115d/116d/117d, such as Sidelink communication, (not shown in the figures), which may be any suitable wireless communication link (e.g., radio frequency (RF), microwave, infrared (IR), ultraviolet (UV), visible light, cmWave, mmWave, etc.). The air interface 115d/116d/117d may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c, or RRHs 118a, 118b, TRPs 119a, 119b and/or RSUs 120a, 120b in the RAN 103b/104b/105b and the WTRUs 102c, 102d, 102e, 102f, may implement a radio technology such as Universal Mobile Telecommunications System (UMTS) Terrestrial Radio Access (UTRA), which may establish the air interface 115/116/117 or 115c/116c/117c respectively using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114a in the RAN 103/104/105 and the WTRUs 102a, 102b, 102c, or RRHs 118a, 118b, TRPs 119a, 119b, and/or RSUs 120a, 120b in the RAN 103b/104b/105b and the WTRUs 102c, 102d, may implement a radio technology such as Evolved UMTS Terrestrial Radio Access (E-UTRA), which may establish the air interface 115/116/117 or 115c/116c/117c respectively using Long Term Evolution (LTE) and/or LTE-Advanced (LTE-A). The air interface 115/116/117 or 115c/116c/117c may implement 3GPP NR technology. The LTE and LTE-A technology includes LTE D2D and V2X technologies and interface (such as Sidelink communications and etc.). The 3GPP NR technology includes NR V2X technologies and interface (such as Sidelink communications and etc.).

In an embodiment, the base station 114a in the RAN 103/104/105 and the WTRUs 102a, 102b, 102c, or RRHs 118a, 118b, TRPs 119a, 119b and/or RSUs 120a, 120b in the RAN 103b/104b/105b and the WTRUs 102c, 102d, 102e, 102f may implement radio technologies such as IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114c in FIG. 1A may be a wireless router, Home Node B, Home eNode B, or access point, for example, and may utilize any suitable RAT for facilitating wireless connectivity in a localized area, such as a place of business, a home, a vehicle, a train, an aerial, a satellite, a manufactory, a campus, and the like. In an embodiment, the base station 114c and the WTRUs 102e, may implement a radio technology such as IEEE 802.11 to establish a wireless local area network (WLAN). In an embodiment, the base station 114c and the WTRUs 102d, may implement a radio technology such as IEEE 802.15 to establish a wireless personal area network (WPAN). In yet another embodiment, the base station 114c and the WTRUs 102e, may utilize a cellular-based RAT (e.g., WCDMA, CDMA2000, GSM, LTE, LTE-A, NR, etc.) to establish a picocell or femtocell. As shown in FIG. 1A, the base station 114c may have a direct connection to the Internet 110. Thus, the base station 114c may not be required to access the Internet 110 via the core network 106/107/109.

The RAN 103/104/105 and/or RAN 103b/104b/105b may be in communication with the core network 106/107/109, which may be any type of network configured to provide voice, data, messaging, authorization and authentication, applications, and/or voice over internet protocol (VOIP) services to one or more of the WTRUs 102a, 102b, 102c, 102d, and 102f. For example, the core network 106/107/109 may provide call control, billing services, mobile location-based services, pre-paid calling, Internet connectivity, packet data network connectivity, Ethernet connectivity, video distribution, etc., and/or perform high-level security functions, such as user authentication.

Although not shown in FIG. 1A, it will be appreciated that the RAN 103/104/105 and/or RAN 103b/104b/105b and/or the core network 106/107/109 may be in direct or indirect communication with other RANs that employ the same RAT as the RAN 103/104/105 and/or RAN 103b/104b/105b or a different RAT. For example, in addition to being connected to the RAN 103/104/105 and/or RAN 103b/104b/105b, which may be utilizing an E-UTRA radio technology, the core network 106/107/109 may also be in communication with another RAN (not shown) employing a GSM or NR radio technology.

The core network 106/107/109 may also serve as a gateway for the WTRUs 102a, 102b, 102c, 102d, 102e, and 102f to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The other networks 112 may include wired or wireless communications networks owned and/or operated by other service providers. For example, the networks 112 may include any type of packet data network (i.e. an IEEE 802.3 ethernet network) or another core network connected to one or more RANs, which may employ the same RAT as the RAN 103/104/105 and/or RAN 103b/104b/105b or a different RAT.

Some or all of the WTRUs 102a, 102b, 102c, 102d, 102e, and 102f in the communications system 100 may include multi-mode capabilities, e.g., the WTRUs 102a, 102b, 102c, 102d, 102e, and 102f may include multiple transceivers for communicating with different wireless networks over different wireless links. For example, the WTRU 102g shown in FIG. 1A may be configured to communicate with the base station 114a, which may employ a cellular-based radio technology, and with the base station 114c, which may employ an IEEE 802 radio technology.

Although not shown in FIG. 1A, it will be appreciated that a User Equipment may make a wired connection to a gateway. The gateway may be a Residential Gateway (RG). The RG may provide connectivity to a Core Network 106/107/109. It will be appreciated that many of the ideas contained herein may equally apply to UEs that are WTRUs and UEs that use a wired connection to connect to a network. For example, the ideas that apply to the wireless interfaces 115, 116, 117 and 115c/116c/117c may equally apply to a wired connection.

Figure 1B:
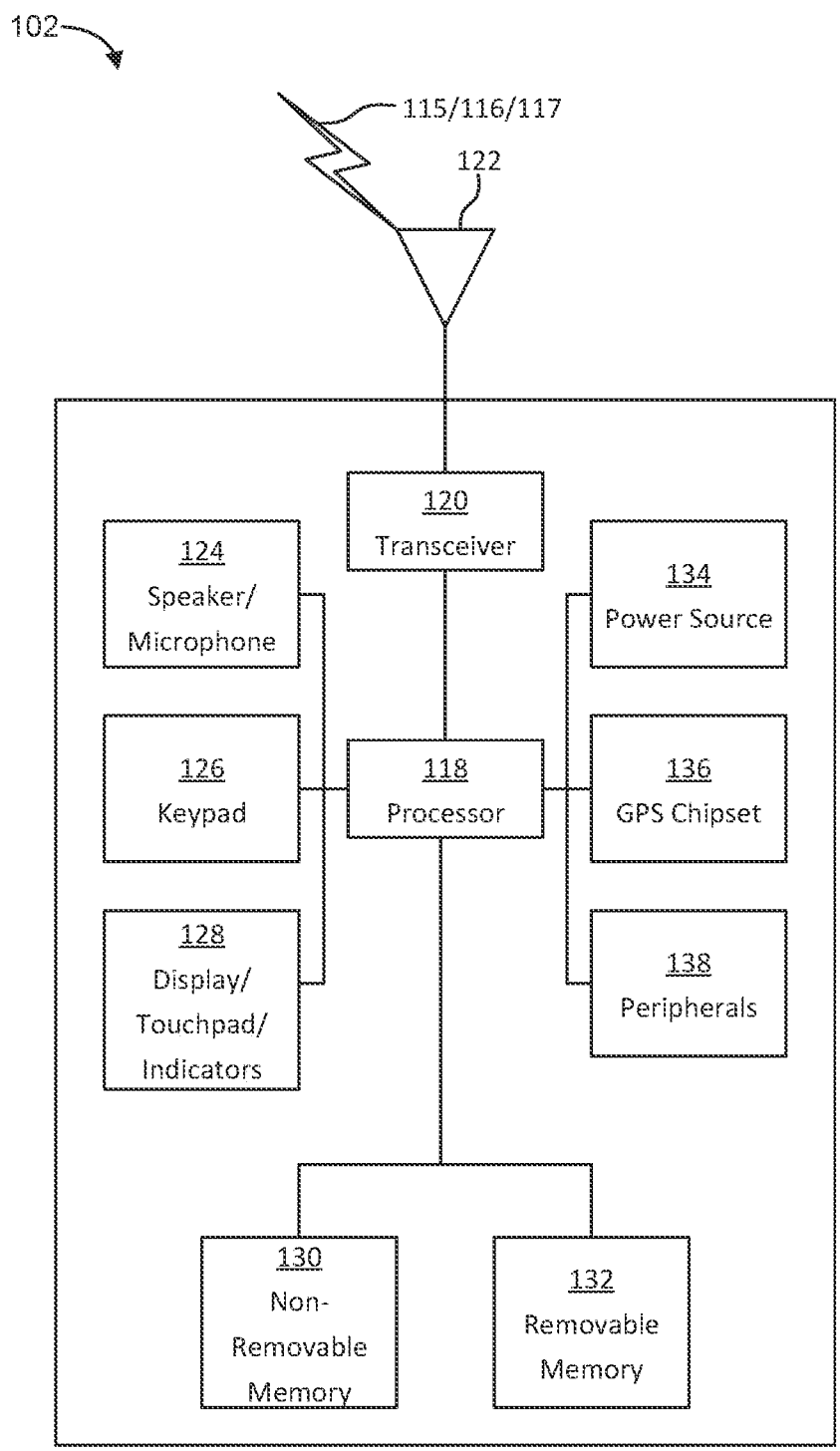
FIG. 1B is a block diagram of an example apparatus or device configured for wireless communications in accordance with the embodiments illustrated herein.

FIG. 1B is a block diagram of an example apparatus or device configured for wireless communications in accordance with the embodiments illustrated herein, such as for example, a WTRU 102. As shown in FIG. 1B, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, a next generation node-B (gNode-B), and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 of a UE may be configured to transmit signals to, or receive signals from, a base station (e.g., the base station 114a) over the air interface 115/116/117 or another UE over the air interface 115d/116d/117d. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet an embodiment, the transmit/receive element 122 may be configured to transmit and receive both RF and light signals. It will be appreciated that the transmit/receive element 122 may be configured to transmit and/or receive any combination of wireless or wired signals.

In addition, although the transmit/receive element 122 is depicted in FIG. 1B as a single element, the WTRU 102 may include any number of transmit/receive elements 122. More specifically, the WTRU 102 may employ MIMO technology. Thus, in an embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, for example NR and IEEE 802.11 or NR and E-UTRA, or to communicate with the same RAT via multiple beams to different RRHs, TRPs, RSUs, or nodes.

The processor 118 of the WTRU 102 may be coupled to, and may receive user input data from, the speaker/microphone 124, the keypad 126, and/or the display/touchpad/indicators 128 (e.g., a liquid crystal display (LCD) display unit or organic light-emitting diode (OLED) display unit. The processor 118 may also output user data to the speaker/microphone 124, the keypad 126, and/or the display/touchpad/indicators 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In an embodiment, the processor 118 may access information from, and store data in, memory that is not physically located on the WTRU 102, such as on a server that is hosted in the cloud or in an edge computing platform or in a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or an airplane. The WTRU 102 may connect to other components, modules, or systems of such apparatuses or devices via one or more interconnect interfaces, such as an interconnect interface that may comprise one of the peripherals 138.

Figure 1C:
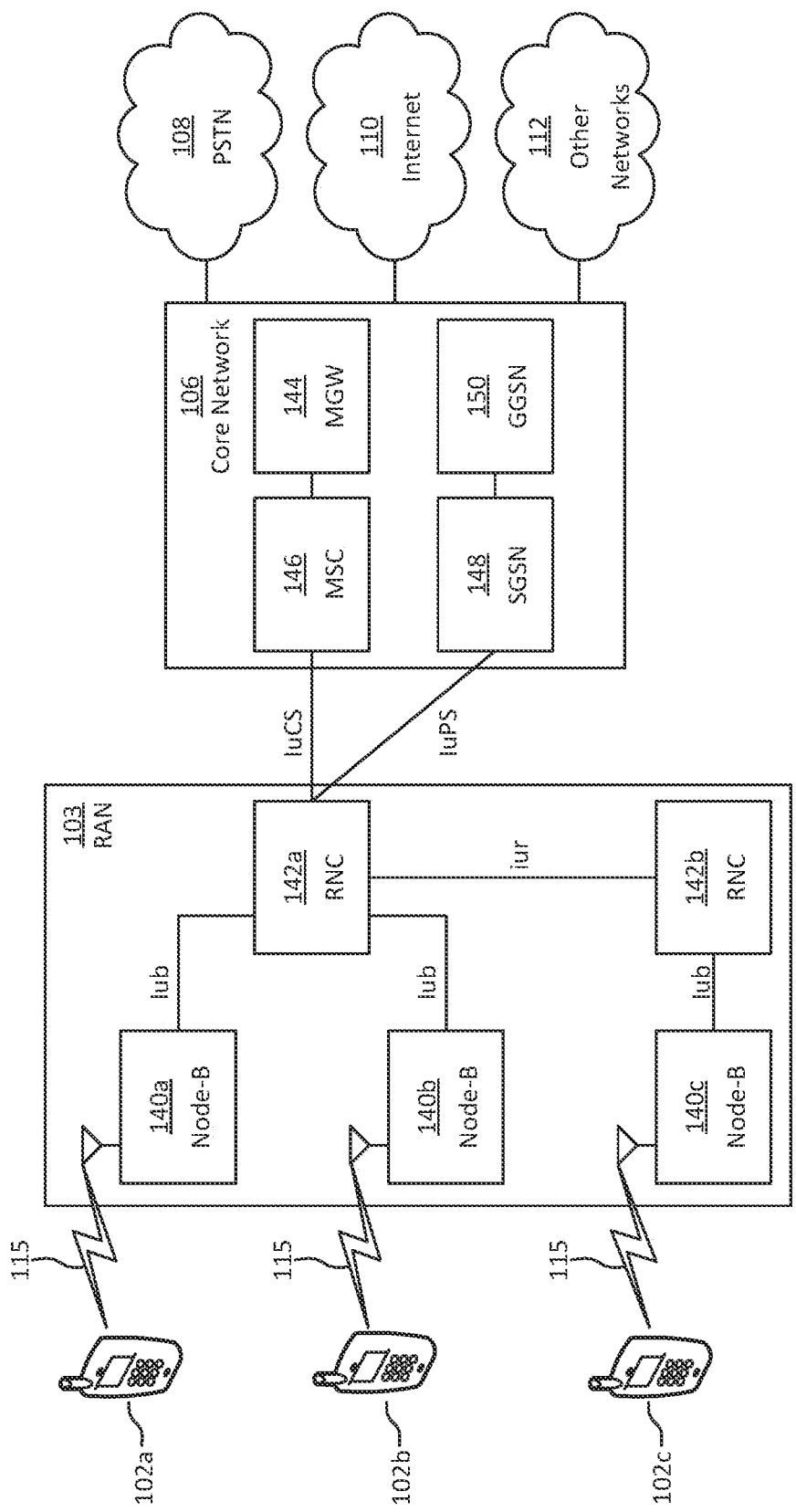
FIG. 1C is a system diagram of an example radio access network (RAN) and core network in accordance with an embodiment.

FIG. 1C is a system diagram of the RAN 103 and the core network 106 according to an embodiment. As noted above, the RAN 103 may employ a UTRA radio technology to communicate with the WTRUs 102a, 102b, and 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macro-diversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the other networks 112, which may include other wired or wireless networks that are owned and/or operated by other service providers.

Figure 1D:
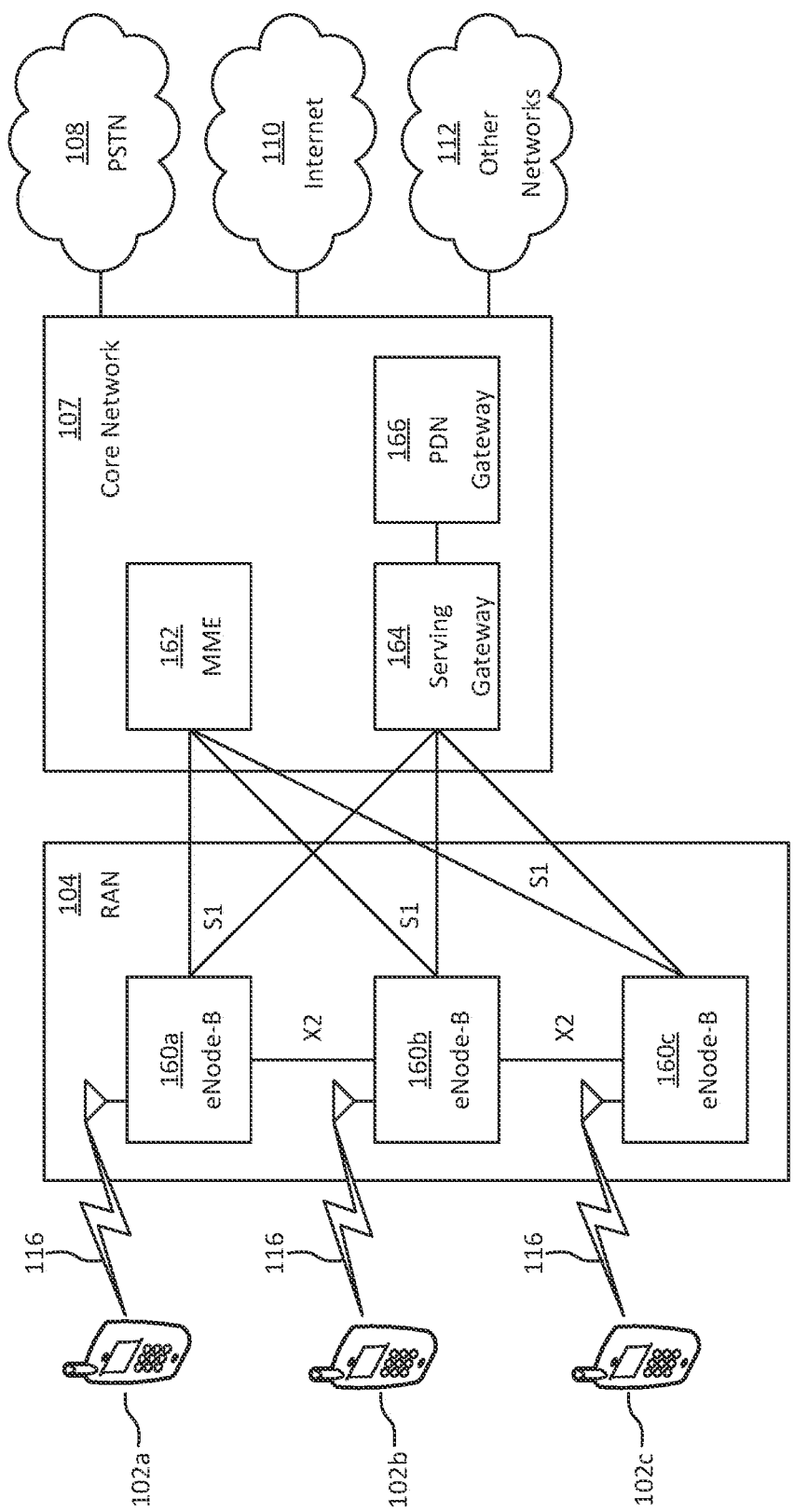
FIG. 1D is another system diagram of a RAN and core network according to another embodiment.

FIG. 1D is a system diagram of the RAN 104 and the core network 107 according to an embodiment. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In an embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink and/or downlink, and the like. As shown in FIG. 1D, the eNode-Bs 160a, 160b, 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 1E:
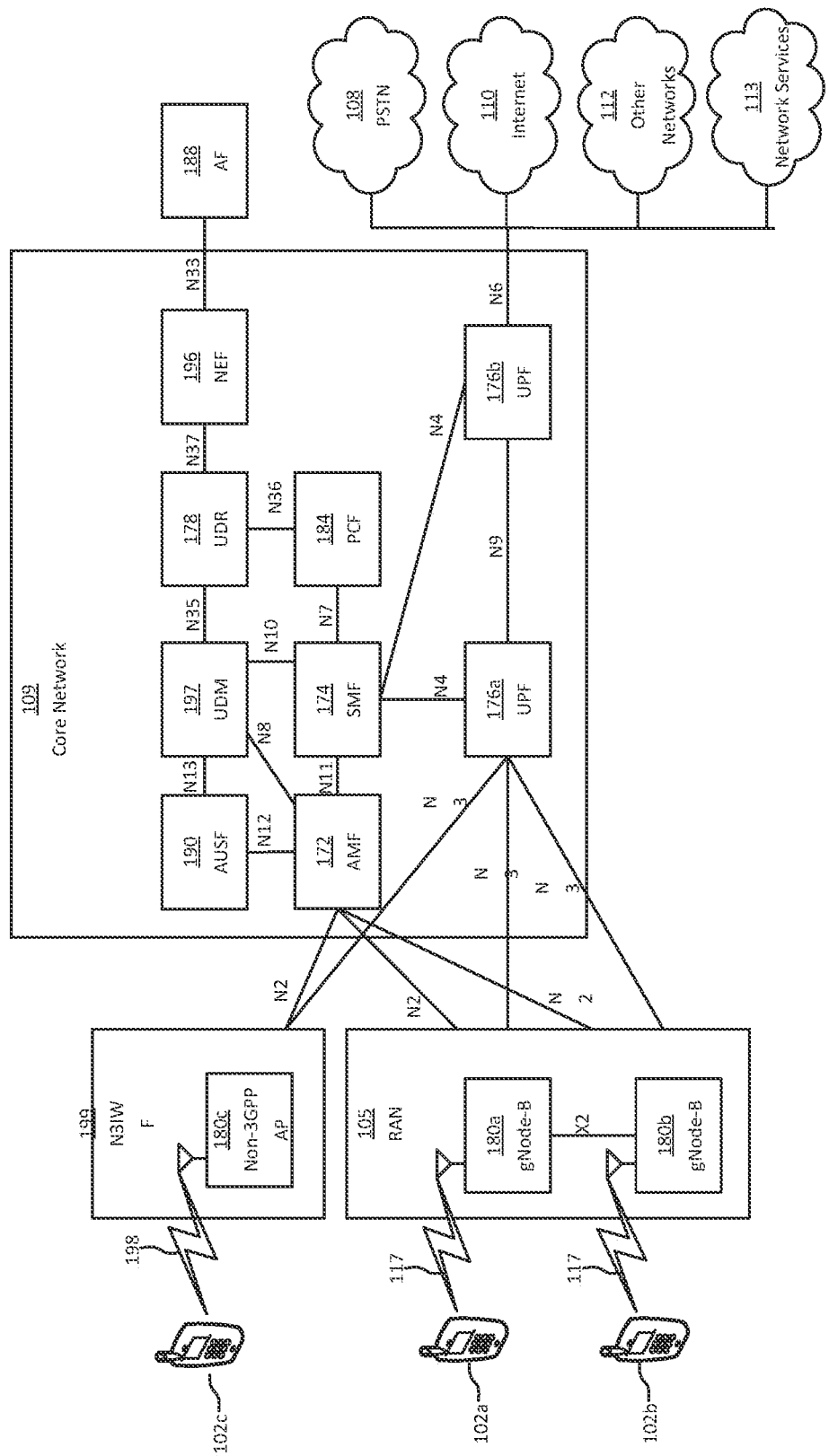
FIG. 1E is another system diagram of a RAN and core network according to another embodiment.

FIG. 1E is a system diagram of the RAN 105 and the core network 109 according to an embodiment. The RAN 105 may employ an NR radio technology to communicate with the WTRUs 102a and 102b over the air interface 117. The RAN 105 may also be in communication with the core network 109. The N3IWF 199 may employ a non-3GPP radio technology to communicate with the WTRU 102c over the air interface 198. The N3IWF 199 may also be in communication with the core network 109.

The RAN 105 may include gNode-Bs 180a and 180b though it will be appreciated that the RAN 105 may include any number of gNode-Bs while remaining consistent with an embodiment. The gNode-Bs 180a and 180b may each include one or more transceivers for communicating with the WTRUs 102a and 102b over the air interface 117. In an embodiment that uses an integrated access and backhaul connection, the same air interface may be used between the WTRUs and gNode-Bs which may be the core network 109 via one or multiple gNBs. In an embodiment, the gNode-Bs 180a and 180b may implement MIMO, MU-MIMO, and/or digital beamforming technology. Thus, the gNode-B 180a, for example, may use multiple antennas to transmit wireless signals to, and receive wireless signals from, the WTRU 102a. It should be appreciated that the RAN 105 may employ of other types of base stations such as an eNode-B. It should also be appreciated the RAN 105 may employ more than one type of base station. For example, the RAN may employ eNode-Bs and gNode-Bs.

The N3IWF 199 may include a non-3GPP Access Point 180c though it will be appreciated that the N3IWF 199 may include any number of non-3GPP Access Points while remaining consistent with an embodiment. The non-3GPP Access Point 180c may include one or more transceivers for communicating with the WTRUs 102c over the air interface 198. In an embodiment, the non-3GPP Access Point 180c may use the 802.11 protocol to communicate with the WTRU 102c over the air interface 198.

Each of the gNode-Bs 180a and 180b may be associated with a particular cell (not shown) and may be configured to handle radio resource management decisions, handover decisions, scheduling of users in the uplink and/or downlink, and the like. As shown in FIG. 1E, the gNode-Bs 180a and 180b may communicate with one another over an Xn interface.

The core network 109 shown in FIG. 1E may be a 5G core network (5GC) The 5GC may offer numerous communication services to customers who are interconnected by the radio access network. The 5G Core Network 109 comprises a number of entities that perform the functionality of the core network. As used herein, the term "core network entity" or "network function" refers to any entity that performs one or more functionalities of a core network. It is understood that such core network entities may be logical entities that are implemented in the form of software (i.e., computer-executable instructions) stored in a memory of, and executing on a processor of, an apparatus configured for wireless and/or network communications or a computer system such as those illustrated in FIG. 1F.

As shown in FIG. 1E, the 5G Core Network 109 may include an access and mobility management function (AMF) 172, a session management function (SMF) 174, user plane functions (UPF) 176a and 176b, a user data management function (UDM) 197, an authentication server function (AUSF) 190, a Network Exposure Function (NEF) 196, a policy control function (PCF) 184, a non-3GPP interworking function (N3IWF) 199 an application function (AF) 188, a User Data Repository (UDR) 178. While each of the foregoing elements are depicted as part of the 5G core network 109, it will be appreciated that any one of these elements may be owned and/or operated by an entity other than the core network operator. It should also be appreciated that a 5G core network may not consist of all of these elements, may consist of additional elements, and may consist of multiple instances of each of these elements. FIG. 1E shows that network functions directly connect to one another, however, it should be appreciated that they may communicate via routing agents such as a diameter routing agent or message buses. Although FIG. 1E shows that connectivity between network functions is achieved via a set of interfaces, or reference points, it should be appreciated that network functions could be modeled, described, or implemented as a set of services that are invoked, or called, by other network functions or services. Invocation of a Network Function service may be achieved via a direct connection between network functions, an exchange of messaging on a message bus, calling a software function, etc.

The AMF 172 may be connected to the RAN 105 via an N2 interface and may serve as a control node. For example, the AMF 172 may be responsible for registration management, connection management, reachability management, access authentication, access authorization. The AMF may be responsible forwarding user plane tunnel configuration information to the RAN 105 via the N2 interface. The AMF 172 may receive the user plane tunnel configuration information from the SMF via an N11 interface. The AMF 172 may generally route and forward NAS packets to/from the WTRUs 102a, 102b, 102c via an N1 interface. The N1 interface is not shown in FIG. 1E.

The SMF 174 may be connected to the AMF 172 via an N11 interface, may be connected to a PCF 184 via an N7 interface, and may be connected to the UPF 176 via an N4 interface. The SMF 174 may serve as a control node. For example, the SMF 174 may be responsible for Session Management, IP address allocation for the WTRUs 102a, 102b, 102c, management and configuration of traffic steering rules in the UPF 176a and UPF 176b, and generation of downlink data notifications to the AMF 172.

The UPF 176a and UPF 176b may provide the WTRUs 102a, 102b, 102c with access to a packet data network (DN), such as the Internet 110, to facilitate communications between the WTRUs 102a, 102b, 102c and other devices. The UPF 176a and UPF 176b may also provide the WTRUs 102a, 102b, 102c with access to other types of packet data networks. For example, Other Networks 112 may be Ethernet Networks or any type of network that exchanges packets of data. The UPF 176a and UPF 176b may receive traffic steering rules from the SMF 174 via the N4 interface. The UPF 176a and UPF 176b may provide access to a packet data network by connecting a packet data network with an N6 interface or by connecting to other UPFs via an N9 interface. In addition to providing access to packet data networks, the UPF 176 may be responsible packet routing and forwarding, policy rule enforcement, quality of service handling for user plane traffic, downlink packet buffering.

The AMF 172 may also be connected to the N3IWF 199 via an N2 interface. The N3IWF facilities a connection between the WTRU 102c and the 5G core network 170 via radio interface technologies that are not defined by 3GPP. The AMF may interact with the N3IWF 199 in the same, or similar, manner that it interacts with the RAN 105.

The PCF 184 may be connected to the SMF 174 via an N7 interface, connected to the AMF 172 via an N15 interface, and connected to an application function (AF) 188 via an N5 interface. The N15 and N5 interfaces are not shown in FIG. 1E. The PCF 184 may provide policy rules to control plane nodes such as the AMF 172 and SMF 174, allowing the control plane nodes to enforce these rules. The PCF 184, may send policies to the AMF 172 for the WTRUs 102a, 102b, 102c so that the AMF may deliver the polices to the WTRUs 102a, 102b, 102c via an N1 interface. Polices may then be enforced, or applied, at the WTRUs 102a, 102b, 102c.

The UDR 178 acts as a repository for authentication credentials and subscription information. The UDR may connect to Network Functions so that Network Function can add to, read from, and modify the data that is in the repository. For example, the UDR 178 may connect to the PCF 184 via an N36 interface, the UDR 178 may connect to the NEF 196 via an N37 interface, and the UDR 178 may connect to the UDM 197 via an N35 interface.

The UDM 197 may serve as an interface between the UDR 178 and other Network Functions. The UDM 197 may authorize Network Functions access of the UDR 178. For example, the UDM 197 may connect to the AMF 172 via an N8 interface, the UDM 197 may connect to the SMF 174 via an N10 interface, and the UDM 197 may connect to the AUSF 190 via an N13 interface. The UDR 178 and UDM 197 may be tightly integrated.

The AUSF 190 performs authentication related operations and connects to the UDM 178 via an N13 interface and to the AMF 172 via an N12 interface.

The NEF 196 exposes capabilities and services in the 5G core network 109 to Application Functions 188. Exposure occurs on the N33 API interface. The NEF may connect to an AF 188 via an N33 interface and it may connect to other network functions in order to expose the capabilities and services of the 5G core network 109.

Application Functions 188 may interact with network functions in the 5G Core Network 109. Interaction between the Application Functions 188 and network functions may be via a direct interface or may occur via the NEF 196. The Application Functions 188 may be considered part of the 5G Core Network 109 or may be external to the 5G Core Network 109 and deployed by enterprises that have a business relationship with the mobile network operator.

Network Slicing is a mechanism that could be used by mobile network operators to support one or more 'virtual' core networks behind the operator's air interface. This involves 'slicing' the core network into one or more virtual networks to support different RANs or different service types running across a single RAN. Network slicing enables the operator to create networks customized to provide optimized solutions for different market scenarios which demands diverse requirements, e.g. in the areas of functionality, performance and isolation.

3GPP has designed the 5G core network to support Network Slicing. Network Slicing is a good tool that network operators can use to support the diverse set of 5G use cases (e.g., massive IoT, critical communications, V2X, and enhanced mobile broadband) which demand very diverse and sometimes extreme requirements. Without the use of Network Slicing techniques, it is likely that the network architecture would not be flexible and scalable enough to efficiently support a wider range of use cases need when each use case has its own specific set of performance, scalability and availability requirements. Furthermore, introduction of new network services should be made more efficient.

In a network slicing scenario, a WTRU 102a, 102b, 102c may connect to an AMF 172, via an N1 interface. The AMF may be logically part of one or more slices. The AMF may coordinate the WTRU's connection or communication with one or more UPF(s) 176, SMF(s) 174, and other Network Functions. Each of the UPF(s) 176, SMF(s) 174, and other Network Functions may be part of different or the same slices. When they are part of different slices, they may be isolated from each other in the sense that they may utilize different computing resources, security credentials, etc.

The 5G core network 109 may facilitate communications with other networks. For example, the 5G core network 109 may include, or may communicate with, an IP gateway (e.g., an IP multimedia subsystem (IMS) server) that serves as an interface between the 5G core network 109 and the PSTN 108. For example, the core network 109 may include, or communicate with a short message service (SMS) service center that facilities communication via the short message service. For example, the 5G core network 109 may facilitate the exchange of non-IP data packets between the WTRUs 102a, 102b, 102c and servers or applications functions 188. In addition, the core network 170 may provide the WTRUs 102a, 102b, 102c with access to the networks 112, which may include other wired or wireless networks that are owned and/or operated by other service providers.

The core network entities described herein and illustrated in FIGS. 1A, 1C, 1D, and 1E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIGS. 1A, 1B, 1C, 1D, and 1E are provided by way of example only, and it is understood that the subject matter disclosed and claimed herein may be embodied or implemented in any similar communication system, whether presently defined or defined in the future.

Figure 1F:
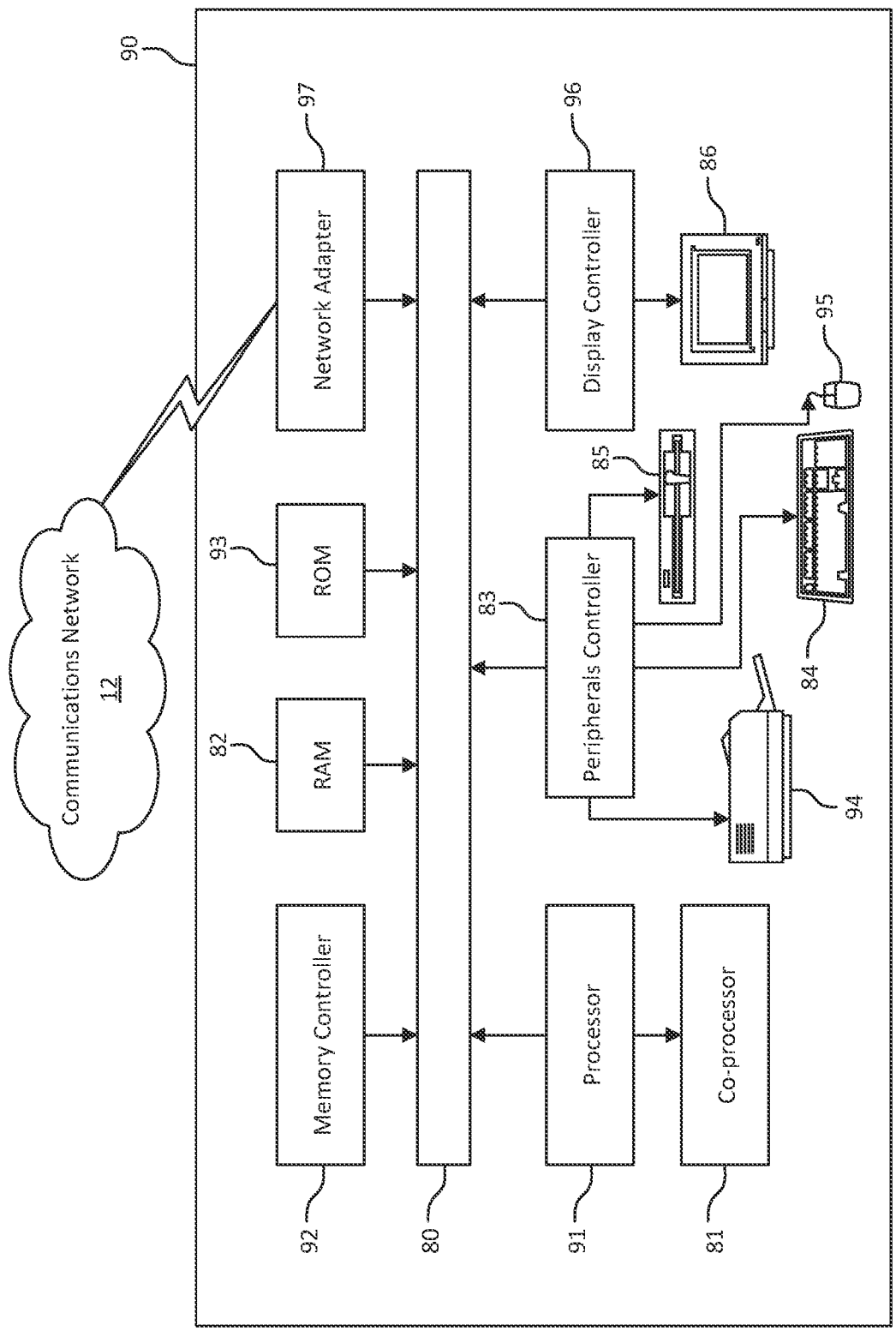
FIG. 1F is a block diagram of an exemplary computing system 90 in which one or more apparatuses of the communications networks illustrated in FIGS. 1A, 1C, 1D and 1E may be embodied.

FIG. 1F is a block diagram of an exemplary computing system 90 in which one or more apparatuses of the communications networks illustrated in FIGS. 1A, 1C, 1D and 1E may be embodied, such as certain nodes or functional entities in the RAN 103/104/105, Core Network 106/107/109, PSTN 108, Internet 110, Other Networks 112, or Network Services 113. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, and/or any other functionality that enables the computing system 90 to operate in a communications network. Coprocessor 81 is an optional processor, distinct from main processor 91, that may perform additional functions or assist processor 91. Processor 91 and/or coprocessor 81 may receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by processor 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a wireless or wired network adapter 97, that may be used to connect computing system 90 to an external communications network or devices, such as the RAN 103/104/105, Core Network 106/107/109, PSTN 108, Internet 110, WTRUs 102, or Other Networks 112 of FIGS. 1A, 1B, 1C, 1D, and 1E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

Figure 1G:
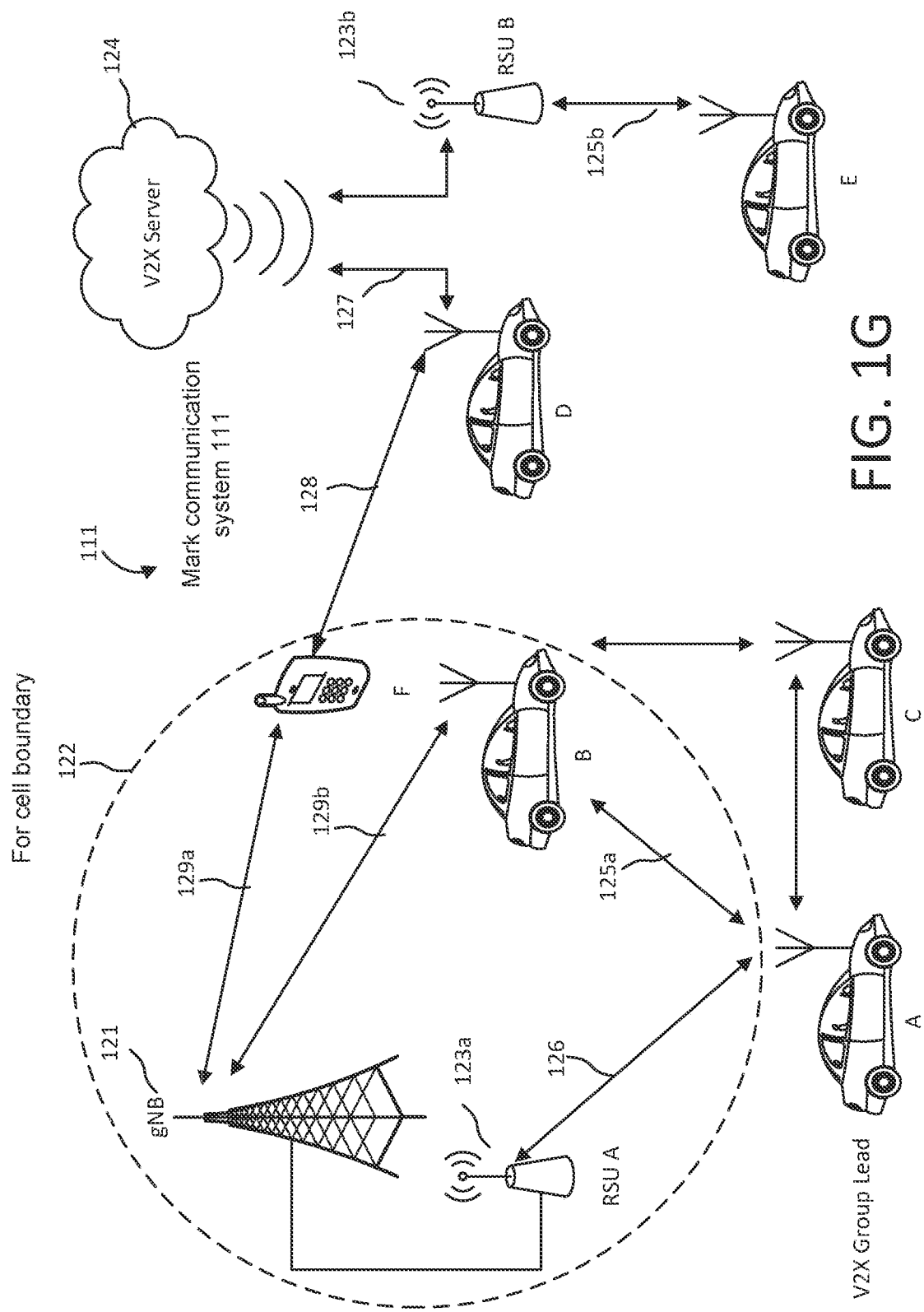
FIG. 1G is a block diagram of an example communications system.

FIG. 1G illustrates one embodiment of an example communications system 111 in which the methods and apparatuses described and claimed herein may be embodied. As shown, the example communications system 111 may include wireless transmit/receive units (WTRUs) A, B, C, D, E, F, a base station gNB 121, a V2X server 124, and RSU A 123a and B 123b, though it will be appreciated that the disclosed embodiments contemplate any number of WTRUs, base station gNBs, V2X networks, and/or network elements. One or several or all WTRUS A, B, C, D, E may be out of range of the access network coverage 122. WTRUs A, B, C form a V2X group, among which WTRU A is the group lead and WTRUs B and C are group members. WTRUs A, B, C, D, E, F may communicate among them over Uu interface 129b if under the access network coverage or Sidelink (PC5 or NR PC5) interface 125b if under or out of the access network coverage. WTRUs A, B, C, D, E, F may communicate to an RSU via a vehicle-to-network (V2N) 126 or Sidelink interface 125b. WTRUs A, B, C, D, E, F may communicate to a V2X Server 124 via a vehicle-to-infrastructure (V2I) interface 127. WTRUs A, B, C, D, E, F may communicate to another UE via a vehicle-to-person (V2P) interface 128.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform and/or implement the systems, methods and processes described herein. Specifically, any of the steps, operations or functions described herein may be implemented in the form of such computer executable instructions, executing on the processor of an apparatus or computing system configured for wireless and/or wired network communications. Computer readable storage media includes volatile and nonvolatile, removable and non-removable media implemented in any non-transitory (e.g., tangible or physical) method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computing system.

2. Relevant Background Information

Figure 2:
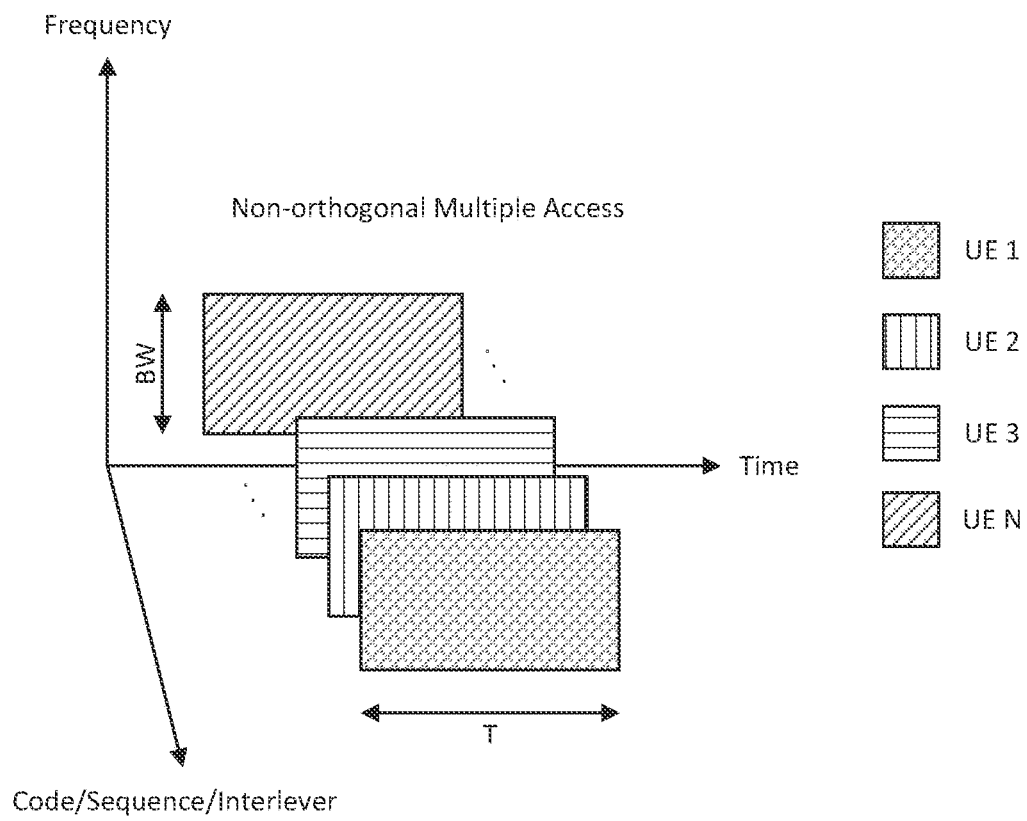
FIG. 2 shows an example diagram of a NOMA scheme.

In the NR NOMA phase 1 study, fifteen NOMA schemes have been proposed, mainly targeting UL transmissions to support massive connectivity. Since multiple users may be multiplexing at a given time-frequency resource in NOMA (as shown in FIG. 2), for the evaluated scenarios, the results show significant benefit of non-orthogonal multiple access in terms of UL link-level sum throughput and overloading capability, as well as system capacity enhancement in terms of supported packet arrival rate at given system outage. For non-orthogonal multiple access, there may be interference between transmissions using overlapping resources. As the system load increases (e.g., more NOMA UEs share or overlap the resources), this non-orthogonal characteristic (interference between transmissions) is more pronounced. To combat the interference between non-orthogonal transmissions, transmitter side schemes such as spreading (linear or non-linear, with or without sparseness) and interleaving may be employed to improve the performance and ease the burden of advanced receivers.

One difference between the proposed NOMA schemes is the Multiple Access (MA) signature used to enable the non-orthogonal transmission. Based on the MA signature used, the NR NOMA candidate schemes can be categorized as three major types:
- Codebook based (see R1-1720607, Huawei, "Discussion on NoMA study for Rel-15 SI," November, 2017);
- Sequence based (see R1-164269, "Contention-Based Non-Orthogonal Multiple Access for UL mMTC," May 2016); and
- Interleaver or scrambling based (see Li Ping, Lihai Liu, Keying Wu, and W. K. Leung, "Interleave-Division Multiple-Access," IEEE Trans. on Wireless Comm., vol. 5, no. 4, pp. 938-947, April 2006).

In the NR NOMA phase 2 study, many use cases for NOMA are proposed. For all the three major usage scenarios URLLC, mMTC and eMBB identified in NR, NOMA is proposed to be adopted in 5G NR. For each use scenario, the benefits can be summarized as follows:
- In the mMTC use scenario, the benefits of adopting NOMA include providing higher connection density per physical resource with high overloading, reducing latency, and signaling overhead and power consumption by enabling grant-free access;
- In the URLLC use scenario, NOMA enables efficient use of grant-free transmission and therefore benefits URLLC low latency use cases. The benefits of adopting NOMA also include improving the efficiency of the resource utilization, providing higher reliability through diversity gain achieved by spreading and coding, enhancing the robustness to collision by carefully designing the MA signature, and providing the ability to multiplex mixed traffic types; and
- In the eMBB use scenario, the benefits of adopting NOMA include efficient resource utilization, larger capacity region by non-orthogonal user multiplexing, robustness to fading and interference with code-domain design, and higher cell throughput and efficient link adaptation with relaxed CSI accuracy.

In NR, UCI piggybacked on PUSCH is supported for both DFT-s-OFDM waveform and CP-OFDM waveform and the same UCI resource mapping principles may be used for PUSCH with DFT-s-OFDM waveform and CP-OFDM waveform for frequency first mapping.

The piggybacked UCI includes HARQ-ACK, CSI part 1 and CSI part 2. For slot-based scheduling, different piggyback rules may be defined for HARQ-ACK with different lengths. When HARQ-ACK is more than 2 bits, PUSCH may be rate matched and the UL-SCH may perform rate matching around the REs piggybacking the HARQ-ACK. When HARQ-ACK is less than or equal to 2 bits, PUSCH may be punctured (e.g., the UL-SCH is first mapped to all the available resources and then the HARQ-ACK punctures the UL-SCH in some reserved Res). To utilize the frequency gain, both HARQ-ACK and CSI may be distributed mapped to the REs across all the allocated PRBs. Different to LTE, both HARQ-ACK and CSI may be mapped to all layers of the TB (Transport Block) on PUSCH in NR. Another difference is, instead of a fixed QPSK modulation in LTE, the modulation order of UCI in NR follows the modulation order of UL-SCH.

In NR, the piggybacked UCI is only mapped after the front-loaded DMRS symbol. Within the symbol carrying the DMRS, no FDM is allowed. Starting from the first available non-DMRS symbol after the front-loaded DMRS symbol(s), HARQ-ACK may be firstly mapped if it is piggybacked. If the remaining HARQ-ACK can fill one entire allocated symbol, then it may occupy the whole symbol. Otherwise, the HARQ-ACK may be evenly distributed mapped in the allocated resources in that symbol.

CSI part 1 is mapped with a same rule as HARQ-ACK if it is piggybacked. When both HARQ-ACK and CSI part 1 are piggybacked, CSI part 1 may not mapped on the REs already piggybacking the HARQ-ACK for both >2 bits and ≤2 bits two scenarios. For the symbol carrying the HARQ-ACK but not fully occupied, CSI part 1 is first mapped to the unused REs and then mapped to the following symbols.

For CSI part 2, the same rules as CSI part 1 is applied except when the HARQ-ACK is ≤2 bits, i.e., PUSCH is punctured. In this scenario, CSI part 2 can be mapped on the reserved HARQ-ACK Res for puncturing and then let the HARQ-ACK puncture the CSI part 2 if it is piggybacked.

3. Example Problem Statements

Example Problem 1: A UE may operate in both orthogonal multiple access (OMA) operation and non-orthogonal multiple access (NOMA) modes for uplink transmission. Depending on the service and/or network traffic conditions, a UE may switch between the modes. The signaling and procedure to switch between the OMA and NOMA modes needs to be designed appropriately to support efficient operation of NOMA or OMA in NR.

Example Solution: Switching between OMA (Orthogonal Multiple Access) and NOMA (Non-Orthogonal Multiple Access) can be determined and indicated by gNB to a UE at RRC connected state with the following schemes:
- At RRC (Radio Resource Control) layer with RRC configuration message;
- At MAC (Medium Access Control) layer with MAC CE (MAC control element) signaling;
- At PHY (Physical) layer with DCI (Downlink Control Information) signaling;
- Jointly with RRC configuration and DCI signaling; and
- Jointly with RRC configuration and MAC signaling.

Switching between OMA and NOMA can be requested by a UE at RRC connected state.

Switching between OMA and NOMA can be requested by a UE when the UE is transferring from RRC inactive state to RRC connected state with the following schemes:
Requested by UE;
Indicated by gNB; and
Rules for OMA/NOMA switching.

Example Problem 2: In NR, both grant-based uplink NOMA and grant-free uplink NOMA may be supported. NR may need to have mechanisms to support the signaling of the parameters for NOMA.

A Multiple access (MA) signature may be essential for a UE since it may be used to generate a sequence to allow the transmitting UEs to be distinguished by the gNB. In grant-based UL NOMA, the gNB may indicate the MA signature used by a UE. Depending on the category of the NOMA scheme, the parameters in a MA signature may be different and the method to signal these parameters may also be different. Therefore, the design details of configuration for MA signature parameters may need to be addressed.

Example Solution: Multiple access signature signaling may be conducted by one or more of RRC messaging, MAC CE signaling, and DCI signaling.

Example Problem 3: In NR, if the scheduled UCI and uplink data are in the same slot with the same resources for a UE, the UCI may be piggybacked by the PUSCH carrying the UL-SCH. Different UCIs such as ACK/NACK, CSI part 1 and CSI part 2 have different piggybacking and mapping rules defined in NR.

In NOMA, multiple users may be multiplexed in the same resources. The UL transmission of one UE using NOMA may interfere with piggybacked UCI of another UE. Furthermore, if multiple users have UCIs to be piggybacked in the same time, the UCIs may be overlapped with each other based on the current mapping rule in NR system. Therefore, the piggyback rule may need to be reconsidered and mechanisms may need to be introduced to guarantee the reliability of the UCI.

Example Solution: A multiplexing rule for UCI (Uplink Control Information) piggybacked on PUSCH (Physical Uplink Shared Channel) is discussed herein. Also discussed herein are the following mechanisms to manage the interference to piggybacked UCIs caused by other NOMA UEs' data:
UCI multiplexing on PUSCH with higher rate matching rate or spreading; and
UCI multiplexing on PUSCH with reserved resources.

4.1 OMA or NOMA Mode Configuration and Switching

Disclosed herein are methods and systems for switching between Orthogonal Multiple Access (OMA) and Non-Orthogonal Multiple Access (NOMA) modes of a user equipment (UE). An example method may comprise determining that switching between an orthogonal multiple access (OMA) mode of a device and a non-orthogonal multiple access (NOMA) mode of the device is indicated by one of a Medium Access Control (MAC) Control Element (CE) MAC CE associated with the device or Downlink Control Information (DCI) associated with the device; determining, based on a signaling by the determined one of the MAC CE and the DCI, to operate the device in the OMA mode or the NOMA mode; and operating the device in the OMA mode or the NOMA mode.

The method may further comprise determining, prior to determining that the switching between the OMA mode of the device and a NOMA mode of the device is indicated by one of the MAC CE associated with the device or the DCI associated with the device, whether a Radio Resource Control (RRC) parameter of the device indicates that switching between the OMA mode of the device and the NOMA mode of the device is permitted. The method may further comprise determining, based on the RRC parameter of the device indicating that the switching between the OMA mode of the device and the NOMA mode of the device is not permitted, and based on information associated with the RRC parameter, whether the device is configured to operate in the OMA mode or the NOMA mode; and operating, based on the information associated with the RRC parameter, the device in the OMA mode or the NOMA mode.

The method may further comprise switching, at the device, from an RRC inactive state to an RRC connected state. Switching from the RRC inactive state to the RRC connected state may comprise: sending an RRC connection resume request message; receiving an RRC connection resume response message comprising an indication of whether the device is permitted to operate in the OMA mode or the NOMA mode; and operating the device in accordance with the connection resume response message. The RRC connection resume request message may comprise an indication of whether the device requests to operate in the OMA mode or the NOMA mode. Switching from the RRC inactive state to the RRC connected state may comprise: sending an RRC connection resume request message; receiving an RRC connection resume response message; determining that the RRC connection resume response message does not comprise an indication of whether the device is permitted to operate in the OMA mode or the NOMA mode; and operating the device in one of the OMA mode or the NOMA mode in accordance with at least one of a default state of the device or a previous state of the device.

4.1.1 OMA-NOMA Switching for a UE at RRC Connected State

Figure 3:
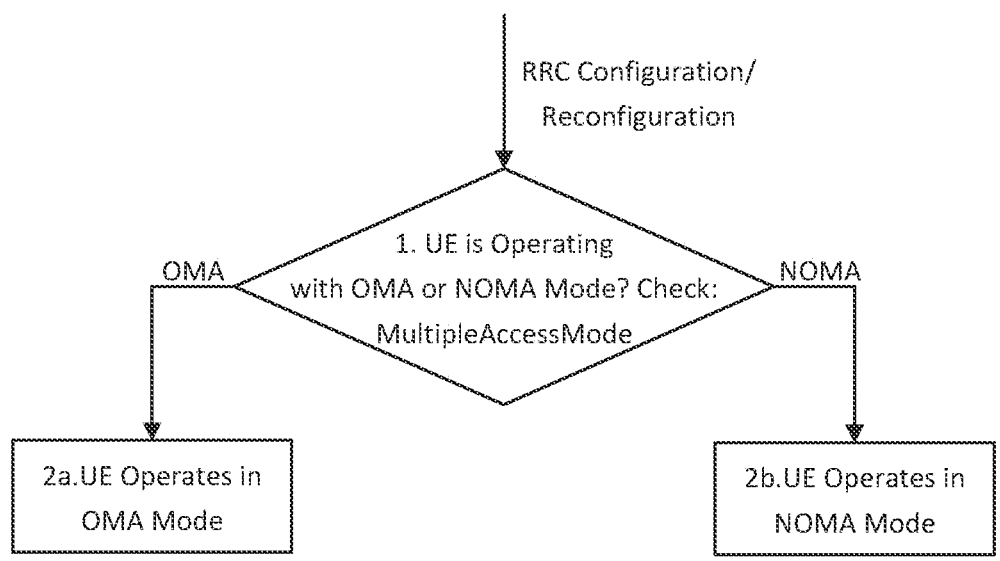
FIG. 3 shows an example flowchart of an OMA or NOMA mode configured by RRC only.

In NR, a UE needs to be aware of whether it is operating in OMA mode or NOMA mode before its uplink transmission. The mode of operation (e.g., OMA or NOMA) may be configured in one or more of the following ways:

Option 1: The OMA or NOMA mode may be configured by gNB via RRC message only, either using UE specific RRC or none UE specific RRC depending on the UE's RRC state. For example, the Multiple AccessMode IE in the RRC configuration message may be used to configure the multiple access mode for a UE or group of UEs. If a UE is configured with the RRC parameter Multiple AccessMode set to be 'OMA', then this UE may operate in OMA mode. If a UE is configured with the RRC parameter MultipleAccessMode set to be 'NOMA', then the UE may operate in NOMA mode. If both OMA and NOMA are indicated in the RRC parameter, then either MAC CE or DCI may indicate either OMA or NOMA for a specific time interval or a specific transmission. An example flow chart is illustrated in FIG. 3. The RRC parameter MultipleAccessMode may be configured with both the RRC-Configuration message at a UE's initial RRC connection stage and the RRC-Reconfiguration message after a UE's initial RRC connection stage. The UE may be configured with the MultipleAccessMode per BWP (Band Width Part) in each cell through UE specific RRC configuration or the UE may be configured with the Multiple AccessMode for all the BWPs of a cell through UE specific RRC configuration. The UE may also be configured with the Multiple AccessMode for different services such as eMBB, URLLC or mMTC.

An example of a Multiple AccessMode information element is shown in FIG. 4.

An example of a BandwidthPart.Config information element is shown in FIGS. 5A-5D.

Figure 6:
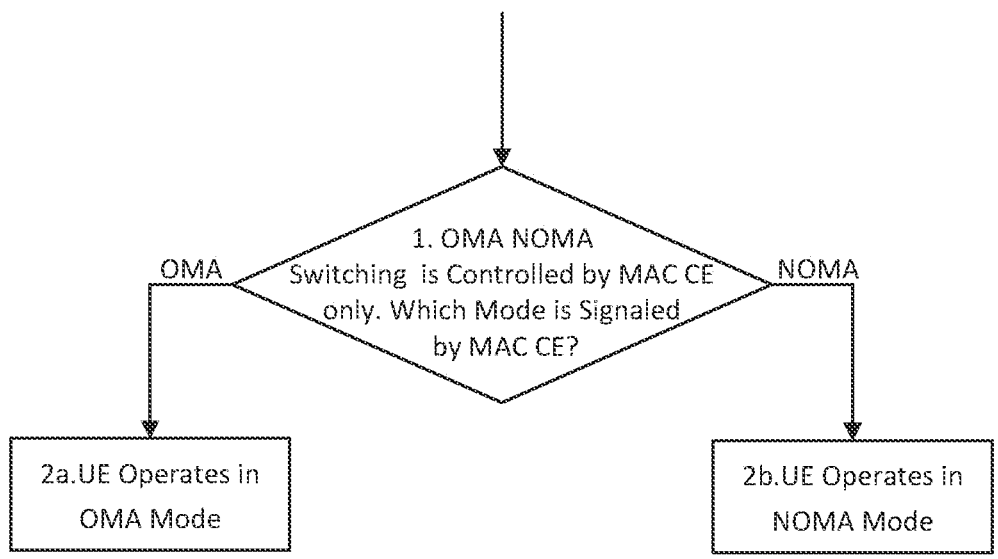
FIG. 6 shows an example flowchart of an OMA or NOMA mode configured by a MAC CE only.
Figure 7:
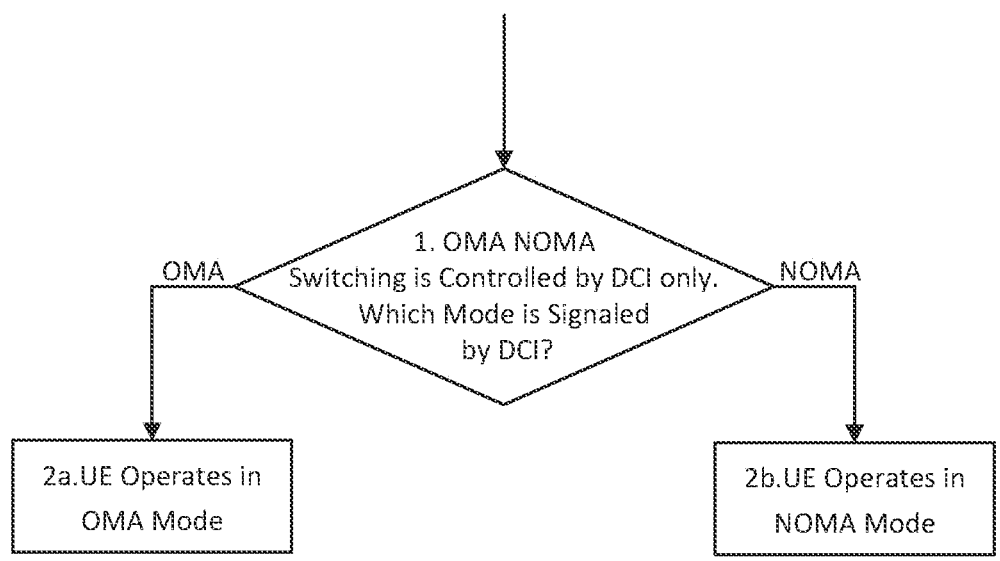
FIG. 7 shows an example flowchart of an OMA or NOMA mode configured by a DCI only.

Option 2: The switching/determination between OMA and NOMA modes may be signaled by MAC CE only. An example flow chart is illustrated in FIG. 6. A UE may determine whether to work in OMA mode or NOMA mode based on the MAC CE signaling Option 3: The switching/determination between OMA and NOMA modes may be signaled by DCI only. An example flow chart is illustrated in FIG. 7. A UE may determine whether to work in OMA mode or NOMA mode based on the DCI signaling with the following alternatives:

Alternative 1: gNB may explicitly signal the multiple access mode to UE. For example, a new field 'Multiple access mode indicator' may be introduced to DCI format 0_1 as defined in Table 1. If a UE is signaled by the DCI with the value of 'Multiple access mode indicator' set to '0', the UE may work in OMA mode. If a UE is signaled by the DCI with the value of 'Multiple access mode indicator' set to '1', the UE may work in NOMA mode.

TABLE 1

Example of Multiple access mode indicator

| Value of Multiple access mode indicator | Multiple access mode |
| --- | --- |
| 0 | OMA |
| 1 | NOMA |

Alternative 2: gNB may implicitly signal the multiple access mode to UE. For example, a new DCI format 0_k may be introduced for the scheduling of NOMA PUSCH in one cell. When a UE detects the received DCI's format is '0_k', the UE may work in NOMA mode. With another possibility, a UE may determine to work in NOMA mode when some NOMA related field(s) are being transmitted in the DCI format 0_0 and format 0_1. For example, a N bits MA signature may be filed.

Figure 8:
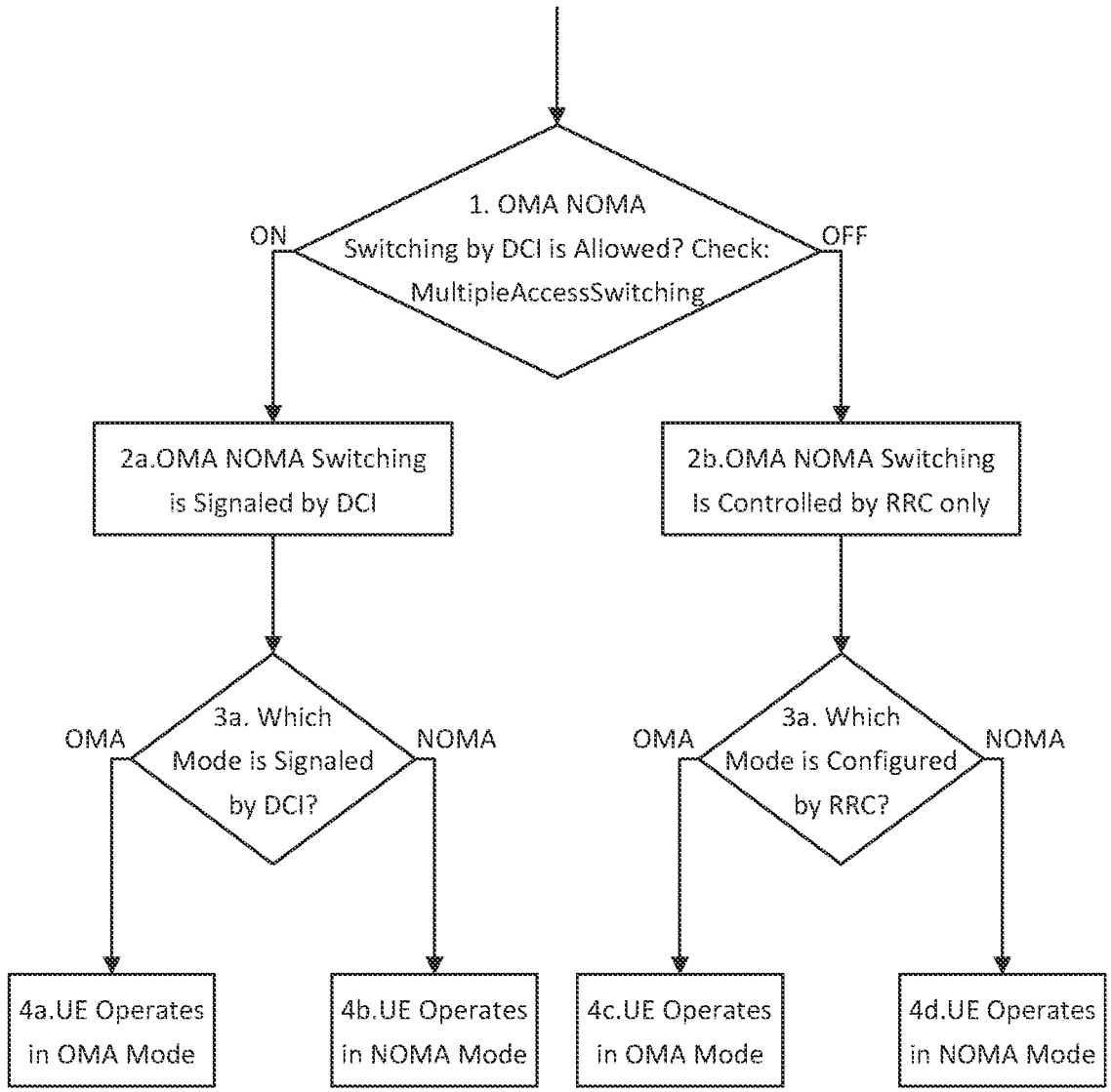
FIG. 8 shows an example flowchart of an OMA or NOMA mode configured by RRC and DCI.
Figure 10:
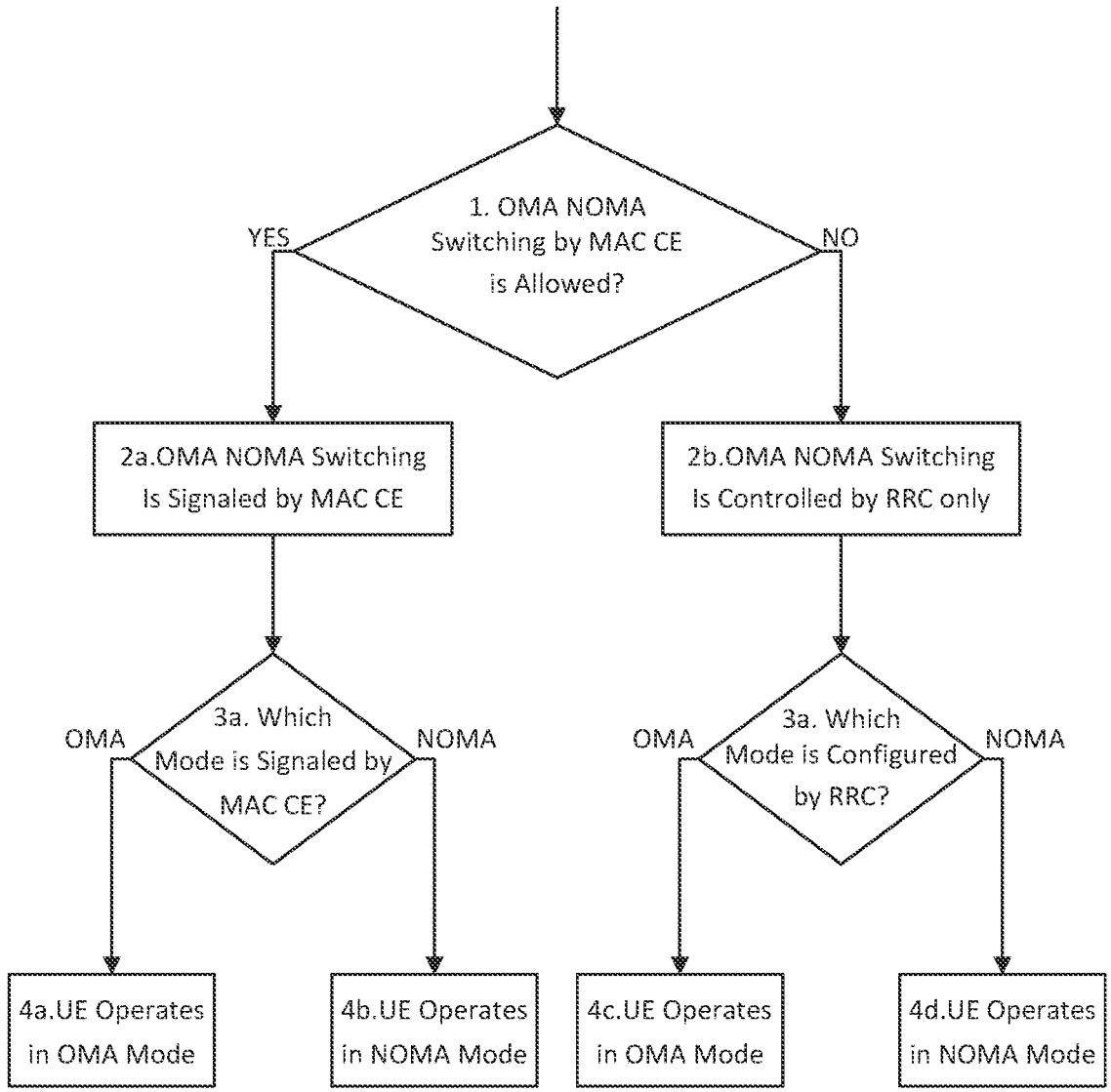
FIG. 10 shows an example flowchart of an OMA or NOMA mode jointly configured by RRC and MAC CE.

Option 4: The OMA or NOMA mode may be jointly configured by the RRC and DCI. As illustrated in FIG. 8. As an example, the RRC parameter MultipleAccessSwitching may be used to indicated whether DCI controlled-switching between OMA and NOMA is enabled or not for the UE configured with both NOMA and OMA with the RRC parameter Multiple AccessMode. The message Multiple AccessSwitching may be configured with both RRC-configuration or RRC-reconfiguration messages to a UE at its initial RRC connection stage or after its RRC connection stage, respectively.

If a UE is configured with RRC parameter MultipleAccessSwitching set to be 'OFF', the UE may determine the multiple access mode based on the RRC Multiple AccessMode. In this case, gNB may not indicate OMA-NOMA switching with DCI.

If a UE is configured with RRC MultipleAccessSwitching set to be 'ON', the UE may determine the multiple access mode based on gNB's DCI signaling with the following alternatives:

Alternative 1: gNB may explicitly signal the multiple access mode to UE. For example, a new field 'Multiple access mode indicator' may be introduced to DCI format 0_1 as defined in Table 1. Note, for a UE, if the RRC parameter Multiple AccessSwitching is set to be 'ON' the UE may determine to operate in OMA or NOMA mode via the DCI signaling and the DCI OMA or NOMA indication may override the OMA-NOMA configuration by RRC.

Alternative 2: gNB may implicitly signal the multiple access mode to UE. For example, a new DCI format 0_k or extended DCI format 0_1 may be introduced for scheduling of NOMA PUSCH in a BWP or a cell. When a UE detects the received DCI for scheduling a NOMA PUSCH, the UE may automatically operate in NOMA mode. DCI format 0_k may have a different length comparing to DCI format 0_1. In that case, a UE may monitor at most four candidate DCI lengths in each configured CORESET. The UE may drop the monitoring of certain DCI formats except format 0_k if the possible set of lengths exceeds four per CORESET. Additionally or alternatively, a UE may determine to operate in NOMA mode when the NOMA related field(s) is transmitted in the DCI format 0_1 (e.g., the extended DCI format 0_1). For example, a N bits MA (multiple access) signature field may be introduced (as shown in Table 2) with N=2 for simplifying the illustration. In this example, if a UE is signaled by the gNB with MA signature filed to be '00', the UE may work in OMA mode; if a UE is signaled by the gNB with MA signature filed to be '01', '10' or '11', the UE may work in NOMA mode and use the corresponding MA signature to generate the signal to be transmitted.

TABLE 2

Example MA signature filed with N = 2 and OMA NOMA switching implicitly indicated

| Value of MA filed | Multiple access signature |
| --- | --- |
| 00 | No multiple access signature |
| 01 | First MA signature configured by RRC or MAC CE |
| 10 | Second MA signature configured by RRC or MAC CE |
| 11 | Third MA signature configured by RRC or MAC CE |

FIG. 9 shows an example of a MultipleAccessSwitching information element.

Figure 11:
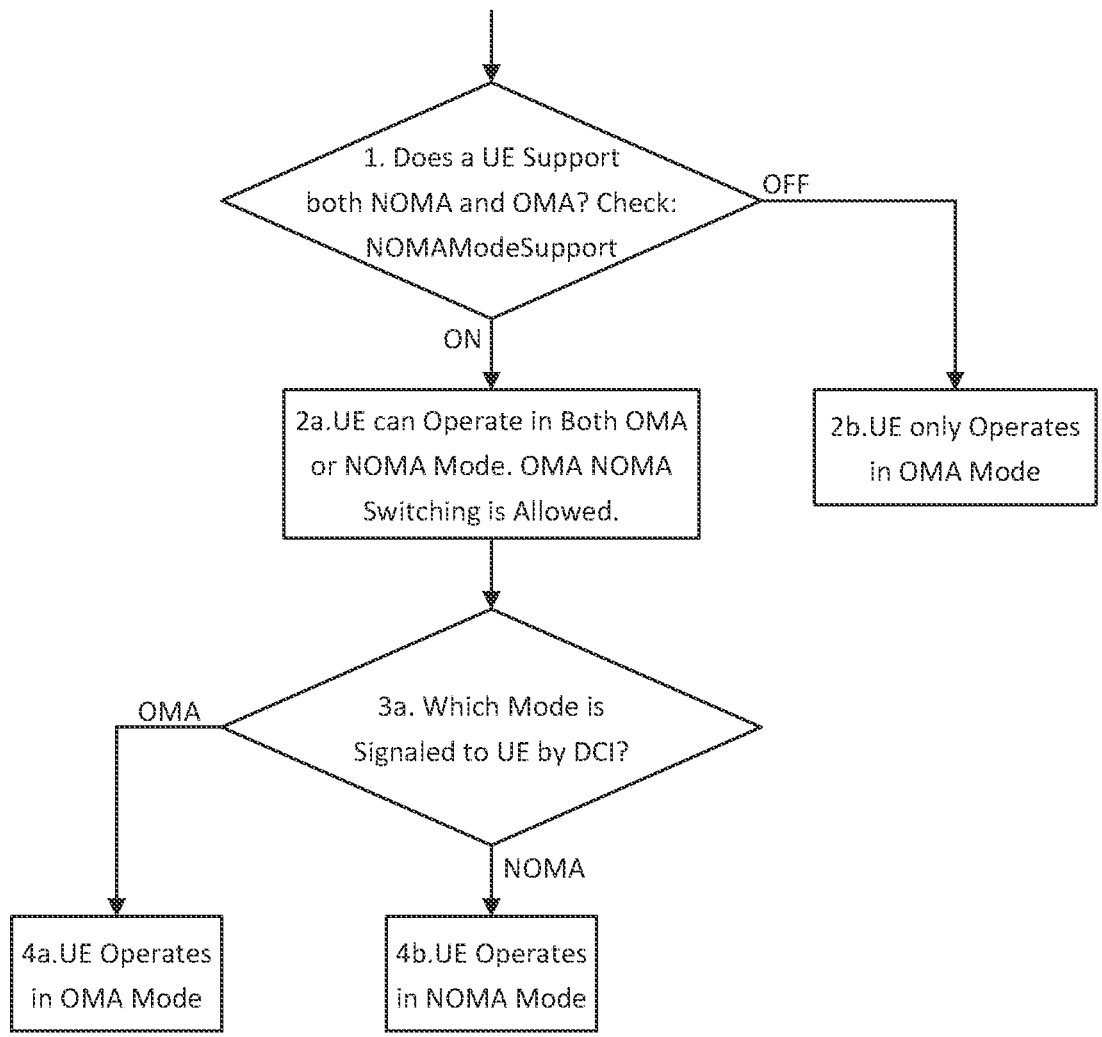
FIG. 11 shows an example flowchart of an OMA or NOMA mode configured by the RRC but scheduled via DCI.
Figure 13:
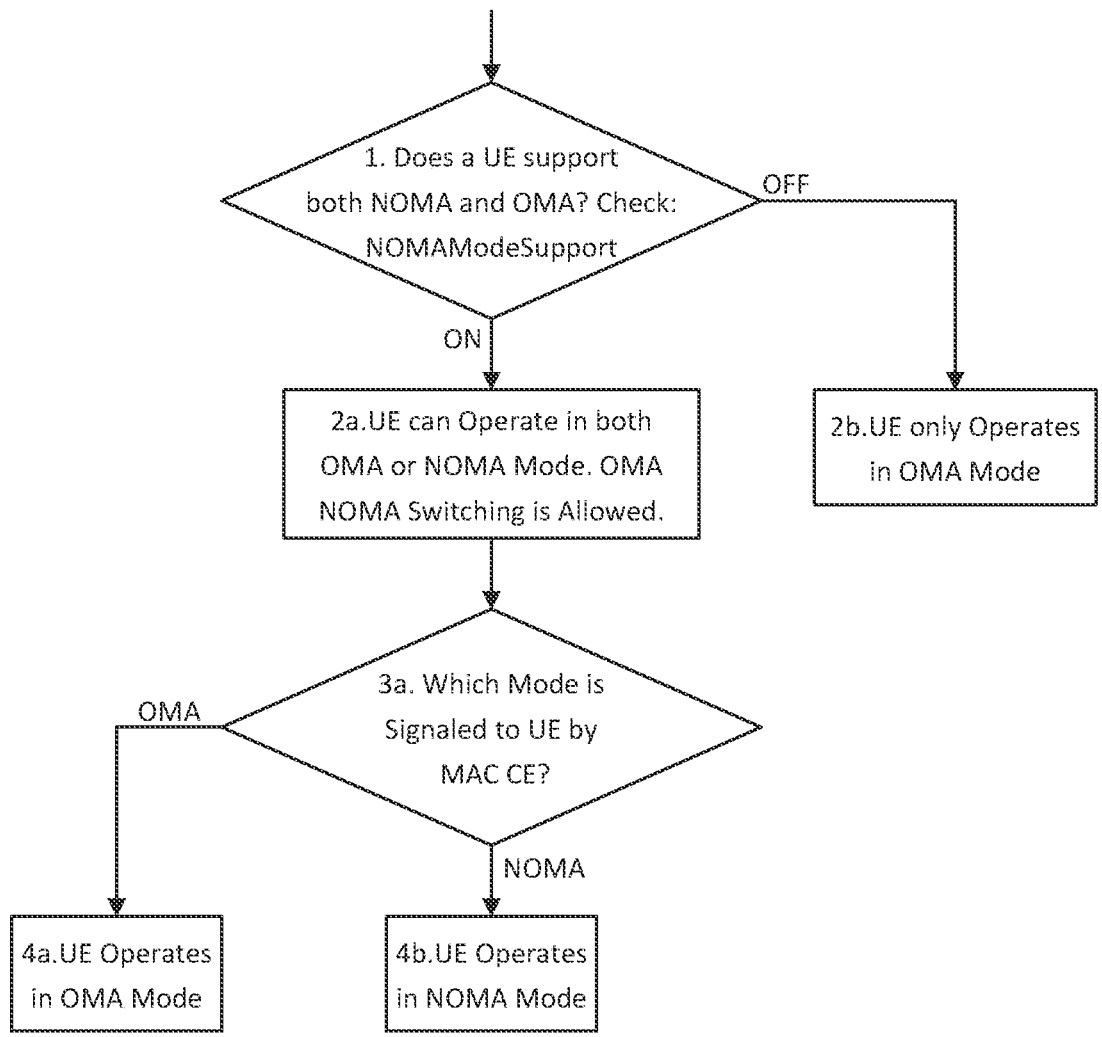
FIG. 13 shows an example flowchart of an OMA or NOMA mode configured by the RRC but scheduled via MAC CE.

Option 5: The OMA or NOMA mode may be jointly configured by the RRC and MAC CE, as illustrated in FIG. 7. As an example, the RRC parameter Multiple AccessSwitching may be used to indicated whether MAC CE controlled-switching between OMA and NOMA is enabled or not for the UE configured with both NOMA and OMA with RRC parameter MultipleAccessMode. If a UE is configured with MultipleAccessSwitching set to be 'on', the UE may determine the multiple access mode based on gNB's MAC CE signaling Option 6: The OMA or NOMA mode may be configured by the RRC but scheduled via DCI. An example flow chart is illustrated in FIG. 11. For example, the RRC parameter NOMAMode Support may be used to configure if the NOMA mode can be used by a UE where the RRC parameter NOMAMode Support may be configured in both RRC configuration or RRC reconfiguration messages for a UE at its initial RRC connection stage or after its initial RRC connection stage.

If a UE is configured with RRC parameter NOMAMode Support, set to be 'OFF', the UE may determine it may only work in OMA mode.

If a UE is configured with RRC parameter NOMAMode Support, set to be 'ON', the UE may work in either OMA mode or NOMA mode. The UE may determine the multiple access mode based on the implicit or explicit DCI signaling as discussed in the option 2.

An example of a NOMAMode Support information element is shown in FIG. 12.

Option 7: The OMA or NOMA mode may be configured by the RRC but scheduled via MAC CE. An example flow chart is illustrated in FIG. 9. The RRC parameter NOMAMode Support may be used to configure if NOMA mode can be used by a UE where the RRC parameter NOMAMode Support may be configured in both RRC configuration or RRC reconfiguration messages for a UE at its initial RRC connection stage or after its initial RRC connection stage.

If a UE is configured with RRC parameter NOMAModeSupport set to be 'OFF', the UE may determine it may only work in OMA mode.

If a UE is configured with RRC parameter NOMAMode Support set to be 'ON', the UE may work in either OMA mode or NOMA mode. The UE may determine the multiple access mode based on the MAC CE signaling.

Option 8: A UE may autonomously select whether to use NOMA or OMA. Dedicated NOMA resource pools and OMA resource pools may be configured to the UE (e.g., through RRC signaling). For example, in the case of NOMA, configured Resource Type 1-like as currently specified in Release 15 NR, but for NOMA only use, may be configured to the UE. The UE may autonomously perform mode selection between NOMA or OMA based on one or more of the following: (uplink) radio quality estimate by the UE, load level of NOMA or OMA resource pool, network slice or network slice type, QoS requirements attributes associated with the data to be transmitted such as one or more of the following: latency, reliability, 5QI (5G QoS Identifier), scheduling priority, allowed packet error rate, and default maximum data burst volume. The gNB may configure the UE with thresholds (e.g., for radio quality, resource pool load level, QoS related metrics) that the UE may use to decide on the use of NOMA or OMA.

A UE may send a request to initiate NOMA or OMA mode switching. A UE may send the switching request through UCI to request for switching from NOMA to OMA mode or vice versa. Once the gNB receives the request, it may make the decision and the UE may be signaled with the following options:

- A UE may be signaled to remain in its current working mode. The UE continues to work in mode configured before;
- A UE may be signaled to perform the OMA and NOMA mode switching as requested by it without new resources granted. The UE performs the OMA and NOMA mode switching and uses the resources configured before the transmission; and
- A UE may be signaled to do the OMA and NOMA mode switching as requested by it with new resources granted. The UE may perform the OMA and NOMA mode switching and uses the resources newly granted to do the transmission.

Figure 14:
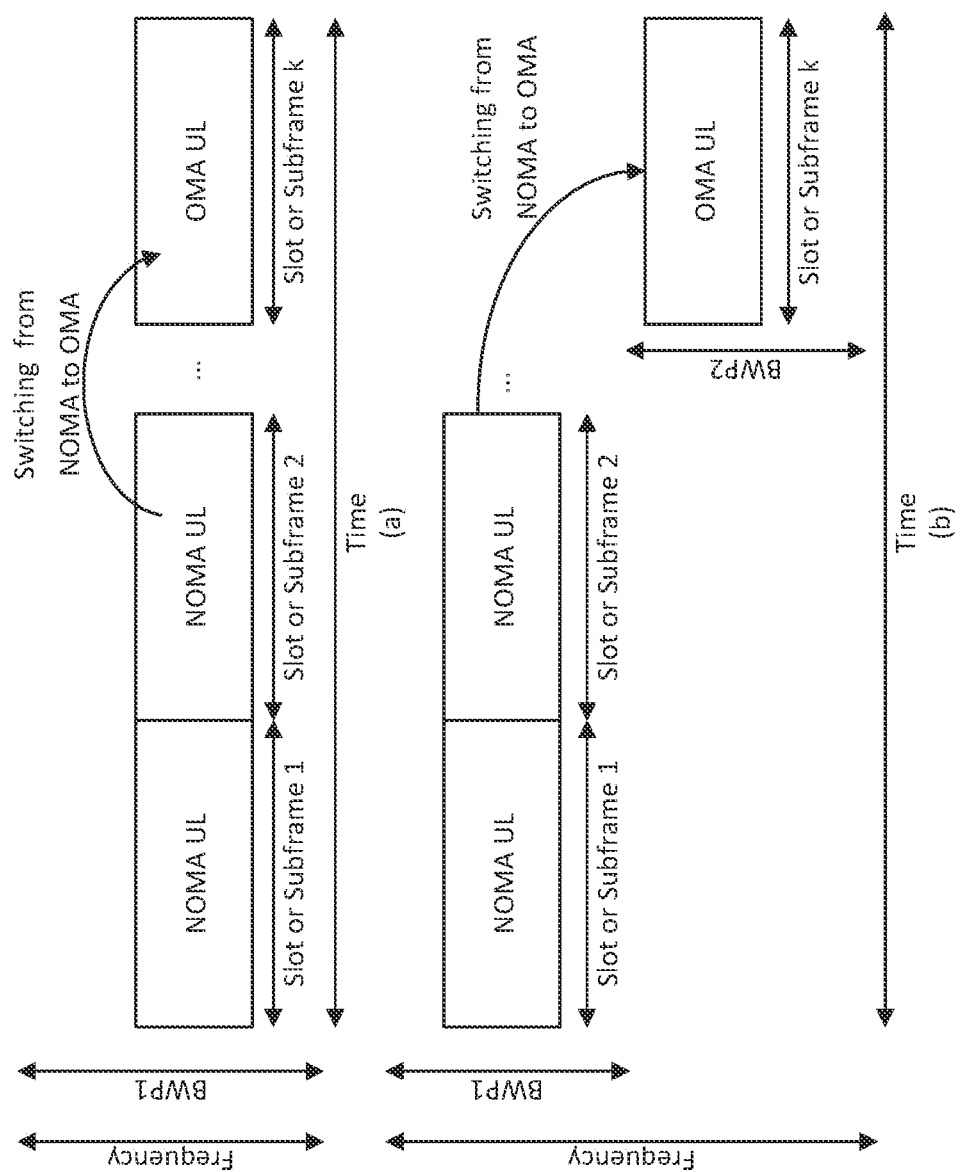
FIG. 14 shows an example flowchart of OMA and NOMA switching.
Figure 18:
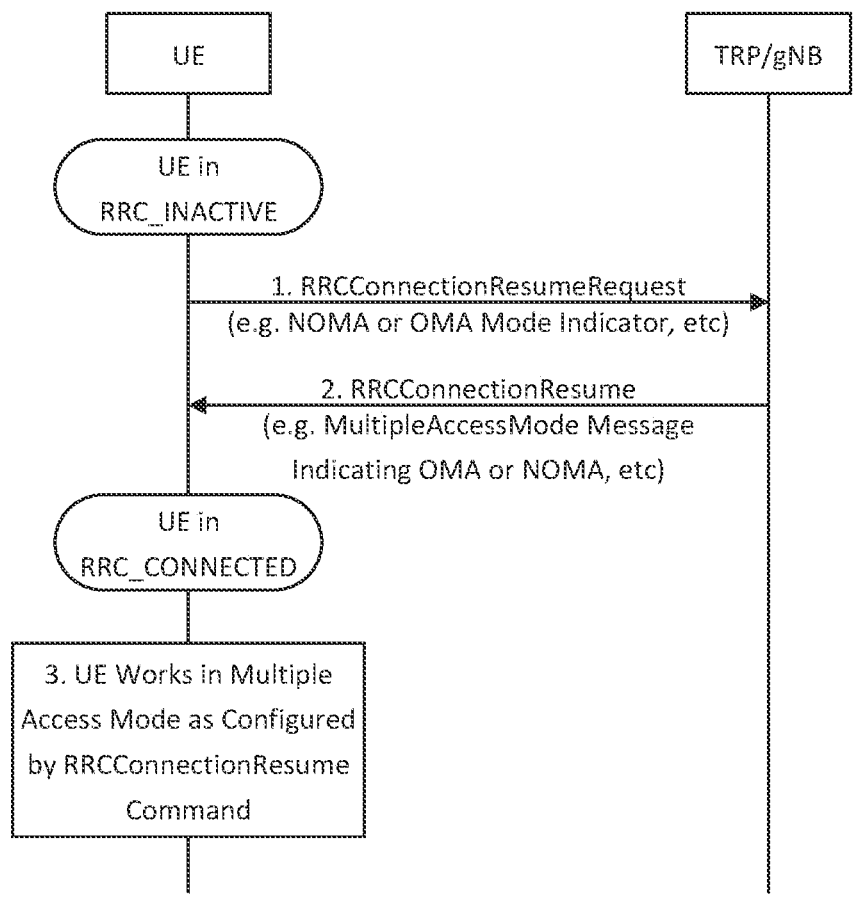
FIG. 18 shows an example flowchart of an RRC inactive state to an RRC connected state transition with OMA NOMA mode requested by the UE.

When a UE is switching between the NOMA or OMA mode, it may use the same frequency resource or different frequency resources to do the uplink transmission (e.g., same or different BWP). An example of OMA and NOMA switching is shown in FIG. 14.

If the same frequency resource is used by a UE for the NOMA mode and OMA mode, the UE may remain in the same BWP and switch between OMA and NOMA mode, as shown in FIG. 14(a). If different frequency resources are used by a UE for the NOMA mode and OMA mode, the UE may switch between OMA and NOMA as well as perform BWP switching procedure when OMA/NOMA switching is indicated by the gNB as shown in FIG. 14(b).

When different frequency resources are used for OMA and NOMA, the gNB may pre-configure dedicated resources for NOMA mode. In this case, the OMA NOMA switching may be implicitly indicated by BWP configuration. For example, assume the BWP1 in FIG. 14(b) is pre-configured to be reserved for NOMA users. When a UE is configured to switch to BWP1, the UE may switch to NOMA mode and no other explicit signaling may be needed. If no dedicated resources for is pre-configured for NOMA mode, both explicit signaling of OMA/NOMA switching and new BWP configuration may be needed for a UE to perform the switching between NOMA and OMA mode.

4.1.2 OMA-NOMA Switching for UE at RRC Inactive State

In NR, a UE may initiate a grant-free uplink transmission in an RRC-Inactive state. For NOMA uplink transmission with configured grant type 1, the configured grant used by a UE for uplink TWG (transmission without dynamic grant) in RRC-Inactive state can be configured by one of the following options:

Option 1: A UE may reuse the same UL transmission resource(s) and related parameters for uplink TWG in RRC-Inactive state which is configured by RRC or activated by DCI for the uplink TWG in RRC-Connected state. For example, a UE may be configured with one or multiple configured grants for the TWG configured by the RRC configuration ConfiguredGrantConfig in RRC-Connected state. When the UE switches to RRC-Inactive state after the UE performs the transition from RRC-Connected state to RRC-Inactive state (e.g., triggered by the RRC message RR ('Release from the gNB) the UE may initiate uplink transmission without dynamic grant in RRC-Inactive state by reusing the configured grant(s) which is configured by the RRC configuration ConfiguredGrantConfig or activated by DCI in RRC-Connected state. Furthermore, the full set of TWG configuration(s) reused in RRC Inactive state may be enabled or disabled by RRC parameter ConfiguredGrantConfigInactive (e.g., "ConfiguredGrantConfigInactive=1" is set within the RRC TWG configuration segment(s) of ConfiguredGrantConfig for enabling the reuse) or a subset of the TWG configuration(s) reuse in RRC Inactive state, where the subset may contain one or multiple parameters of TWG configuration(s), may be enabled or disabled by the RRC parameter ConfiguredGrantConfigInactive (e.g., "ConfiguredGrantConfigInactive=1" is set within the configuration sub-segment(s) of ConfiguredGrantConfig for enabling the reuse), respectively. In the case of TWG configuration subset reuse, different configurations may be set accordingly for TWG configuration at RRC-Inactive state for those parameters not reused. The TWG configuration reuse may also be indicated by the RRC message RR (Release from the gNB (e.g., one bit flag is used for reusing the TWG configuration with the flag set to "1").

Option 2: A UE may be configured with dedicated resource(s) and related parameters for TWG in RRC-Inactive state through the UE specific RRC configuration before the UE performs the transition from RRC-Connected state to RRC-Inactive state; or through broadcasting message(s) on the common or shared channel at the RRC-Inactive state (e.g., carried on the shared channel PDSCH indicated by a DCI at the common search space scrambled by INACTIVE-RNTI for a group of UEs at RRC-Inactive state). Such a resource may be periodic in time (e.g., every N subframes or slots or symbols for non-slot based) with a certain duration (e.g., in M symbols or slots) and for each BWP (e.g., initial BWP, default BWP or active BWP configured or activated for Inactive state). For example, a UE may be configured with the RRC TWG configuration(s) ConfiguredGrantInactiveConfig indicating the resource(s) and related parameters for RRC Inactive state. The TWG configuration for Inactive state may be configured by a new RRC configuration for Inactive state (e.g., RRC configuration segment ConfiguredGrantInactiveConfig). The specific TWG configuration for Inactive state may also be indicated by an RRC message (e.g., RRCRelease) when a gNB triggers a UE to switch to RRC-Inactive state from RRC-Connected state. FIG. 15 shows an example of a TWG Configuration for Inactive State with RRC ConfiguredGrantInactiveConfig.

Option 3: A UE may be configured with TWG configuration(s) for RRC-Connected state and RRC-Inactive state within the RRC configuration ConfiguredGrantConfig. For example, a UE may be configured with multiple configurations identified by Configuration Index, Grant ID, or Resource or Resource Set ID (e.g., Config #a1, a2, . . . or Grant #a1, a2, . . . for TWG in RRC-Connected state and Config #b1, b2, . . . or Grant #b1, b2, . . . for TWG in RRC-Inactive state through ConfiguredGrantConfig). The UE may also be configured by a different RRC state Configuration ID or Grant ID (e.g., ConfiguredGrantID for RRC Connected state and InactiveConfiguredGrantID for RRC Inactive state). For example, the RRC parameter InactiveConfiguredGrantID may be carried by RRC message RRC Release for indicating the TWG configuration or grant in RRC Inactive state (e.g., Grant #b1, b3 may be indicated by InactiveConfiguredGrantID out of the candidate pool of the configurations for RRC-Inactive state; or Grant #a2, a3 may be indicated by InactiveConfiguredGrantID out of the candidate pool for RRC-Connected state by reusing the configurations for RRC-Connected state).

Option 4: The resource(s) and related parameters a UE may use in RRC-Inactive state may be indicated by a paging message to a UE at RRC Inactive state. In RRC-Inactive state, for example, a UE may monitor and decode the UE specific or group specific paging message with ConfiguredGrantInactiveConfig carried on PDSCH indicated by a paging PDCCH scrambled with P-RNTI or P-Inactive-RNTI. The TWG resource(s) and related parameters configured by ConfiguredGrantInactiveConfig can be either UE specific or group based (e.g., indicated by the paging PDCCH scrambled with P-RNTI or P-Inactive-RNTI at a UE's paging occasion for UE specific configuration or at multiple UEs' paging occasions for UE group based configuration or indicated with a UE's ID for UE specific configuration or with a UE group ID for UE group based configuration).

For a UE with NOMA uplink transmission in RRC-Inactive state, when data arrives for transmission at the UE side, the UE may initiate uplink transmission immediately without dynamic grant in the RRC-Inactive state by using the configured grant (e.g., the resource(s) and related parameters configured by RRC either at the RRC-Inactive state or previously at the RRC-Connected state as described previously). The UE may piggyback the data with an RRC connection request message (e.g. RRCConnectionResumeRequst with the related UE context) and automatically return back to RRC-Inactive state at the completion of the data transmission acknowledged by the gNB (e.g. the RRC-ConnectionResume). Or, the UE may initiate an RRC connect request by RRCConnectionResumeRequest and switch to RRC-Connected state and transmit the data at RRC-Connected state afterwards. For example, the UE may initiate uplink transmission without dynamic grant in the RRC-Connected state using the known or previously configured RRC configuration ConfiguredGrantConfig without any new RRC configuration or dynamic activation or the UE may request a UL grant for the data to be transmitted after switching to the RRC-Connected state.

In RRC-Inactive state, the Discontinuous Reception (DRX) may be used by the UE to reduce the power consumption. The UE may monitor its paging occasions (POs) per DRX cycle when the UE wakes up after DRX at the RRC-Inactive state, where a PO is a set of PDCCH monitoring occasions where paging DCI may be transmitted. The UE may also be configured with CORESET monitoring occasions (e.g., blind decoding DCIs) at the RRC-Inactive state after the UE wakes up from the DRX at the RRC-Inactive state. For uplink transmission with configured grant activated by DCI at RRC-Inactive state, the configured grant may be configured by both RRC and/or indicated by DCI and activated by DCI. The UE may monitor and detect the DCI corresponding to UE's PO or UE's CORESET monitoring occasion at RRC-Inactive state for with one of the following options:

Option 1: In RRC-Inactive state, a UE may monitor one paging occasion (PO) for UE specific PO or multiple POs for UE group per DRX cycle, where a PO is a set of PDCCH monitoring occasions where paging DCI and resource indication or activation/deactivation DCI can be sent. The PDCCH for paging DCI may be scrambled with P-RNTI or P-Inactive-RNTI and the PDCCH for resource indication or activation/deactivation DCI may be scrambled with a dedicated RNTI (e.g., CS-RNTI or CS-Inactive-RNTI). The RNTI used to scramble the PDCCH for configured grant may be UE-specific or group-specific (e.g., multiple UEs may be configured with the same CS-RNTI or CS-Inactive-RNTI). If a UE detects a PDCCH scrambled with P-RNTI or P-Inactive-RNTI at a PO, the may UE determine that it is indicated with short message and/or paging PDSCH information by the paging DCI. If a UE detects a PDCCH scrambled with CS-RNTI or CS-Inactive RNTI at a PO or at a CORESET monitoring occasion for Inactive state, the UE may determine that it is indicated with the configured grant for uplink transmission without dynamic grant and/or it is indicated with the activation/deactivation signaling in the RRC-Inactive state by the activation/deactivation DCI.

Option 2: In RRC-Inactive state, a UE may monitor one paging occasion (PO) per DRX cycle, where a PO is a set of PDCCH monitoring occasions where paging DCI can be sent. The paging DCI which may be scrambled with P-RNTI or P-Inactive-RNTI at a PO and may serve one or multiple of the following functions: indicating the short message to a UE; indicating the paging PDSCH to a UE; indicating the activation/deactivation DCI to a UE; and/or indicating DL data is piggybacked with paging message by the paging PDSCH. A UE may determine if the paging DCI is served as the activation/deactivation DCI for uplink transmission without dynamic grant in the RRC-Inactive state when one of the following alternatives is satisfied:

Alternative 1: The DCI field Short Messages Indicator may be used to explicitly indicate which function the paging DCI is serving for. An example of the DCI field Short Messages Indicator is shown in Table 3. If a UE is indicated by the DCI field Short Messages Indicator to be '00', the UE determines the DCI is used to indicate configured grant information for UL TWG in RRC-Inactive state. The UE may determine the DCI is used for activation or deactivation by another DCI field (e.g., DCI field new data indicator). For example, '0' for activation and '1' for deactivation.

TABLE 3

Example of Short Messages Indicator

| Bit field | DCI Content Function |
|---|---|
| 00 | DCI is used for Activation and Deactivation. The configured grant information for UL TWG in RRC-Inactive state is present in the DCI |
| 01 | Only scheduling information for Paging is present in the DCI |
| 10 | Only short message is present in the DCI |
| 11 | Both scheduling information for Paging and short message are present in the DCI |

Alternative 2: A UE may determine if the paging DCI is served as the activation/deactivation DCI indicating the configured grant for uplink transmission without dynamic grant in the RRC-Inactive state by checking the implicit indication with one or multiple fields of the paging DCI are set to specific values for activation/deactivation. For example, the UE may determine if the paging DCI is used to activate the grant if the DCI field HARQ process number is set to all '0's and the DCI filed Redundancy version is set to '00'. The UE may determine the paging DCI is used to deactivate the grant if the DCI field HARQ process number is set to all '0's, the DCI filed Redundancy version is set to '00', the DCI field Modulation and coding scheme is set to all '1's and the DCI field Resource block assignment is set to all '1's.

In RRC-Inactive state, DL data may be piggybacked with the paging message by paging PDSCH. A UE may be indicated by the paging DCI which is scrambled with P-RNTI or P-Inactive-RNTI if there is DL data piggybacked. For example, a one bit DCI field Data Piggyback Indicator may be introduced as shown in Table 4. If a UE is indicated by the DCI field Data Piggyback Indicator to be '0', the UE may determine there is no DL data piggybacked with the paging message. If a UE is indicated by the DCI field Data Piggyback Indicator to be '1', the UE may determine there is DL data piggybacked with the paging message.

TABLE 4

Example of Data Piggyback Indicator

| Bit field | Data Piggyback |
|---|---|
| 0 | No DL data is piggybacked with the paging message |
| 1 | DL data is piggybacked with the paging message |

When a UE performs the transition from the RRC-Connected state to RRC-Inactive state, the UE may be configured with the mode (OMA or NOMA) it may work in RRC-Inactive state through the RRC. An RRC parameter may be configured in the RRC message triggering the transition from the RRC-Connected state to RRC-Inactive state to indicate the UE which mode (OMA or NOMA) to work in RRC-Inactive state. For example, the RRC parameter MultipleAccessModeInactive may be used to configure the UE which mode it may work in RRC-Inactive state. If a UE is configured with the RRC parameter MultipleAccessModeInactive set to be 'OMA', then the UE may operate in OMA mode after the UE transfers to RRC-Inactive state. If a UE is configured with the RRC parameter MultipleAccessModeInactive set to be 'NOMA', then the UE may operate in NOMA mode after the UE transfers to RRC-Inactive state. The RRC parameter MultipleAccessModeInactive may be carried by RRC message RRCRelease. FIG. 16 shows an example of an RRC configuration with RRC MultipleAccessModeInactive.

With another alternative, when a UE performs the transition from the RRC-Connected state to RRC-Inactive state, the UE may determine to operate in OMA mode or NOMA mode with one of the following types:

Type 1: Once a UE transfers to RRC-Inactive state, the UE may switch to NOMA mode. The UE may initial NOMA uplink transmission with configured grant as an example when there is data to be transmitted in RRC-Inactive state. For example, when a UE transfers to RRC-Inactive state, the UE will always switch to NOMA mode regardless which mode (OMA or NOMA) it is working in RRC-Connected state. The UE may be configured with configured grant resources to be used for uplink transmission in RRC-Inactive state. When the UE is in RRC-Inactive state and has data to transmit, it may perform the uplink transmission using the configured grant resources in NOMA mode.

Type 2: Once a UE transfers to RRC-Inactive state, the UE may switch to OMA mode. The UE may initial OMA uplink transmission with configured grant as an example when there is data to be transmitted in RRC-Inactive state. For example, when a UE transfers to RRC-Inactive state, the UE will always switch to OMA mode regardless which mode (OMA or NOMA) it is working in RRC-Connected state. The UE may be configured with configured grant resources to be used for uplink transmission in RRC-Inactive state. When the UE is in RRC-Inactive state and has data to transmit, it may perform the uplink transmission using the configured grant resources in OMA mode.

Type 3: Once a UE transfers to RRC-Inactive state, the UE may stay in the mode before the transitions otherwise is indicated by the gNB. For example, if a UE was in OMA mode before the transition from RRC-Connected state to RRC-Inactive state, the UE may stay in OMA mode after the transition. If a UE was in NOMA mode before the transition, the UE may stay in NOMA mode after the transition.

An RRC parameter Multiple AccessInactive Type may be configured to the UE to indicate if it should operate using type-1, type-2 or type-3 described above. The RRC parameter Multiple AccessInactive Type may be carried by RRC message RRCRelease. FIG. 17 shows an example of an RRC configuration with RRC Multiple AccessInactive Type.

When a UE is in OMA mode at RRC-Inactive state, the UE may be configured/indicated to switch to NOMA mode. A UE may perform the switching (from OMA to NOMA in RRC-Inactive state) when the UE receives an explicit or implicit NACK for the OMA uplink transmission or after K OMA uplink transmission repetition of the same TB. Alternatively, a UE may be indicated by the DCI (e.g., paging like DCI which is scrambled with P-RNTI or P-Inactive-RNTI to do the switching). For example, one bit field Multiple Access Indicator may be introduced in paging DCI with '0' for OMA and '1' for NOMA. The UE may perform the mode switching (from OMA to NOMA) if the UE is working in OMA mode and is indicated with Multiple Access Indicator to be '1'. The switching may be configured by an RRC configuration (e.g., paging message) and/or broadcast signaling (e.g., RMSI, OSI, or through broadcasting message(s) on the common or shared channel (e.g., carried on the shared channel PDSCH indicated by a DCI at the common search space scrambled by INACTIVE-RNTI for a group of UEs).

When a UE is in NOMA mode in RRC-Inactive state, the UE may be configured/indicated to switch to OMA mode. The UE may perform compact PRACH procedure (e.g., the UE may only perform the step 1 and step 2 of the 4 step RACH procedures) to achieve timing advance (TA) for UL synchronization. The UE may switch to OMA mode and initial OMA uplink transmission while staying in RRC-Inactive state. A UE may perform the compact PRACH procedure and the switching (from NOMA to OMA in RRC-Inactive state) when the UE receives an explicit or implicit NACK for the NOMA uplink transmission or after K NOMA uplink transmission repetitions of the same TB. Alternatively, a UE may be indicated by the DCI (e.g., paging like DCI which is scrambled with P-RNTI or P-Inactive-RNTI to perform the compact PRACH procedure do the switching). For example, one bit field Multiple Access Indicator may be introduced in the DCI with '0' for OMA and '1' for NOMA. The UE may perform the compact PRACH for timing adjustment and mode switching (from NOMA to OMA) if the UE is in NOMA mode and is indicated with Multiple Access Indicator to be '0'. The compact PRACH and switching may be configured by an RRC configuration (e.g., paging message) and/or broadcast signaling (e.g., RMSI, OSI, or through broadcasting message(s) on the common or shared channel (e.g., carried on the shared channel PDSCH indicated by a DCI at the common search space scrambled by INACTIVE-RNTI for a group of UEs).

In NR, a UE may operate in NOMA mode at RRC Inactive state. In some situations, such as a UE failed its UL transmission at RRC Inactive state or a UE needs more reliable UL transmission for a specific service indicated by the higher layer, the UE may need to transfer to an RRC Connected state. To do this, an RRC resume procedure for OMA-NOMA switching is disclosed. During the transition from RRC Inactive state to RRC Connected state, the UE needs to know whether it operates in OMA mode or NOMA mode. Therefore, the following options are disclosed:

Option 1: A UE may send a NOMA or OMA mode request along with the RRCConnectionResumeRequest message to indicate the mode it requests to operate. The gNB may respond back with an RRCConnectionResume message confirming OMA or NOMA mode. An RRC parameter MultipleAccessMode may be added to the RRCConnectionResumeRequest message. If a UE is configured with RRC parameter MultipleAccessMode set to be 'OMA' in the RRC connection resume command, the UE may work in OMA mode after the transition from RRC inactive state to RRC connected state. If a UE is configured with RRC parameter Multiple AccessMode set to be 'NOMA' in the RRC connection resume command, the UE may work in NOMA mode after the transition from RRC inactive state to RRC connected state. An example of the call flow is illustrated in FIG. 15. The UE may decide to request to operate in OMA or NOMA based on one or more of the following criteria: (uplink) radio quality estimate by the UE, load level of NOMA or OMA resource pool, network slice or network slice type, QoS requirements attributes associated with the data to be transmitted such as one or more of the following: latency, reliability, 5QI (5G QoS Identifier), scheduling priority, allowed packet error rate, default maximum data burst volume. The gNB may configure the UE with thresholds (e.g., for radio quality, QoS related metrics) that the UE may use to decide on the use of NOMA or OMA.

Figure 19:
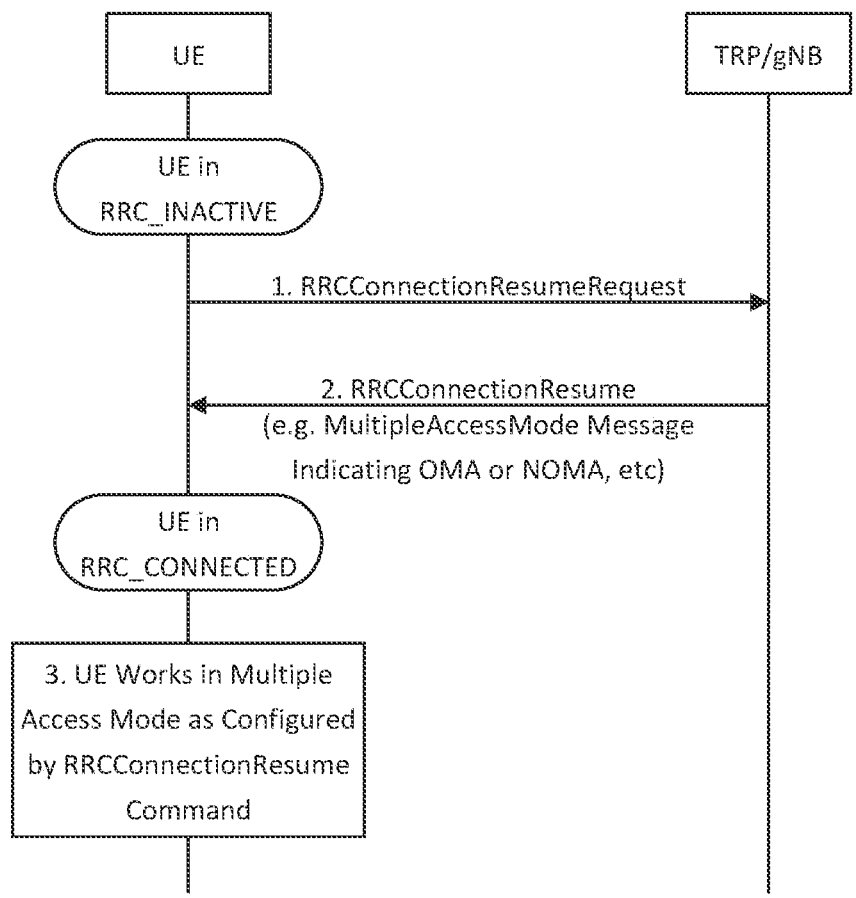
FIG. 19 shows an example flowchart of an RRC inactive state to an RRC connected state transition with OMA NOMA mode indicated by gNB.

Option 2: A UE may send the RRC connection resume request without the NOMA or OMA mode request. The gNB may determine and indicate the UE to operate in OMA or NOMA mode in the RRC connection resume message (e.g., MultipleAccessMode may be configured). The UE operates in the mode configured by gNB after the transition from RRC inactive state to RRC connected state. An example of the call flow is illustrated in FIG. 19. The UE may provide assistance information to the gNB to help the gNB make the decision to use NOMA or OMA. Such assistance information may include one or more the following:

Buffer Status Report piggybacked on the RRCConnectionResumeRequest;

The logical channel(s) or logical channel group(s) for which UE has data in its buffer; and Radio quality measurements, load level of NOMA or OMA resource pool, network slice or network slice type, QoS requirements attributes associated with the data in the UE buffer such as one or more of the following: latency, reliability, 5QI (5G QOS Identifier), scheduling priority, allowed packet error rate, and default maximum data burst volume.

Figure 20:
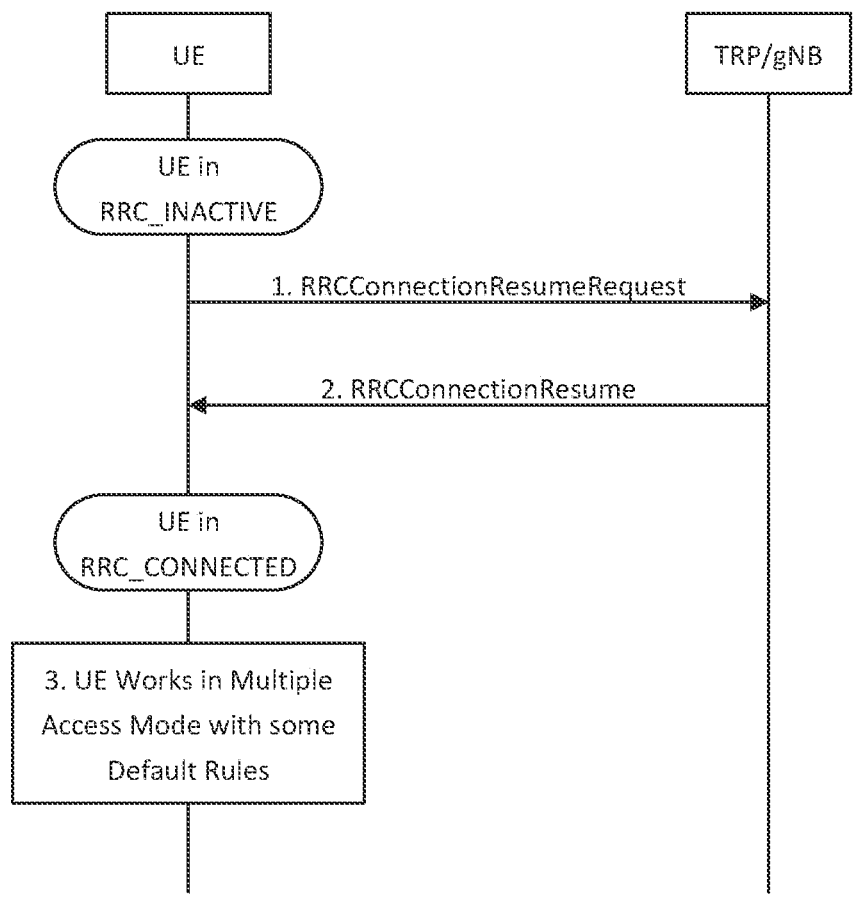
FIG. 20 shows an example flowchart of an RRC inactive state to an RRC connected state transition with OMA NOMA mode determined by default rule.

Option 3: A UE may send the RRC connection resume request without the NOMA or OMA mode request. The gNB may send back the RRC connection resume message without indicating the UE to work in OMA or NOMA mode. The UE may operate in the mode with pre-configured OMA-NOMA mode for RRC Inactive state and RRC Connected state or pre-defined rule after the transition from RRC Inactive state to RRC Connected state. For example, the UE may operate in a default mode (e.g., OMA mode) after the transition. This default mode may be determined by the service or the network status. Alternatively, after the transition, the UE may remain in the same mode as its OMA-NOMA mode in RRC Inactive state. After the RRC inactive state to RRC connected state transition, the UE may further perform OMA and NOMA mode switching as defined in connected mode by either gNB configuration or UE requesting. An example of the call flow is illustrated in FIG. 20. Alternatively, a UE may autonomously select whether to use NOMA or OMA. For example, dedicated NOMA resource pools and OMA resource pools may be configured to the UE for (e.g. through RRC signaling). In this example, configured Resource Type 1-like as currently specified in Release 15 NR, but for NOMA only use, may be configured to the UE. The UE may autonomously perform mode selection between NOMA or OMA based on one or more of the following: (uplink) radio quality estimate by the UE, load level of NOMA or OMA resource pool, network slice or network slice type, QoS requirements attributes associated with the data to be transmitted such as one or more of the following: latency, reliability, 5QI (5G QOS Identifier), scheduling priority, allowed packet error rate, and default maximum data burst volume. The gNB may configured the UE with thresholds (e.g., for radio quality, QoS related metrics) that the UE may use to decide on the use of NOMA or OMA.

4.1.3 OMA-NOMA Switching for TWG and SPS Transmission

For SPS and TWG (type-2), in a first example, the transmission mode (OMA or NOMA) may be indicated through the activation DCI whose PDCCH is scrambled by CS_RNTI. The mode may be indicated explicitly by a one-bit field MultipleAccessMode which indicates to the UE to transmit UL in OMA mode when set to 0 and to transmit in NOMA mode when set to 1. Alternatively, the mode may be indicated implicitly through the PDCCH—for example, the starting location of the PDCCH may indicate the mode. If the starting PRB of the PDCCH of the activation DCI in the $1^{st}$ symbol of the CORESET monitored by the UE is even, the mode is OMA and if the starting PRB of the PDCCH in the $1^{st}$ symbol of the CORESET monitored by the UE is odd, the mode is NOMA. Through implicit indication, a new DCI length is not required to indicate the mode of operation, thereby the UE's blind decoding capabilities can work with the added NOMA mode of operation.

In a second example, the transmission mode (OMA or NOMA) may be configured by an RRC message which may apply to SPS and TWG (or uplink transmission with configured grant) type-1 and type-2. For example, the RRC parameter Multiple AccessMode may be configured within the RRC configuration ConfiguredGrantConfig. In NR, a UE may be configured with multiple resources for uplink TWG (transmission without dynamic grant) where each resource may contain the same or different periodicity, time domain resource allocation, frequency domain allocation, etc. The UE may be configured with the MultipleAccessMode per resource or per a group of resources for uplink TWG in each cell through UE specific RRC configuration or UE may be configured with the MultipleAccessMode for all the resources for uplink TWG of a cell through UE specific RRC configuration.

When the MultipleAccessMode is configured per resource for uplink TWG, (e.g., for TWG type-1) each resource for uplink TWG may be identified with a different resourceID. Different values of the RRC parameter MultipleAccessMode may be configured for different resourceID. A UE may determine the actual resource for uplink TWG via RRC configuration resource(s) (e.g., the resourceID used for actual uplink TWG) and operate in the transmission mode (e.g., OMA or NOMA) associated with the configured resourceID). For TWG type-2, a UE may be configured with the same or different CS-RNTIs associated with the transmission mode Multiple AccessMode (e.g., OMA or NOMA). A UE may determine the actual resource for uplink TWG via activation DCI whose PDCCH is scrambled by the aforementioned CS-RNTI according to OMA or NOMA. Once a UE validates the activation PDCCH, the UE may operate in the transmission mode (OMA or NOMA) associated with CS-RNTI that is used to scramble the activation PDCCH. The idea proposed for TWG type-2 here may also apply to the SPS transmission. FIG. 21 shows an example where both OMA and NOMA are configured for the RRC configuration ConfiguredGrantConfig. Different ConfiguredGrantConfig may be configured under OMA and/or NOMA configurations respectively in the RRC configurations.

In a third example, the transmission mode (OMA or NOMA) may be configured by an RRC message and activation DCI whose PDCCH is scrambled by CS-RNTI which may apply to SPS and TWG type-2. For example, the RRC parameter NOMAMode Support may be used to configure if a UE can operate in NOMA mode. For grant based uplink transmission and uplink TWG, the RRC parameter NOMAMode Support may be separately configured to the UE. For example, a dedicated RRC parameter NOMAMode Support may be configured in both BandwidthPartConfig information element and ConfiguredGrantConfig information element to indicate a UE that if the UE can work in NOMA mode for grant based uplink transmission and uplink TWG separately. Alternatively, an RRC parameter NOMAMode Support may be configured for the UE for both grant based uplink transmission and uplink TWG.

For uplink TWG type 2, if a UE is configured with RRC parameter NOMAMode Support set to be 'OFF', the UE may determine it may only work in OMA mode for the uplink transmission with a configured grant. If a UE is configured with RRC parameter NOMAMode Support set to be 'ON', the UE may work in either OMA mode or NOMA mode. The UE may determine the transmission mode (OMA or NOMA) via the activation DCI whose PDCCH is scrambled by CS_RNTI with explicit or implicit DCI signaling. For example, a UE may be configured with CS_RNTI 1 and CS_RNTI 2 which are associated with OMA and NOMA, respectively. If a UE detects the PDCCH is scrambled with CS_RNTI 1, the UE may work in OMA mode for the configured grant. If a UE detects the PDCCH is scrambled with CS_RNTI 2, the UE may work in NOMA mode for the configured grant (the example may apply to the DCI only solution as well). The solution for TWP type 2 may also be applied to the SPS transmission. The NOMAMode Support may be turned ON or OFF dynamically with one bit indication in the DCI for activation.

Besides the activation DCI whose PDCCH is scrambled by CS_RNTI, the solutions disclosed herein using DCI signaling may also apply to other DCI, for example, DCI whose PDCCH is scrambled by C_RNTI for dynamic signaling the resource configurations.

In a fourth example, the transmission mode (OMA or NOMA) may be configured via implicit signaling which may apply to SPS and TWG (or uplink transmission with configured grant) type-1 and type-2. For example, if a UE is configured or activated to perform the actual uplink in a resource for uplink TWG that is configured with MA signature resource pool through the RRC, the UE may operate in NOMA mode. If a UE is configured or activated to perform the uplink in a resource for uplink TWG that is configured without MA signature resource pool through the RRC, the UE may operate in OMA mode.

4.1.4 OMA-NOMA Switching Between Retransmissions

Three example methods to handle the OMA/NOMA modes in retransmissions are disclosed. In method-1, a retransmission uses the same transmission mode as the original transmission. For a retransmission of a TB as indicated by the New Data Indicator field of the scheduling DCI, if the mode is indicated by a one-bit field MultipleAccessMode, the field Multiple AccessMode in the DCI for retransmission may be ignored by the UE and the UE assumes the same mode as the original transmissions. This UE behavior may be configured to the UE through RRC. In this case, the MultipleAccessMode in the retransmission may be set to 0 at the gNB.

In method-2, a retransmission may use a different mode from the initial transmission if the FEC used in OMA and NOMA are such that they can be chase combined between transmissions. For a retransmission of a TB as indicated by the New Data Indicator field of the scheduling DCI, if the mode is indicated by a one-bit field Multiple AccessMode, the field Multiple AccessMode may be used to configure the mode to the UE, e.g. "0" for OMA or "1" for NOMA, or "0" for not switching or "1" for switching.

In method-3, a retransmission may use a different mode from the initial transmission if the FEC used in OMA and NOMA are such that they cannot be chase combined between transmissions. For a retransmission of a TB as indicated by the New Data Indicator field of the scheduling DCI, if the mode indicated by a one-bit field Multiple AccessMode is different from the mode in the initial transmission, the field CBGFI may be set to zero to indicate to the UE to flush the buffer for that HARQ process ID.

Additionally, an RRC parameter may be configured to the UE to indicate if it should operate using method-1, method-2 or method-3 described above.

In one example, whether the retransmission uses a same or different transmission mode (OMA or NOMA) from the initial transmission may be configured by the RRC for a UE. For example, an RRC parameter RetransmissionModeSwitching may be used to configure if a different transmission mode can be used by a UE in the retransmission. If a UE is configured with RRC parameter RetransmissionModeSwitching set to be 'OFF', the UE may determine the same transmission mode as the original transmission is used for retransmission. If a UE is configured with RRC parameter RetransmissionModeSwitching set to be 'ON', the UE may determine a different transmission mode from the original transmission to be used for retransmission (e.g., OMA for initial transmission and NOMA for retransmission and vice versa). If the chase combine is performed between the transmission and retransmission, the UE may use the same LDPC base graph for the retransmission as used for the initial transmission when different transmission modes are used.

Another way to enable or disable the OMA and NOMA switching for retransmission may be indicated in the DCI for activation (e.g. a one bit flag is set for ON or OFF in the activation DCI).

When a UE performs the initial transmission in NOMA mode with the configured grant, the retransmission of a TB may be grant based as indicated by the New Data Indicator field of the scheduling DCI.

In another example, the retransmission of a TB may be performed with uplink transmission with configured grant. An RRC parameter may be configured to the UE to indicate if the UE should expect DL grant for retransmission or if it should autonomously perform retransmission with configured grant. For example, RRC parameter RetransmissionGrantType may be used. If a UE is configured with RRC parameter RetransmissionGrantType set to be 'GRANT-BASE', the UE may expect DL grant for retransmission. If a UE is configured with RRC parameter RetransmissionGrantType set to be 'CONFIDUREDGRANT', the UE may autonomously perform retransmission with configured grant if implicit or explicit NACK is received for the transmission of a TB. A UE may be configured with multiple resources for uplink TWG, e.g., resource 1, resource 2, . . . , resource N and the UE may use resource 1 for the initial transmission. The UE may use the same resource for retransmission, or the UE may use different resources for retransmission.

If a UE uses the same resource for uplink TWG for retransmission (e.g., resource 1 is used for retransmission), the UE may select one MA signature (same as or different from the MA signature used for the initial transmission) from the MA signature pool to do the NOMA retransmission. Alternatively, the UE may use multiple branches for selecting the MA signatures for NOMA retransmission to improve the reliability. For example, the UE may pick multiple MA signatures to do the retransmission of the same TB. The number of the branches that a UE can pick for retransmission may be configured by RRC parameter NumberofBranch. For example, if a UE is configured with RRC parameter NumberofBranch set to be '2', the UE may pick 2 MA signatures from the configured MA signature pool to do the NOMA retransmission of the same TB. If a UE is configured with RRC parameter NumberofBranch set to be '1', the UE may pick a different MA signature from the MA signature used for the initial transmission from the configured MA signature pool to do the NOMA retransmission of the same TB. Alternatively, a UE may be configured with the maximum number of the branches that the UE can pick for retransmission through RRC parameter MaxNumberofBranch. The UE may autonomously decide the number of branches (no larger than the value configured by MaxNumberofBranch) and MA signatures used for the NOMA retransmission of the same TB. For example, if a UE is configured with RRC parameter MaxNumberofBranch set to be '4', the UE may pick up to 4 MA signatures from the configured MA signature pool to do the NOMA retransmission of the same TB. The same RRC parameters may be used or different RRC parameters may be configured to a UE to indicate the number of branches or the max number of the branches the UE can use for initial transmission.

An example of the RRC parameters RetransmissionModeSwitching, RetransmissionGrantType, NumberofBranch, MaxNumberofBranch is shown in the RRC IE RetransmissionConfig. Note, all of the listed or part of the listed RRC parameters may be configured by the new RRC IE RetransmissionConfig. An example of RRC configuration RetransmissionConfig is shown in FIG. 22. Alternatively, the proposed RRC parameters may be configured by the existing RRC IE such as RRC IE ConfiguredGrantConfig and no new RRC IE may need to be introduced.

If a UE uses different resources for retransmission (e.g., resource 3 is used for retransmission), the UE may determine the resource for retransmission based on one or more of the following criteria: the UE may pick the resource with larger spreading gain; the UE may pick the resource with larger repetition gain, etc. When a different resource is used for retransmission (e.g., resource 3 is used for retransmission), the UE may use multiple branches to do the NOMA retransmission to improve the reliability where the number of branches to be used or the max number of the branches can be used may be configured by RRC parameter NumberofBranch or MaxNumberofBranch separately.

The procedure for the retransmission of a TB performed with uplink transmission with configured grant may also apply to the TB repetition for uplink transmission with configured grant. For NOMA uplink with configured grant, a UE may be configured with UL-TWG-repK-NOMA and UL-TWG-RV-rep-NOMA to indicate the define the K repetitions to be applied to the transmitted transport block, and the redundancy version pattern to be applied to the repetitions. If a UE is configured with one resource for uplink TWG, the UE may select different MA signatures from the MA signature pool for the TB repetition. If a UE uses one branch (one MA signature) for initial transmission, the UE may use multiple branches for the TB repetition to improve the reliability. If a UE is configured with multiple resources for uplink TWG, the UE may select the same or different resources for uplink TWG for the TB repetition. For example, the UE may use resource 1 for initial transmission, use resource 3 for the first TB repetition, use resource 4 for the second repetition, etc. In this scenario, multiple branches may also be used for the TB repetition to improve the reliability.

In another alternative, different transmission modes (OMA or NOMA) may be used for the TB repetition to improve transmission reliability. A UE may be configured with the OMA/NOMA pattern for the K TB repetition through RRC message. An example of the OMA/NOMA pattern for the case a UE is configured with 4 TB repetition is shown in Table 5. If a UE is configured with RRC parameter OMA-NOMA-Pattern set to be 'Pattern 3', the UE may determine to use OMA for the initial transmission and use NOMA for the rest TB repetitions. A UE may be configured with an RRC parameter TB-RepetitionModeSwitching with value 'ON' and 'OFF'. If a UE is configured with the RRC parameter TB-RepetitionModeSwitching set to be 'OFF', the same transmission mode may be used for the initial transmission and the TB repetition. If a UE is configured with the RRC parameter TB-RepetitionModeSwitching set to be 'ON', different transmission modes may be used for the initial transmission and the TB repetition (e.g., OMA for the initial transmission and NOMA for the TB repetitions and vice versa).

TABLE 5

Example of OMA/NOMA Pattern for TB Repetition with 4 Repetitions

| | |
|---|---|
| Pattern 1 | {OMA, OMA, OMA, OMA} |
| Pattern 2 | {NOMA, NOMA, NOMA, NOMA} |
| Pattern 3 | {OMA, NOMA, NOMA, NOMA} |
| Pattern 4 | {NOMA, OMA, OMA, OMA} |
| Pattern 5 | {NOMA, OMA, NOMA, OMA} |
| Pattern 6 | {OMA, NOMA, OMA, NOMA} |
| ... | ... |

4.2 Signature Signaling in NOMA 4.2.1 MA Signature Parameters

For different NOMA schemes, the parameters in the MA signature may be different. Parameters are disclosed that may need to be signaled to a UE in the MA signals depending on the NOMA scheme category:

Codebook based—For the codebook based NOMA transmission scheme, it can be assumed that the maximum number of non-orthogonal multiplexing UEs is equal to U. Without losing the generality, the u-th UE can be assigned with a unique codebook $C_i^{(u)}=[c_1^{(u)} \ldots c_Q^{(u)}] \in \mathbb{C}^{N_i \times Q}$ from a set of codebooks $\mathcal{S}_i = \{C_i^{(1)} \ldots C_i^{(U)}\}$, where $N_i$ denotes the number of REs used for the NOMA transmission and Q denotes the M-QAM modulation size, for instance, if M=64 then $Q=\log_2 M=6$. The k-th transmit RE at the OFDM symbol l for the u-th UE can be denoted as $$x_{k,l}^{(u)} = c_{n,q^{(u)}}^{(u)}, \quad \text{(Eq 1)}$$

where $c_{n,q}^{(u)}$ denotes the n-th element of the $q^{(u)}$-th column vector in codebook $C^{(u)}$. Here, $q^{(u)}$ presents the M-QAM modulation index for u-th UE.

Hence, for the codebook based NOMA transmission scheme, a UE may have to be signaled with the following parameters as the MA signature:

Codebook set index i from a set of codebooks for pointing to a specific codebook set $\mathcal{S}_i$; and Codebook index u in the codebook set $S_i$.

In practice, we can further assume the maximum number of supported codebook sets is equal to 1, i.e., there are $S_1 \ldots S_I$ codebook sets.

Sequence based—For the sequence based NOMA transmission scheme, it can assume that the maximum number of spreading codes is equal to U. An (N,U) sequence S is a set of U unit-norm complex or real vectors in $\mathbb{C}^N$ or $\mathbb{R}^N$. Without losing the generality, the u-th UE can be assigned with a unique sequence form an (N, U) sequence $S=[s_\square^{(1)} \ldots s_{\square(U)}] \in \mathbb{C}_{N \times U}$. The k-th transmit RE at the OFDM symbol l for the u-th UE can be denoted as $$x_{k,l}^{(u)} = g_{n,l}^{(u)} s_n^{(u)} d_l^{(u)}, \quad \text{(Eq 2)}$$

where $s_n^{(u)}$ denotes the n-th element in the u-th sequence in S, $d_l^{(u)}$ denotes the u-th UE transmit modulation symbol at the l-th OFDM symbol and $g_{n,l}^{(u)}$ denotes the n-th element in the scrambling sequence for the UE u at the l-th OFDM symbol.

Hence, for the sequence based NOMA transmission scheme, a UE may have to be signaled with the following parameters as the MA signature:

Sequence index u;

Sequence configuration such as sequence initialization; and

Scrambling code (if configured).

Interleaver based—The strategy of user separation for interleaver based NOMA scheme is different from other non-orthogonal multiple access schemes such as codebook or sequence based NOMA scheme.

In an interleaver based NOMA scheme, through a UE-specific bit-level interleaver $\pi_u$, where $\pi_u$ denotes u-th UE specific interleaver, the inter-user interference is suppressed by overlapped signal. The input data sequence $d^{(u)}$ of UE u is encoded based on a low-rate error correction code C with the repetition coding (if specified) generating a coded sequence $c^{(u)}=[c_1^{(u)} c_2^{(u)} \ldots C_N^{(u)}]$, where N is the frame length. The elements in $c^{(u)}$ are referred to as coded bits. Then $c^{(u)}$ is permutated by a UE-specific interleaver $\pi_u$ producing $z^{(u)}=[z_1^{(u)} z_2^{(u)} \ldots z_N^{(u)}]$. The k-th transmit RE at the OFDM symbol l for the u-th UE can be denoted as $$x_{k,l}^{(u)} = g_{n,u} z_{n,l}^{(u)}, \quad \text{(Eq 3)}$$

where $z_{n,l}^{(u)}$ denotes the n-th element in the u-th sequence in $z^{(u)}$ at the l-th OFDM symbol and, $g_{n,l}^{(u)}$ denotes the n-th element in the scrambling sequence for the UE u. If a repetition pattern has specified for interleaver based NOMA scheme, then the output of UE-specific interleaver $z_{n,l}^{(u)}$ can be repeated/spread by a factor v and the output of the repetition denotes $$r^{(u)} = \left[ \underbrace{r_1^{(u)} \ldots r_v^{(u)}}_{z_1^{(u)}} \ldots r_{vN}^{(u)} \right].$$

With the repetition function being enabling, the k-th transmit RE at the OFDM symbol l for the u-th UE can be expressed as $$x_{k,l}^{(u)} = g_{n,u} r_{n,l}^{(u)}, \quad \text{(Eq 4)}$$

where $r_{n,l}^{(u)}$ denotes the n-th element in the u-th sequence in $r^{(u)}$ at the l-th OFDM symbol.

Hence, for the sequence based NOMA transmission scheme, a UE may have to be signaled with the following parameters as the MA signature:

Interleaver index for $\pi_u$;

Repetition configuration (if specified); and

Scrambling code configuration (if configured).

4.2.2 MA Signature Signaling Design

In NR grant-based NOMA, gNB may indicate each UE the MA signature it should use its uplink transmission. Within an MA signature, the parameters may be signaled in the following options:

Option 1: The MA signature may be configured by the RRC parameter. For example, the MA-Signature-Config IE may be used to configure the MA signature used by a UE. The gNB may semi-statically configure the MA signature to each UE and the UE may use the configured MA signature to generate all the granted transmissions unless a new MA signature is configured by the RRC reconfiguration. The MA signature here may refer to codebook set index i and codebook index u for codebook based NOMA scheme; sequence index u, sequence configuration such as sequence initialization and scrambling code (if configured) for sequence based NOMA scheme; interleaver index for $\pi_u$, repetition configuration (if specified) and scrambling code configuration (if configured) for interleaver cased NOMA scheme. Note, for the codebook based NOMA scheme, if I=1 (e.g., there is a single codebook sets defined) then there is no need to signal the codebook set index. This solution may be applicable to both RRC connected state and RRC inactive state.

FIG. 23 shows an example of a MA-Signature-Config information element.

Option 2: The MA signature may be signaled jointly though RRC and DCI. This solution may be applicable to both RRC connected state and RRC inactive state. For example, a gNB may configure a MA signature resource pool to each UE through RRC signaling and a UE can be dynamically signaled by DCI to indicate which MA signature is used. An example is as follows: the MA-Signature-Config_alternative/IE may be used to configure the MA signature resource pool which may contain $2^N$ MA signatures can be used by a UE. Then the UE is indicated by DCI which one out of the $2^N$ MA signatures is used through N bits MA signature filed.

If the OMA or NOMA mode is implicitly indicated by MA signature filed, an example is shown in Table 2.

If the OMA or NOMA mode is explicitly indicated or implicitly indicated by another DCI field, an example of the MA signature filed is shown in Table 6 with N=3. If a UE determines that it is working in OMA mode, the UE may ignore the MA signature field signaled in the DCI.

TABLE 6

Example MA signature filed with N = 3 and OMA NOMA switching explicitly indicated

| Value of MA signature filed | MA signature |
| --- | --- |
| 000 | First MA signature configured by RRC |
| 001 | Second MA signature configured by RRC |
| 010 | Third MA signature configured by RRC |
| ... | ... |
| 111 | Eighth MA signature configured by RRC |

FIG. 24 shows an example of a MA-Signature-Config_alternative1 information element.

Option 3: The MA signature may be signaled by the RRC message, MAC CE and DCI. This solution may be applicable to the RRC connected state only. For example, the gNB may configure a MA signature resource pool containing M MA signatures to each UE through RRC signaling. Then, the gNB may pick $2^N$ out of M ($2^N \leq M$) MA signatures to form a MA signature resource set and signal the MA signature resource set to UE through MAC CE. A UE can be dynamically indicated by DCI which one out of the $2^N$ MA signatures is used through N bits MA signature filed.

If the OMA NOMA mode switching/determining is implicitly indicated by MA signature filed, an example is shown in Table 2.

If the OMA NOMA mode switching/determining is explicitly indicated or implicitly indicated by another DCI field, an example of the MA signature filed is shown in Table 6 with N=3. If a UE determines that it is working in OMA mode, the UE may ignore the MA signature filed signaled in the DCI.

Option 4: The MA signature may be signaled by the DCI signaling only. This solution may be applicable to RRC connected state only. For example, a set of the MA signatures resources pool may be predefined in the spec, or may be signaled through RMSI/OSI. The UE may figure out the MA signature to be used out of the MA signatures resources pool through the DCI signaling.

Option 5: The MA signature may be implicitly signaled. For example, the MA signature may be associated with the DMRS port. The association may be predefined in the spec or configured by the RRC message or MAC CE signaling. Once a UE is signaled with the DMRS port, the UE may determine the MA signature to be used implicitly.

Some examples of configuring/signaling the MA signature parameters are as follows:

For codebook based NOMA, the codebook sets index may be pre-configured via the RRC parameters and the codebook index u in a codebook set $S_1$ may be signaled via DCI;

For sequence based NOMA, the sequence configuration and scrambling code (if configured) may be pre-configured via the RRC parameters and the sequence index u may be signaled via DCI; and For interleaver based NOMA, the scrambling code configuration (if configured) may be pre-configured via the RRC parameters and the Ty may be signaling via DCI.

4.3 UCI Piggybacked in NOMA

In NR, the UCI and PUSCH may be scheduled in the same slot. In this case, the UCI may be piggybacked on PUSCH and be transmitted together with the PUSCH. In NOMA, the same situation may also happen. Since multiple users may be non-orthogonal multiplexed in the PUSCH resources, the data transmitted by other UE may degrade the reliability of the piggybacked UCI receiving.

4.3.1 UCI Multiplexing on PUSCH with Higher Rate Matching Rate or Spreading for NOMA In an example, more resources may be applied to UCI for spreading or rate matching in the piggybacking to make it more robust (e.g., more REs may be used for the UCI piggybacking).

In NR, offset values $\beta_{offset}^{HARQ-ACK}$, $\beta_{offset}^{CSI-1}$ and $\beta_{offset}^{CSI-2}$ and are defined for a UE to determine the number of resources for multiplexing the UCI. A set of the offset values may be used for UCI piggyback used in NOMA need to be indicated by DCI and/or RRC with the following examples:

If DCI doesn't contain the beta_offset indicator field and the offset value is configured by RRC, one or more of the following higher layer parameters may need to be configured by RRC to configure the UE the value of beta_offset to be used in calculating the number of resources for multiplexing the UCI in NOMA mode:

betaOffsetACK-NOMA-Index0;
betaOffsetACK-NOMA-Index1;
betaOffsetACK-NOMA-Index2;
betaOffsetCSIPart1-NOMA-Index0;
betaOffsetCSIPart2-NOMA-Index0;
betaOffsetCSIPart1-NOMA-Index1; and
betaOffsetCSIPart2-NOMA-Index1.

Where betaOffsetACK-NOMA-Index0, betaOffsetACK-NOMA-Index1, betaOffsetACK-NOMA-Index2 are used to configure the HARQ-ACK offsets $\beta_{offset,NOMA}^{HARQ-ACK}$ for NOMA and provide the indexes $1_{offset,NOMA,0}^{HARQ-ACK}$, $1_{offset,NOMA,1}^{HARQ-ACK}$ and $1_{offset,NOMA,2}^{HARQ-ACK}$ for the UE to use if the UE multiplexes up to 2 HARQ-ACK bits, more than 2 and up to 11 HARQ-ACK bits, and more than 11 bits in the PUSCH, respectively; betaOffsetCSIPart1-NOMA- Index0 and betaOffsetCSIPart2-NOMA-Index0 are used to configure the CSI part 1 and CSI part 2 offsets $\beta_{offset,NOMA}^{CSI-1}$ and $\beta_{offset,NOMA}^{CSI-2}$ for NOMA, respectively, and respectively provide indexes $1_{offset,NOMA,0}^{CSI-1}$ and $1_{offset,NOMA,0}^{CSI-2}$ for the UE to use if the UE multiplexes up to 11 bits for CSI part 1 or CSI part 2 in the PUSCH; betaOffsetCSIPart1-NOMA-Index1 and betaOffsetCSI-Part2-NOMA-Index1 are used to configure the CSI part 1 and CSI part 2 offsets $\beta_{offset,NOMA}^{CSI-1}$ and $\beta_{offset,NOMA}^{CSI-2}$ for NOMA, respectively, and respectively provide indexes $1_{offset,NOMA,1}^{CSI-1}$ and $1_{offset,NOMA,1}^{CSI-2}$ for the UE to use if the UE multiplexes more than 11 bits for CSI part 1 or CSI part 2 in the PUSCH. A UE may first figure out whether it is working in NOMA or OMA mode, then select the corresponding offset values for OMA or NOMA to determine the number of resources for multiplexing the UCI.

If the beta offset values are dynamically signaled by DCI, one or more of the following higher layer parameters may need to be configured by RRC to configure the UE the set of beta_offset values to be indicated by DCI signaling to calculate the number of resources for multiplexing the UCI in NOMA mode:

{betaOffsetACK-NOMA-Index0, betaOffsetACK-NOMA-Index1, betaOffsetACK-NOMA-Index2};

{betaOffsetCSIPart1-NOMA-Index0, betaOffsetCSIPart1-NOMA-Index1}; and

{betaOffsetCSIPart2-NOMA-Index0, betaOffsetCSIPart2-NOMA-Index1}.

Where each higher layer parameters {betaOffsetACK-Index0, betaOffsetACK-HARQ-ACK Index1, betaOffsetACK-Index2} configures a set of $N^{index}$ indexes for offset, $I_{offset,NOMA,0}^{HARQ-ACK}$, $I_{offset,NOMA,1}^{HARQ-ACK}$ and $I_{offset,NOMA,2}^{HARQ-ACK}$ respectively; each of higher layer parameters {betaOffsetCSIPart1-Index0, betaOffsetCSIPart1-Index1} configures a set of $N_{index}$ indexes for $I_{offset,NOMA,0}^{CSI-1}$ and $I_{offset,NOMA,1}^{CSI-1}$ respectively; each of higher layer parameters {betaOffsetCSIPart2-Index0, betaOffsetCSIPart2-Index1} configures a set of $N_{index}$ indexes for $I_{offset,NOMA,1}^{CSI-2}$ and $I_{offset,NOMA,1}^{CSI-2}$ respectively. Then UE may determine the value of $I_{offset,NOMA,0}^{HARQ-ACK}$, $I_{offset,NOMA}^{CSI-1}$ and $I_{offset,NOMA}^{CSI-2}$ from the respective sets of values through the DCI signaling with the following alternatives:

Alternative 1: The beta_offset indicator field may be reused. The UE may determine the offset values based on which mode it is operating in. If a UE is working in NOMA mode, the beta_offset indicator field may indicate the $I_{offset,NOMA}^{HARQ-SCK}$ value and/or the $I_{offset,NOMA}^{CSI-1}$ value and/or the $I_{offset,NOMA}^{CSI-2}$ value from the respective sets of values. An example is shown in Table 7 when all of $I_{offset,NOMA}^{HARQ-ACK}$, $I_{offset,NOMA}^{CSI-1}$ and $I_{offset,NOMA}^{CSI-2}$ are configured by RRC. If a UE works in OMA, it determines the value based on the RRC configured OMA beta_offset index sets.

TABLE 7

Mapping of beta_offset indicator values to offset indexes for a UE working in NOMA mode

| beta_offset indicator | ($I_{offset, NOMA, 0}^{HARQ-ACK}$ or $I_{offset, NOMA, 1}^{HARQ-ACK}$ or $I_{offset, NOMA, 2}^{HARQ-ACK}$), ($I_{offset, NOMA, 0}^{CSI-1}$ or $I_{offset, NOMA, 1}^{CSI-1}$), ($I_{offset, NOMA, 0}^{CSI-2}$ or $I_{offset, NOMA, 1}^{CSI-2}$) |
|---|---|
| 00 | 1st offset index provided by {betaOffsetACK-NOMA-Index0, betaOffsetACK-NOMA-Index1, betaOffsetACK-NOMA-Index2}; {betaOffsetCSIPart1- |

TABLE 7-continued

Mapping of beta_offset indicator values to offset indexes for a UE working in NOMA mode

| beta_offset indicator | ($I_{offset, NOMA, 0}^{HARQ-ACK}$ or $I_{offset, NOMA, 1}^{HARQ-ACK}$ or $I_{offset, NOMA, 2}^{HARQ-ACK}$), ($I_{offset, NOMA, 0}^{CSI-1}$ or $I_{offset, NOMA, 1}^{CSI-1}$), ($I_{offset, NOMA, 0}^{CSI-2}$ or $I_{offset, NOMA, 1}^{CSI-2}$) |
|---|---|
| | NOMA-Index0, betaOffsetCSIPart1-NOMA-Index1}; {betaOffsetCSIPart2-NOMA-Index0, betaOffsetCSIPart2-NOMA-Index1} |
| 01 | 2nd offset index provided by {betaOffsetACK-NOMA-Index0, betaOffsetACK-NOMA-Index1, betaOffsetACK-NOMA-Index2}; {betaOffsetCSIPart1-NOMA-Index0, betaOffsetCSIPart1-NOMA-Index1}; {betaOffsetCSIPart2-NOMA-Index0, betaOffsetCSIPart2-NOMA-Index1} |
| 10 | 3rd offset index provided by {betaOffsetACK-NOMA-Index0, betaOffsetACK-NOMA-Index1, betaOffsetACK-NOMA-Index2}; {betaOffsetCSIPart1-NOMA-Index0, betaOffsetCSIPart1-NOMA-Index1}; {betaOffsetCSIPart2-NOMA-Index0, betaOffsetCSIPart2-NOMA-Index1} |
| 11 | 4th offset index provided by {betaOffsetACK-NOMA-Index0, betaOffsetACK-NOMA-Index1, betaOffsetACK-NOMA-Index2}; {betaOffsetCSIPart1-NOMA-Index0, betaOffsetCSIPart1-NOMA-Index1}; {betaOffsetCSIPart2-NOMA-Index0, betaOffsetCSIPart2-NOMA-Index1} |

Alternative 2: A new DCI field beta_offset NOMA indicator may be introduced. For example, when $N_{index} > 4$, the current beta_offset indicator field can't support to indicate all the candidate beta offset values, a new field with $\log_2 N_{index}$ bits may be introduced. The UE may determine the beta offset values for NOMA mode using beta_offset NOMA indicator field and beta offset values for OMA mode using beta_offset indicator field, respectively.

As disclosed herein, in NOMA, only part of a UCI may be piggybacked with the PUSCH and the rest part of the UCI may not be piggybacked. For example, in NOMA, only HARQ-ACK may be piggybacked with PUSCH, while CSI part 1 and CSI part 2 are not piggybacked; or it may only HARQ-ACK up to 2 bits is piggybacked with PUSCH, while HARQ-ACK more than 2 bits CSI part 1 and CSI part 2 are not piggybacked; or it may only HARQ-ACK and CSI part 1 are piggybacked with PUSCH, while CSI part 2 is not piggybacked.

To make the UCI piggybacking more robust, the value of beta offset should be extended and larger value should be introduced. With larger value of beta offset signaled, the UE can rate match the UCI to more resources and therefore improve the robustness. After the beta value is figured out by a UE, the UE may need to generate the output bit sequence with rate matching which is going to be piggybacked by the PUSCH. The UE may the use following options to generate the output bit sequence:

Option 1: The UE may rate match to $Q'_{UCI,NOMA}$ resources. Since more resources are assigned, the piggybacked UCI is more robust to the interference. Using HARQ-ACK as an example, the HARQ-ACK transmission on PUSCH with UL-SCH, the number of coded modulation symbols per layer for HARQ-ACK transmission, denoted as $Q'_{ACK,NOMA}$, may be determined as follows:

$$Q'_{ACK,NOMA} = \min\left\{ \left\lceil \frac{(O_{ACK} + L_{ACK}) \cdot \beta_{offset,NOMA}^{HARQ-ACK} \cdot \sum_{l=0}^{N_{symb,all}^{PUSCH}-1} M_{SC}^{UCI}(l)}{\sum_{r=0}^{C_{UL-SCH}-1} K_r} \right\rceil, \right.$$

-continued $$\alpha \cdot \sum_{l=l_0}^{N_{symb,all}^{PUSCH}-1} M_{SC}^{UCI}(l) \Biggr\}$$

Where:

$O_{ACK}$ is the number of HARQ-ACK bits;
$L_{ACK}$ is the number of CRC bits for HARQ-ACK;
$C_{UL-SCH}-1$ is the number of code blocks for UL-SCH of the PUSCH transmission;
$K_r$ is the r-th code block size for UL-SCH of the PUSCH transmission;
$M_{SC}^{PUSCH}$ is the scheduled bandwidth of the PUSCH transmission, expressed as a number of subcarriers;
$M_{SC}^{PT-RS}(l)$ is the number of subcarriers in OFDM symbol l that carries PTRS, in the PUSCH transmission;
$M_{SC}^{UCI}(l)$ is the number of resource elements that can be used for transmission of UCI in OFDM symbol l, for $l=0,1,2,\ldots N_{symb,all}^{PUSCH}-1$, in the PUSCH transmission and $N_{symb,all}^{PUSCH}$ is the total number of OFDM symbols of the PUSCH, including all OFDM symbols used for DMRS;
for any OFDM symbol that carries DMRS of the PUSCH, $M_{SC}^{UCI}(l)=0$;
for any OFDM symbol that does not carry DMRS of the PUSCH, $M_{SC}^{UCI}(l)=M_{SC}^{PUSCH}(l)-M_{SC}^{PT-RS}(l)$;
$\alpha \in \{0.5, 0.65, 0.8, 1\}$ is configured by higher layer parameter; and
$l_0$ is the symbol index of the first OFDM symbol that does not carry DMRS of the PUSCH, after the first DMRS symbol(s), in the PUSCH transmission.

Assume the input bit sequence to rate matching is $d_{r0}, d_{r1}, \ldots, d_{r(N_r-1)}$ where r is the code block number, and $N_r$ is the number of coded bits in code block number r. The input sequence may be rate matched with the rate matching output sequence length to $E_r = \lfloor E_{UCI}/C_{UCI} \rfloor$, where $C_{UCI}$ is the number of code blocks for UCI;
$N_L$ is the number of transmission layers of the PUSCH;
$Q_m$ is the modulation order of the PUSCH; and $E_{UCI} = N_L \cdot Q'_{ACK,NOMA} \cdot Q_m$.

Figure 25:
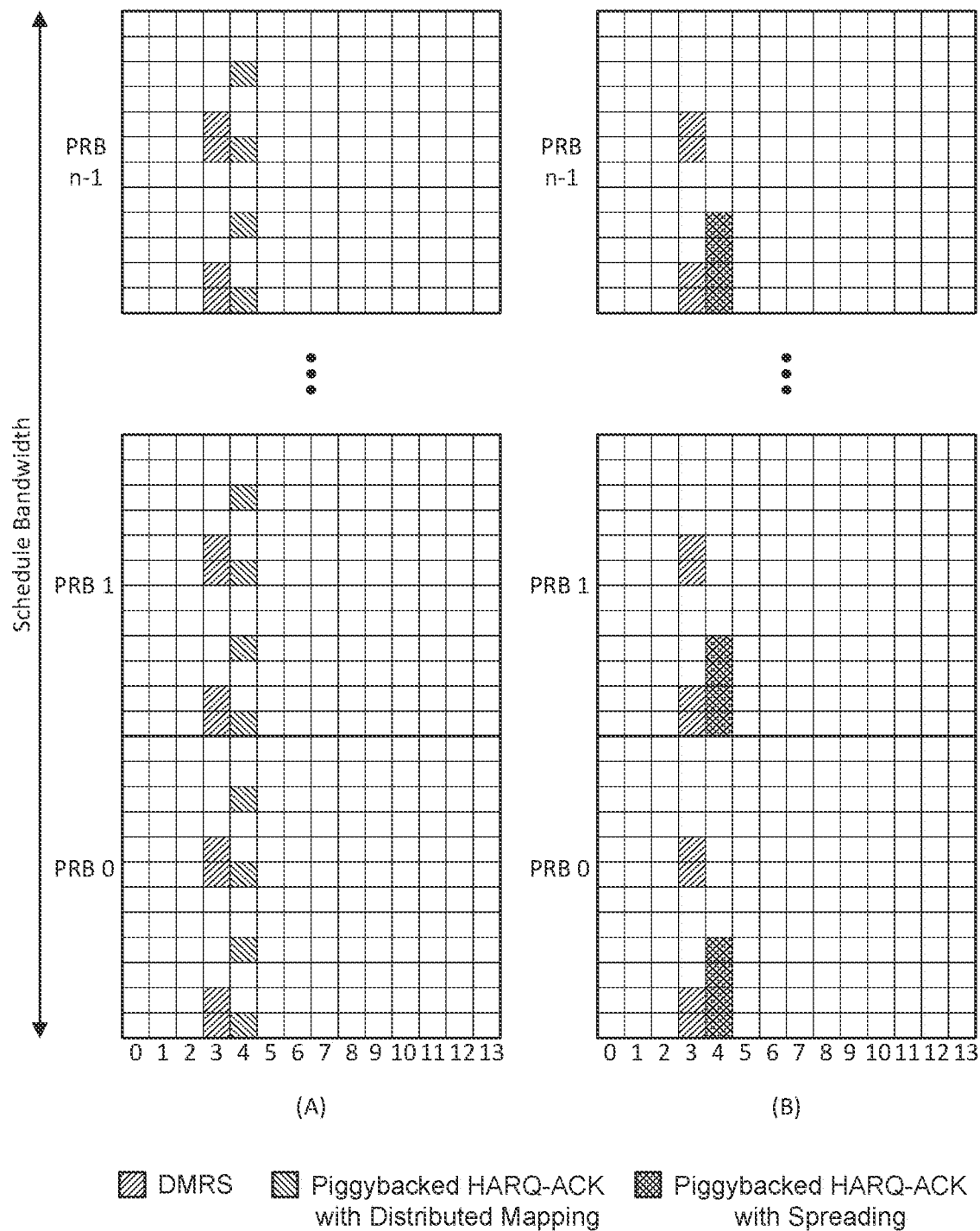
FIG. 25 shows an example HARQ-ACK piggybacked on PUSCH in NOMA.

The output bit sequence after rate matching is denoted as $f_{r0}, f_{r1}, \ldots, f_{r(E_r-1)}$ where $E_r$ is the length of rate matching output sequence in code block number r. Then the output bit sequence may be distributed mapped across allocated bandwidth. An example of is shown in FIG. 25(a).

For CSI part 1, the number of coded modulation symbols per layer for CSI part 1 transmission, denoted as $Q'_{CSI-1,NOMA}$, may be determined as follows if needed:

$$Q'_{CSI-1,NOMA} = \min\Biggl\{ \left\lceil \frac{(O_{CSI-1}+L_{CSI-1}) \cdot \beta_{offset,NOMA}^{CSI-1} \cdot \sum_{l=0}^{N_{symb,all}^{PUSCH}-1} M_{SC}^{UCI}(l)}{\sum_{r=0}^{C_{UL-SCH}-1} K_r} \right\rceil,$$

$$\alpha \cdot \sum_{l=l_0}^{N_{symb,all}^{PUSCH}-1} M_{SC}^{UCI}(l) - Q'_{ACK,NOMA} \Biggr\}$$

The output sequence length for CSI part 1 transmission after rate matching is $E_r = \lfloor E_{UCI}/C_{UCI} \rfloor$ with $E_{UCI} = N_L \cdot Q'_{CSI-1,NOMA} \cdot Q_m$.

For CSI part 2, the number of coded modulation symbols per layer for CSI part 2 transmission, denoted as $Q'_{CSI-2,NOMA}$, may be determined as follows if needed:

$$Q'_{CSI-2,NOMA} = \min\Biggl\{ \left\lceil \frac{(O_{CSI-2}+L_{CSI-2}) \cdot \beta_{offset,NOMA}^{CSI-2} \cdot \sum_{l=0}^{N_{symb,all}^{PUSCH}-1} M_{SC}^{UCI}(l)}{\sum_{r=0}^{C_{UL-SCH}-1} K_r} \right\rceil,$$

$$\alpha \cdot \sum_{l=l_0}^{N_{symb,all}^{PUSCH}-1} M_{SC}^{UCI}(l) - Q'_{ACK,NOMA} - Q'_{CSI-1,NOMA} \Biggr\}$$

The output sequence length for CSI part 1 transmission after rate matching is $E_r = \lfloor E_{UCI}/C_{UCI} \rfloor$ with $E_{UCI} = N_L \cdot Q'_{CSI-2,NOMA} \cdot Q_m$.

Option 2: The UE may rate match to part of the $Q'_{UCI,NOMA}$ resources and perform spreading with a spreading code. Assume that the spreading factor is $S_f$, a UE may first rate match to the sequence to $$\frac{1}{S_f}$$

of the $Q'_{UCI,NOMA}$ resources and then spread the sequence with spreading factor $S_f$ to fill the whole $Q'_{UCI,NOMA}$ resources. Using HARQ-ACK as an example, the HARQ-ACK transmission on PUSCH with UL-SCH, the number of coded modulation symbols per layer for HARQ-ACK transmission, denoted as $Q'_{ACK,NOMA}$, may be determined as follows:

$$Q'_{ACK,NOMA} = \min\Biggl\{ \left\lceil \frac{(O_{ACK}+L_{ACK}) \cdot \beta_{offset,NOMA}^{HARQ-ACK} \cdot \sum_{l=0}^{N_{symb,all}^{PUSCH}-1} M_{SC}^{UCI}(l)}{\sum_{r=0}^{C_{UL-SCH}-1} K_r} \right\rceil,$$

$$\alpha \cdot \sum_{l=l_0}^{N_{symb,all}^{PUSCH}-1} M_{SC}^{UCI}(l) \Biggr\}$$

Assume the input bit sequence to rate matching is $d_{r0}, d_{r1}, \ldots, d_{r(N_r-1)}$ where r is the code block number, and $N_r$ is the number of coded bits in code block number r. The input sequence is rate matched with the rate matching output sequence length to $E'_r = \lfloor U'_{UCI}/C_{UCI} \rfloor$, where $C_{UCI}$ is the number of code blocks for UCI;
$N_L$ is the number of transmission layers of the PUSCH;
$Q_m$ is the modulation order of the PUSCH; and $$E'_{UCI} = \frac{N_L \cdot Q'_{ACK,NOMA} \cdot Q_m}{S_f}$$

The output bit sequence after rate matching is then spread with a sequence of spreading factor $S_f$. The output bit sequence after rate matching and spreading is denoted as $f_{r0}, f_{r1}, \ldots, f_{r(E_r-1)}$ where $E_r$ is the length of rate matching output sequence in code block number r. The may be in time domain, frequency domain or both time and frequency domain. An example of HARQ-ACK piggyback on PUSCH with frequency domain spreading in NOMA is shown in FIG. 25(b).

For CSI 1 and CSI part 2, same idea may apply. The UE may first rate match the input sequence $d_{r0}, d_{r1}, \ldots, d_{r(N_r-1)}$ with the rate matching output sequence length to $$E'_r = \left\lfloor \frac{E'_{UCI}}{C_{UCI}} \right\rfloor,$$

where $$E'_{UCI} = \frac{N_L \cdot Q'_{CSI-1,NOMA} \cdot Q_m}{S_f}$$

and $$E'_{UCI} = \frac{N_L \cdot Q'_{CSI-2,NOMA} \cdot Q_m}{S_f}$$

respectively. Then the output bit sequence after rate matching is then spread with spreading factor $S_f$. The output bit sequence after rate matching and spreading is denoted as $f_{r0}, f_{r1}, \ldots, f_{r(E_r-1)}$ where $E_r$ is the length of rate matching output sequence in code block number r.

While a UE is performing higher rate matching rate or spreading on the resources shared by all the NOMA UEs for the UCI piggybacking, other UEs may be transparent if any UE is doing UCI piggybacking in the shared resources. When multiple UEs have UCI to be piggybacked in the same time, different spreading codes may be used for different UEs. In the example shown in FIG. 25(b), UE 1 may be spread with [1 1 1 1], UE 2 may be spread with [1 1 −1 −1], UE 3 may be spread with [1 −1 1 −1], etc.

4.3.2 UCI Multiplexing on PUSCH with Reserved Resources

In NOMA mode, multiple UEs may send data on the same time and frequency resources simultaneously. In some cases, one or more UEs may have UCI to be piggybacked with their data transmissions. If other UEs transmit data on the resources used for transmitting the UCI, the performance may degrade or even fail. Therefore, when a UE is doing UCI piggybacking, the other NOMA UEs sharing the same resources may be indicated by gNB to not transmit data on the corresponding resources to reduce the inter-UE data to UCI interference with following options:

The resources used for UCI piggyback may be configured by an RRC parameter. The gNB may pre-reserve some resource(s) for the UE to piggyback UCI in the NOMA resources (e.g., the first k symbols after the front loaded DMRS). The NOMA UEs sharing the resources may be configured by the RRC indicating the resources that are reserved. A new DCI field may be introduced (e.g., one bit piggyback existing indicator) to signal the NOMA UEs sharing the resources if there is one or more UE have UCI to be piggybacked. For example, if no NOMA UE has UCI to be piggybacked, all the UEs may be signaled with piggyback existing indicator to be '0'. The NOMA UEs may use all the allocated resources for uplink data transmission. If there is any one or more UE have UCI to be piggybacked, all the UEs may be signaled with piggyback existing indicator to be '1'. The NOMA UEs shall not transmit data on the reserved resources configured by the higher later signaling and do rate matching in the rest allocated resources for uplink data transmission. When there are multiple NOMA UEs that have UCI to be piggybacked in the same time, the UCI from different UEs may be FDM-ed and/or TDM-ed and/or CDM-ed on the reserved resources.

The resources used for UCI piggyback may be signaled by DCI with the following alternatives:

Alternative 1: A bitmap may be signaled by the DCI to all the NOMA UEs to indicate the resources to be used for UCI piggyback. If a UE has UCI to be transmitted, the UE may use the resources indicated by the bitmap to piggyback the UCI. If a UE doesn't have UCI to be transmitted, the UE shall not transmit data on the resources indicated by the bitmap and do rate matching in the rest allocated resources for uplink data transmission. When there is no UE has UCI to transmit, the bit map may be signaled with all '0's and the NOMA UEs may use all the allocated resources for uplink data transmission.

Alternative 2: gNB may use a new field (e.g., a piggyback indicator) to indicate the number of symbols used for UCI piggyback through the DCI. An example of piggyback indicator field with 2 bits in shown in Table 8. If no NOMA UE has UCI to be piggybacked, all the UEs may be signaled with piggyback indicator to be '00'. The NOMA UEs may use all the allocated resources for uplink data transmission. If there is any one or more UE have UCI to be piggybacked, all the UEs may be signaled with piggyback existing indicator to be either '01', '10' or '11'. For a UE that has UCI to be transmitted, the UE figures out the number of symbols that can be used for UCI transmission and piggyback the UCI on the corresponding symbols. For a UE that doesn't have UCI to be transmitted, the UE figures out the symbol(s) that it shall not transmit data (e.g., the symbols indicated in the piggyback indicator) and do rate matching and transmit the data in the rest allocated resources for uplink data transmission. For example, assume a UE is allocated with symbol 3 to symbol 13 as PUSCH and the value of piggyback indicator is '11'. If the UE has UCI to transmit, the UE may piggyback the UCI on symbol 3 to symbol 5; and rate match and transmit the data on symbol 6 to symbol 13. If the UE doesn't have UCI to transmit, the UE may rate match and transmit the data on symbol 6 to symbol 13; and not transmit data on symbol 3 to symbol 5.

TABLE 8

Example of piggyback indicator field

| Value of the piggyback indicator filed | Number of symbols used for UCI piggyback |
|---|---|
| 00 | No symbol is used for piggyback |
| 01 | One symbol is used for piggyback |
| 10 | Two symbols are used for piggyback |
| 11 | Three symbols are used for piggyback |

Considering the overhead of the extra DCI signaling needed and UCI piggybacking for NOMA data transmission, not all UCI may be piggybacked using in this method. For example in NOMA, it may only HARQ-ACK is piggybacked with PUSCH, while CSI part 1 and CSI part 2 are not piggybacked; or it may only HARQ-ACK up to 2 bits is piggybacked with PUSCH, while HARQ-ACK more than 2 bits CSI part 1 and CSI part 2 are not piggybacked; or it may only HARQ-ACK and CSI part 1 are piggybacked with PUSCH, while CSI part 2 is not piggybacked.

4.3.3 PUSCH Piggyback UCI Multiplexing Rule

A PUSCH piggyback UCI multiplexing rule is disclosed herein. The specs may predefine the following rules. When a UE is working in NOMA, the UE may not multiplex all of part of the UCI on PUSCH. When a UE has both UCI and PUSCH scheduled at the same time in NOMA, the UE may only transmit the data and the UCI that is allowed to be piggybacked (if present) on the PUSCH and transmit the UCI that are not allowed to be piggybacked on the configured PUCCH resources. If the PUCCH resource is not available, the UE may wait for the next PUCCH resource or drop the UCI. The UCI here may refer to one of the following options:

Option 1: All of the HARQ-ACK, CSI part 1, CSI part 2 may not be multiplexed on PUSCH in NOMA;

Option 2: CSI part 2 may not be multiplexed on PUSCH in NOMA. HARQ-ACK and CSI part 1 can be multiplexed on PUSCH in NOMA;

Option 3: CSI part 1 and CSI part 2 may not be multiplexed on PUSCH in NOMA. HARQ-ACK can be multiplexed on PUSCH in NOMA; and Option 4: HARQ-ACK with more than 2 bits, CSI part 1 and CSI part 2 may not be multiplexed on PUSCH in NOMA. HARQ-ACK with up to 2 bits can be multiplexed on PUSCH in NOMA.

A UE may be dynamically signaled by the gNB if the UCI multiplexing on PUSCH is allowed in NOMA. For example, a one bit field piggyback indicator allow may be introduced. The gNB may determine if the UCI may be multiplexed on PUSCH based on the number of UEs working in NOMA for each time instance and/or the number of UEs having UCI to be piggybacked. For example, if a UE is signaled with piggyback allow indicator to be '1', the UE may be allowed to use PUSCH to piggyback UCI. For the UCI that can be piggybacked, the UE may figure out how to do the piggyback though other signaling such as piggyback existing indicator field, piggyback indicator field, etc. If a UE is signaled with piggyback allow indicator to be '0', the UE is allowed to use PUSCH to piggyback UCI. The UE may not perform any UCI multiplexing on PUSCH and ignore other piggyback related signaling in DCI such as piggyback existing indicator field, piggyback indicator field, etc.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The following is a list of acronyms relating to service layer technologies that may appear in the above description. Unless otherwise specified, the acronyms used herein refer to the corresponding term listed below:

ACK ACKnowledgement
BWP Bandwidth Part
CDM Code-Domain Multiplexing
CE Control Element
CSI Channel State Information
DCI Downlink Control Information
DL Downlink
DMRS DeModulation Reference Signal
eMBB enhanced Mobile Broadband
FDM Frequency-Division Multiplexing
HARQ Hybrid Automatic Repeat Request
KPI Key Performance Indicators
LTE Long Term Evolution
MAC Medium Access Control
mMTC massive Machine Type Communication
NOMA Non-Orthogonal Multiple Access
NR New Radio
OFDM Orthogonal Frequency-Division Multiplexing
OMA Orthogonal Multiple Access
OSI Other System Information
PDCCH Physical Downlink Control Channel
PUSCH Physical Uplink Shared Data Channel
PTRS Phase Tracking Reference Signal
QAM Quadrature Amplitude Modulation
QOS Quality of Service
QPSK Quadrature Phase-Shift Keying
RE Resource Element
RMSI Remain Minimum System Information
RNTI Radio Network Temporary Identifier
RRC Radio Resource Control
TDM Time-Division Multiplexing
UE User Equipment
UL Uplink
URLLC Ultra-Reliable and Low Latency Communications

What is claimed is:

1. A method performed by a wireless transmit/receive unit (WTRU), the method comprising:
  receiving, by the WTRU, while the WTRU is in an RRC connected state, a radio resource control (RRC) release message comprising configuration information indicating one or more configured grant (CG) resources, wherein the configuration information further indicates at least one of: a periodicity, a time allocation, a frequency allocation, a modulation coding scheme, or a transport block size; and
  while the WTRU is in an RRC inactive state:
    sending, by the WTRU, an uplink (UL) transmission using one of the indicated CG resources, wherein the UL transmission comprises at least an RRC resume request message; and
    monitoring, by the WTRU, for a physical downlink control channel transmission including downlink control information using a radio network temporary identifier (RNTI) configured for the RRC inactive state, wherein the RNTI comprises a configured scheduling RNTI.

2. The method of claim 1, further comprising, upon completion of sending the UL transmission, resuming the RRC inactive state.

3. The method of claim 1, further comprising receiving, from a base station, an acknowledgement of the UL transmission.

4. A wireless transmit/receive unit (WTRU) configured to:
  receive, while the WTRU is in an RRC connected state, a radio resource control (RRC) release message comprising configuration information indicating one or more configured grant (CG) resources, wherein the configuration information further indicates at least one of: a periodicity, a time allocation, a frequency allocation, a modulation coding scheme, or a transport block size; and
  while the WTRU is in an RRC inactive state:
    send an uplink (UL) transmission using one of the indicated CG resources, wherein the UL transmission comprises at least an RRC resume request message; and
    monitor for a physical downlink control channel transmission including downlink control information using a radio network temporary identifier (RNTI) configured for the RRC inactive state, wherein the RNTI comprises a configured scheduling RNTI.

5. The WTRU of claim 4, wherein upon completion of sending the uplink transmission, the WTRU is configured to resume the RRC inactive state.

6. The WTRU of claim 4, wherein the WTRU is further configured to receive, from a base station, an acknowledgement of the uplink transmission.

7. The method of claim 1, wherein the UL transmission further comprises UL data.

8. The method of claim 7, wherein the UL data is piggybacked with the RRC resume request message.

9. The WTRU of claim 4, wherein the UL transmission further comprises UL data.

10. The WTRU of claim 9, wherein the UL data is piggybacked with the RRC resume request message.

* * * * *